US009791910B1

(12) United States Patent
Brown et al.

(10) Patent No.: US 9,791,910 B1
(45) Date of Patent: Oct. 17, 2017

(54) PREDICTIVE POWER MANAGEMENT IN A WIRELESS SENSOR NETWORK USING PRESENCE DETECTION

(71) Applicant: Invent.ly, LLC, Woodside, CA (US)

(72) Inventors: Stephen J. Brown, Woodside, CA (US); Daylyn M. Meade, Sebastopol, CA (US); Timothy P. Flood, Sebastopol, CA (US); Clive A. Hallatt, Palo Alto, CA (US); Holden D. Jessup, Palo Alto, CA (US); Hector H. Gonzalez-Banos, Mountain View, CA (US)

(73) Assignee: Invent.ly, LLC, Woodside, CA (US)

( * ) Notice: Subject to any disclaimer, the term of this patent is extended or adjusted under 35 U.S.C. 154(b) by 156 days.

(21) Appl. No.: 14/568,718

(22) Filed: Dec. 12, 2014

Related U.S. Application Data

(63) Continuation-in-part of application No. 14/169,464, filed on Jan. 31, 2014, now abandoned, which is a continuation-in-part of application No. 14/103,209, filed on Dec. 11, 2013, which is a continuation of application No. 13/946,414, filed on Jul. 19, 2013, now Pat. No. 8,850,242, which is a continuation of application No. 13/406,469, filed on Feb. 27, 2012, now Pat. No. 8,516,279, which is a continuation of application No. 12/472,327, filed on May 26, 2009, now Pat. No. 8,127,158, which is a continuation of application No. 11/443,668, filed on May 30, 2006, now Pat. No. 7,539,882, said application No. 14/169,464 is a continuation-in-part of application No. 14/090,099, filed on Nov. 26, 2013.

(Continued)

(51) Int. Cl.
*G06F 1/32* (2006.01)

(52) U.S. Cl.
CPC ............ *G06F 1/3206* (2013.01); *G06F 1/329* (2013.01); *G06F 1/3231* (2013.01)

(58) Field of Classification Search
None
See application file for complete search history.

(56) References Cited

U.S. PATENT DOCUMENTS 5,623,677 A 4/1997 Townsley et al.
5,642,014 A 6/1997 Hillenius
(Continued)

OTHER PUBLICATIONS

Jessup, U.S. Appl. No. 12/472,327, Response, Nov. 3, 2011, 7pgs.
(Continued)

*Primary Examiner* — Paul J Yen
(74) *Attorney, Agent, or Firm* — Christopher P. Maiorana, PC

(57) ABSTRACT

A system comprising a plurality of self-powered devices and a plurality of proximity self-powered devices. The plurality of self-powered devices may be configured to (i) perform instructions, (ii) store scheduling data and (iii) select one of a plurality of modes of operation. The proximity self-powered devices may be configured to (i) detect a presence and (ii) select one of a plurality of modes of operation. The plurality of self-powered devices may select one of the plurality of modes of operation based on (i) the stored scheduling data and (ii) the presence detected by at least one of the plurality of proximity self-powered devices.

17 Claims, 27 Drawing Sheets

Related U.S. Application Data

(60) Provisional application No. 60/685,976, filed on May 30, 2005.

(56) References Cited

U.S. PATENT DOCUMENTS

| | | | |
|---|---|---|---|
| 5,754,436 | A | 5/1998 | Walsh et al. |
| 6,128,743 | A | 10/2000 | Rothenbaum |
| 6,148,408 | A | 11/2000 | Shimoda |
| 6,178,514 | B1 | 1/2001 | Wood |
| 6,189,106 | B1 | 2/2001 | Anderson |
| 6,424,128 | B1 | 7/2002 | Hiraki et al. |
| 6,493,944 | B2 | 12/2002 | Jarzombek |
| 6,571,279 | B1 * | 5/2003 | Herz ............... G06F 17/30867 707/999.01 |
| 6,693,438 | B2 | 2/2004 | Shea |
| 6,693,585 | B1 | 2/2004 | MacLeod |
| 6,701,443 | B1 | 3/2004 | Bell |
| 6,708,292 | B1 | 3/2004 | Mangasarian |
| 6,957,292 | B2 | 10/2005 | Croyle |
| 6,963,986 | B1 | 11/2005 | Briggs et al. |
| 7,081,693 | B2 | 7/2006 | Hamel et al. |
| 7,168,180 | B2 | 1/2007 | Wu et al. |
| 7,278,705 | B2 | 10/2007 | Ohara |
| 7,281,144 | B2 | 10/2007 | Banginwar et al. |
| 7,302,600 | B2 | 11/2007 | Bibikar et al. |
| 7,334,142 | B2 | 2/2008 | Hack |
| 7,539,882 | B2 | 5/2009 | Jessup et al. |
| 7,688,222 | B2 | 3/2010 | Peddie et al. |
| 8,305,246 | B2 | 11/2012 | Kinyua et al. |
| 8,531,611 | B2 | 9/2013 | Testin et al. |
| 8,566,627 | B2 | 10/2013 | Halepete et al. |
| 2002/0181700 | A1 | 12/2002 | Unno |
| 2004/0181703 | A1 | 9/2004 | Lilja et al. |
| 2004/0246821 | A1 | 12/2004 | Fujisawa |
| 2004/0249571 | A1 | 12/2004 | Blesener et al. |
| 2005/0068101 | A1 | 3/2005 | Kim et al. |
| 2005/0087019 | A1 | 4/2005 | Face |
| 2005/0166074 | A1 | 7/2005 | Hack |
| 2006/0129861 | A1 | 6/2006 | Kee et al. |
| 2007/0257634 | A1 | 11/2007 | Leschin et al. |
| 2009/0077296 | A1 | 3/2009 | Mok et al. |
| 2009/0150101 | A1 * | 6/2009 | Itagaki ............... G01R 31/3648 702/63 |
| 2010/0141217 | A1 * | 6/2010 | Morris .................... G06F 1/266 320/137 |
| 2011/0035605 | A1 * | 2/2011 | McKean ................. G06F 3/061 713/300 |
| 2011/0273546 | A1 * | 11/2011 | Lin .................... G06K 9/00771 348/61 |
| 2012/0214461 | A1 * | 8/2012 | Raghavan ......... H04M 1/72569 455/418 |
| 2013/0173926 | A1 * | 7/2013 | Morese .................. G06F 19/10 713/186 |

OTHER PUBLICATIONS

Jessup, U.S. Appl. No. 12/472,327, Notice of Allowance, Oct. 20, 2011, 7 pgs.
Jessup, U.S. Appl. No. 12/472,327, Office Action, Mar. 17, 2011, 12 pgs.
Jessup, U.S. Appl. No. 12/472,327, Response with Terminal Disclaimer, Jul. 8, 2011, 12 pgs.
Jessup, Holden re U.S. Appl. No. 12/472,327, filed May 26, 2009 re Amendment dated Nov. 3, 2011. 7 pages.
Jessup, Holden re U.S. Appl. No. 12/472,327, filed May 26, 2009 re Notice of Allowance and Fee(s) due mailed Oct. 20, 2011. 7 pages.
Jessup, Holden, U.S. Appl. No. 12/472,327, filed May 26, 2009, Office Action with mail date of Mar. 17, 2011. 12 pages.
Response dated Jul. 8, 2011 to the Office Action dated Mar. 17, 2011 re U.S. Appl. No. 12/472,327 includes Terminal Disclaimer. 12 pages.

* cited by examiner

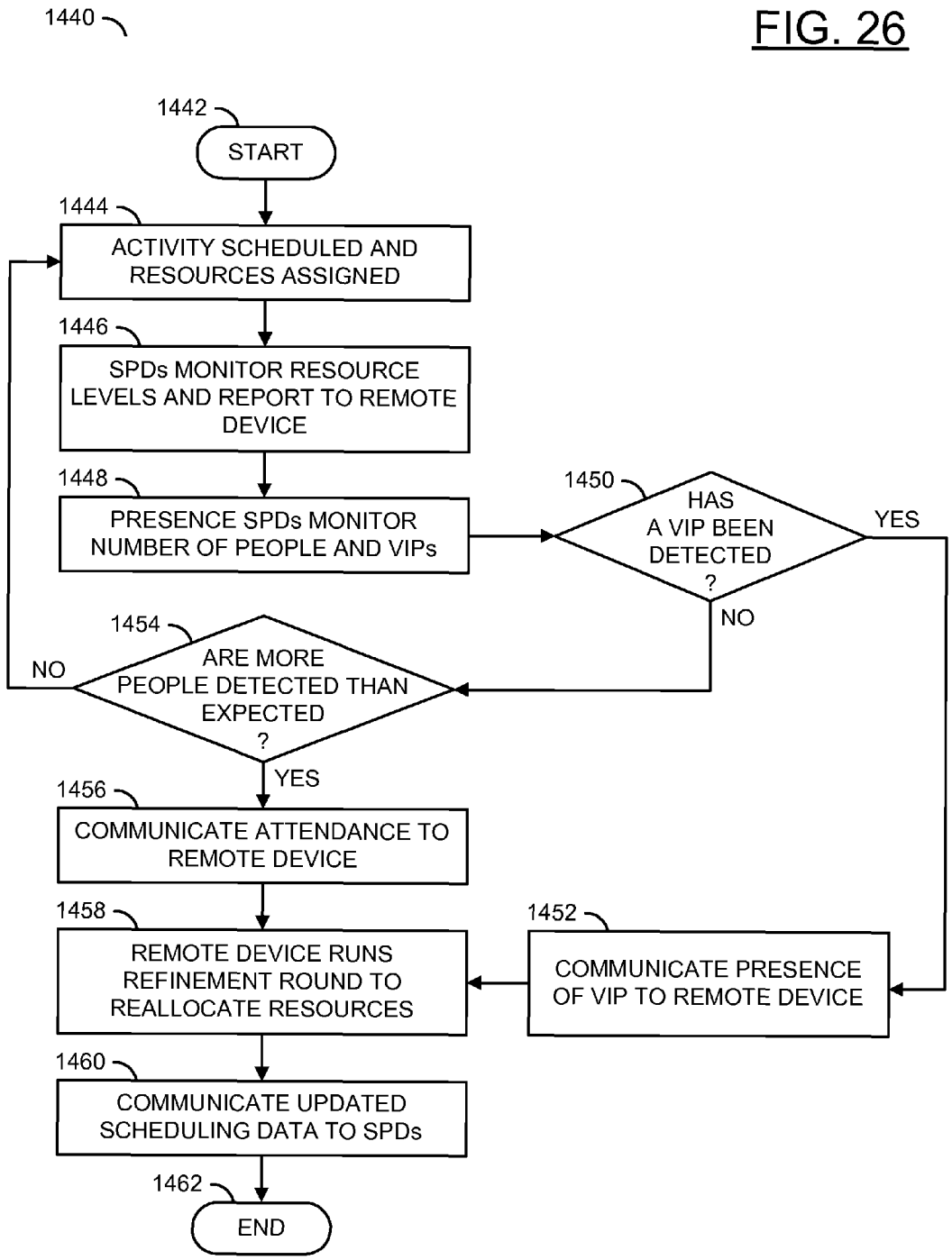

PREDICTIVE POWER MANAGEMENT IN A WIRELESS SENSOR NETWORK USING PRESENCE DETECTION

This application relates to U.S. Ser. No. 14/169,464, filed Jan. 31, 2014, which relates to U.S. Ser. No. 14/103,209, filed Dec. 11, 2013, which relates to U.S. Ser. No. 13/946,414, filed Jul. 19, 2013, now U.S. Pat. No. 8,850,242, which relates to U.S. Ser. No. 13/406,469, filed Feb. 27, 2012, now U.S. Pat. No. 8,516,279, which relates to U.S. Ser. No. 12/472,327, filed May 26, 2009, now U.S. Pat. No. 8,127,158, which relates to U.S. Ser. No. 11/443,668, filed May 30, 2006, now U.S. Pat. No. 7,539,882, which relates to U.S. Provisional Application No. 60/685,976, filed May 30, 2005. U.S. Ser. No. 14/169,464, filed Jan. 31, 2014, also relates to U.S. Ser. No. 14/090,099, filed Nov. 26, 2013. Each of the mentioned applications are hereby incorporated by reference in their entirety.

FIELD OF THE INVENTION

The embodiments disclosed herein relate to power management in self-powered electronic devices, and, in particular, to predictive power management in self-powered electronic devices that include power saving features using presence detection.

BACKGROUND OF THE INVENTION

Private and public networks, such as the Internet, continue to grow at an exponential rate. These rapidly expanding networks consume a tremendous amount of power, which is typically supplied from traditional electrical power grids. As such, most networked computers are either tethered to electrical wall outlets or require periodic charging at electrical wall outlets. Many networked computers, however, have benefitted tremendously by being self-powered. For example, emergency communication systems, computing devices in rural areas where access to traditional power sources is limited, etc.

However, current self-powered devices, such as devices that obtain energy from solar power, typically waste much of their power communicating with other networked computing devices. As such, it would be highly desirable to provide a self-powered device (SPD) that consumes less power when communicating with other devices in a network.

Wireless sensor networks have been proposed for a wide range of monitoring applications in various industries, such as health care, energy, transportation, infrastructure, agriculture, security, the environment and many other fields. Billions of active sensors have been installed that can wirelessly connect to networks and capture data. Such an installed base of sensors creates issues such as powering such sensors as well as transporting and storing the data received from the sensors.

Various conventional approaches have been developed in response to particular constraints. Microelectronics companies are concerned with creating low power devices with energy harvesting technologies and improved batteries. Communications companies are continuing to build networks with more radio towers, improved data compression and adherence to interference regulations. Cloud computing companies are developing approaches for storing more data with data structures suited for the expected exponential growth in capturing data. Such conventional approaches are unlikely to be sufficient with the grand vision of the "Internet of Things". The communications bandwidth (and data storage on the Internet to implement such an approach) could include hundreds of times as many sensors as conventional smartphones, potentially consuming the highest amount of energy of the Internet.

Most conventional approaches are based on autonomous sensor nodes that are always on and capture and transmit large amounts of sensor data to a network that always needs to be listening and recording the transmissions. The network then needs to relay back an acknowledgment to the sensor that the data was accurately received. If scaled to a trillion sensors, a huge number of devices would need to be implemented with batteries that would be unaffordable (or at least inconvenient) to change. A huge amount of traffic on already congested networks would further increase the power needs of each device, since higher antenna output would likely be needed to overcome interference and noise.

Different approaches are needed. The motivation of a better approach stems from a more fundamental question—Why do we need all of this data anyway? The data and related power needs of capturing, transmitting and recording data are highly context and application dependent. Most conventional sensors blindly capture and transmit data. Such sensors assume the application needs or knows what to do with that data. Some data inevitably are more important than others. The importance of data can vary with time and with the knowledge embedded in the application.

It would be desirable to implement a predictive power management in a wireless sensor network.

SUMMARY OF THE INVENTION

The present invention concerns a system comprising a plurality of self-powered devices and a plurality of proximity self-powered devices. The plurality of self-powered devices may be configured to (i) perform instructions, (ii) store scheduling data and (iii) select one of a plurality of modes of operation. The proximity self-powered devices may be configured to (i) detect a presence and (ii) select one of a plurality of modes of operation. The plurality of self-powered devices may select one of the plurality of modes of operation based on (i) the stored scheduling data and (ii) the presence detected by at least one of the plurality of proximity self-powered devices.

BRIEF DESCRIPTION OF THE DRAWINGS

For a better understanding of the disclosure herein, reference should be made to the following detailed description taken in conjunction with the accompanying drawings, in which:

FIG. 26 is a flow diagram illustrating a method for reallocating resources based on presence detection.

Like reference numerals refer to the same or similar components throughout the several views of the drawings.

DETAILED DESCRIPTION OF EMBODIMENTS

Figure 17:
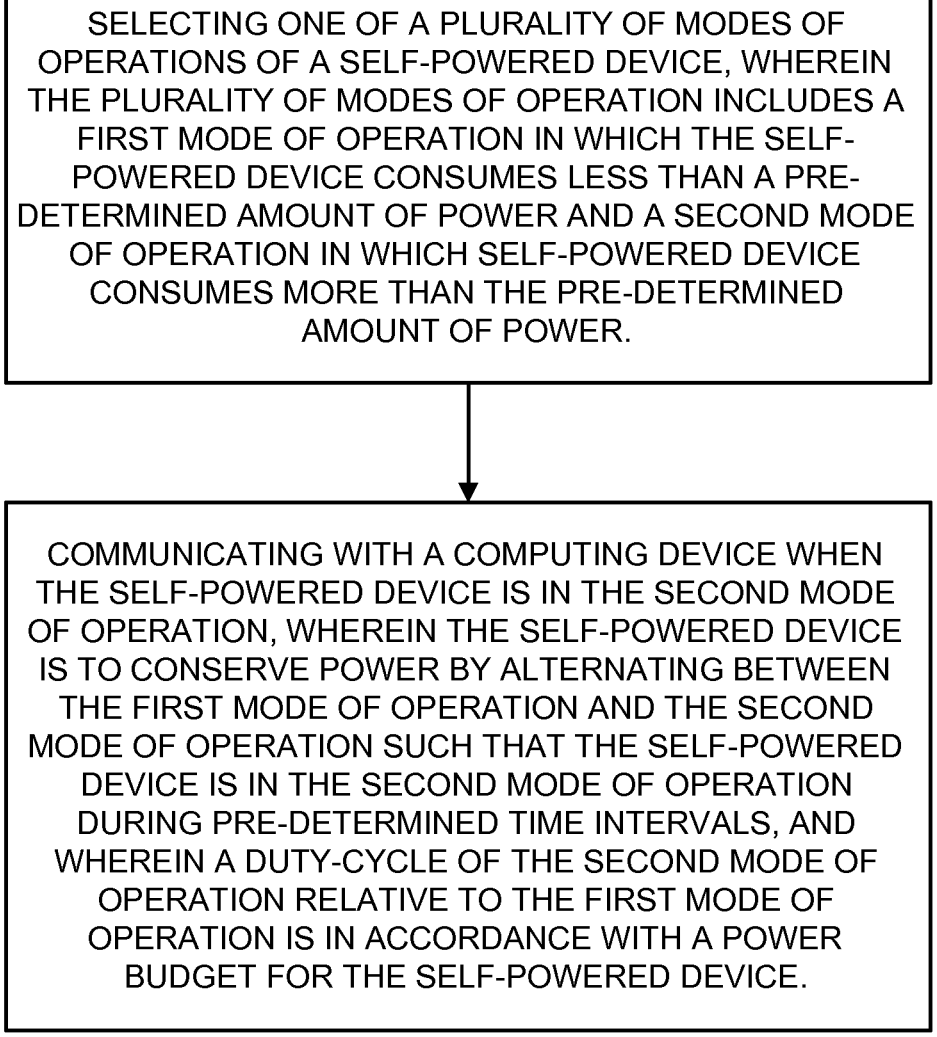
FIG. 17 is a flow chart of a method for managing power consumption.

Embodiments of self-powered systems, devices, and methods are described herein. The self-powered system may include a computing device that selectively communicates with a self-powered device. The self-powered device may include: a circuit to power the self-powered device; memory; a processor; and a program mechanism that is stored in the memory for execution by the processor. The program mechanism may include instructions for selecting one of a plurality of modes of operation, including a first mode of operation in which the self-powered device consumes less than a pre-determined amount of power and a second mode of operation in which self-powered device consumes more than the pre-determined amount of power. (See FIG. 17).

Embodiments of the invention provide a context-aware and/or power-aware wireless sensor network system that enables application needs to determine which data is captured, transmitted and/or stored at the edge of the wireless sensor network. Such an implementation may result in lower power usage, lower bandwidth usage, less interference, and/or less storage and/or processing capacity in the cloud. The determination of which data is important may change and may be determined based on context and/or knowledge. The sensor system is highly adaptable. A software application can reprogram the sensor nodes with new instructions as data needs change and/or grow more complex. Additionally, the power management of the sensor nodes is application-driven to prioritize limited power resources according to the application needs. Power resources may be calculated based on available energy, a power budget, predicted future power needs and/or energy harvesting opportunities.

The program mechanism may further include instructions for communicating with the computing device when the self-powered device is in the second mode of operation. The self-powered device may conserve power by alternating between the first mode of operation and the second mode of operation such that the self-powered device is in the second mode of operation during pre-determined time intervals. A duty-cycle of the second mode of operation relative to the first mode of operation may be based on a power budget for the self-powered device.

The computing device and the self-powered device may be synchronized such that transmit circuits and receive circuits in the computing device and the self-powered device are to communicate signals during one or more of the pre-determined time intervals or adaptively-determined time intervals. In some embodiments, the synchronization includes use of a Network Time Protocol. In some embodiments, the synchronization includes a Wi-Fi periodic beacon signal.

The computing device may poll the self-powered device during one or more of the pre-determined or adaptively-determined time intervals.

The self-powered device may switch to the second mode of operation prior to one or more of the pre-determined time intervals or adaptively-determined time intervals, and the self-powered device may switch to the first mode of operation after one or more of the pre-determined or adaptively-determined time intervals.

In some embodiments, the self-powered device further includes instructions for determining a periodicity of the pre-determined time intervals or adaptively-determined time intervals in accordance with signals provided by the computing device, and the duty-cycle is further determined in accordance with the periodicity.

In some embodiments, the self-powered device further includes instructions for combining messages that are to be communicated to the computing device in order to reduce a communication overhead.

In some embodiments, the system further includes one or more additional self-powered devices and a coordination element. The coordination element may assign communication priorities to the self-powered device and the one or more additional self-powered devices in accordance with power budgets for these devices.

In some embodiments, the self-powered device further includes instructions for providing an acknowledgment message to a sending self-powered device with a higher priority than other types of messages.

In some embodiments, a circuit converts an external energy source into signals that power the self-powered device. The external energy source may include light.

In some embodiments, the circuit includes a component, such as a photovoltaic cell, a wind energy generator, a thermo-electric energy generator, a kinetic energy generator, a piezoelectric device, a magnetic energy generator, and/or a chemical-to-electricity generator.

In some embodiments, the computing device provides control information to the self-powered device.

In some embodiments, the self-powered device includes one or more sensors. The sensor may measure a characteristic, such as temperature, humidity, pressure, vibration, light, motion, sound, proximity, flow rate, electrical voltage, and electrical current.

In some embodiments, the self-powered device may provide configuration information to one or more output devices in accordance with the measured characteristic, the internal status of the self-powered device, any received message, elapsed time, local and/or remote user interaction, or a local and/or remote automatic process. The output devices may include a switch, a relay, an electromechanical actuator, a heater, a fan, a speaker, a solenoid, a motor, an electric field generator, a magnetic field generator, and an electro-magnetic field generator.

Reference will now be made in detail to various embodiments, examples of which are illustrated in the accompanying drawings. In the following detailed description, numerous specific details are set forth in order to provide a thorough understanding of the subject matter presented herein. However, it will be apparent to one of ordinary skill in the art that the subject matter may be practiced without these specific details. In other instances, well-known methods, procedures, components, and circuits have not been described in detail so as not to unnecessarily obscure aspects of the embodiments.

The following description describes various self-powered devices ("SPDs"), systems that include SPDs, and methods for operating SPDs and the systems that they operate in. SPDs are devices that are configured to operate solely under power sources from external energy sources, such as light, thermal, kinetic, wind, wave or other energy. In some embodiments, the SPDs may also be powered by battery power and/or using a power line at ~50 or ~60 Hz.

The SPDs may include a variety of features and/or functionality (i.e., hardware and/or software) to conserve power. In particular, the SPDs may use duty-cycle power management in which the SPDs alternate between low and high-power modes of operation based on a power budget. The SPDs may also alternate between many different power-consumption modes. Furthermore, the SPDs may communicate with computing devices during communication windows. This communication may be periodic and may utilize pre-determined time windows. For systems that include multiple SPDs, a communication priority may be assigned to a given SPD based on its power budget, with a higher priority accorded to devices that have a lower power budget. The SPDs may also combine messages in order to reduce communication overhead and/or give higher priority to providing acknowledgment messages over other types of messages.

Figure 1:
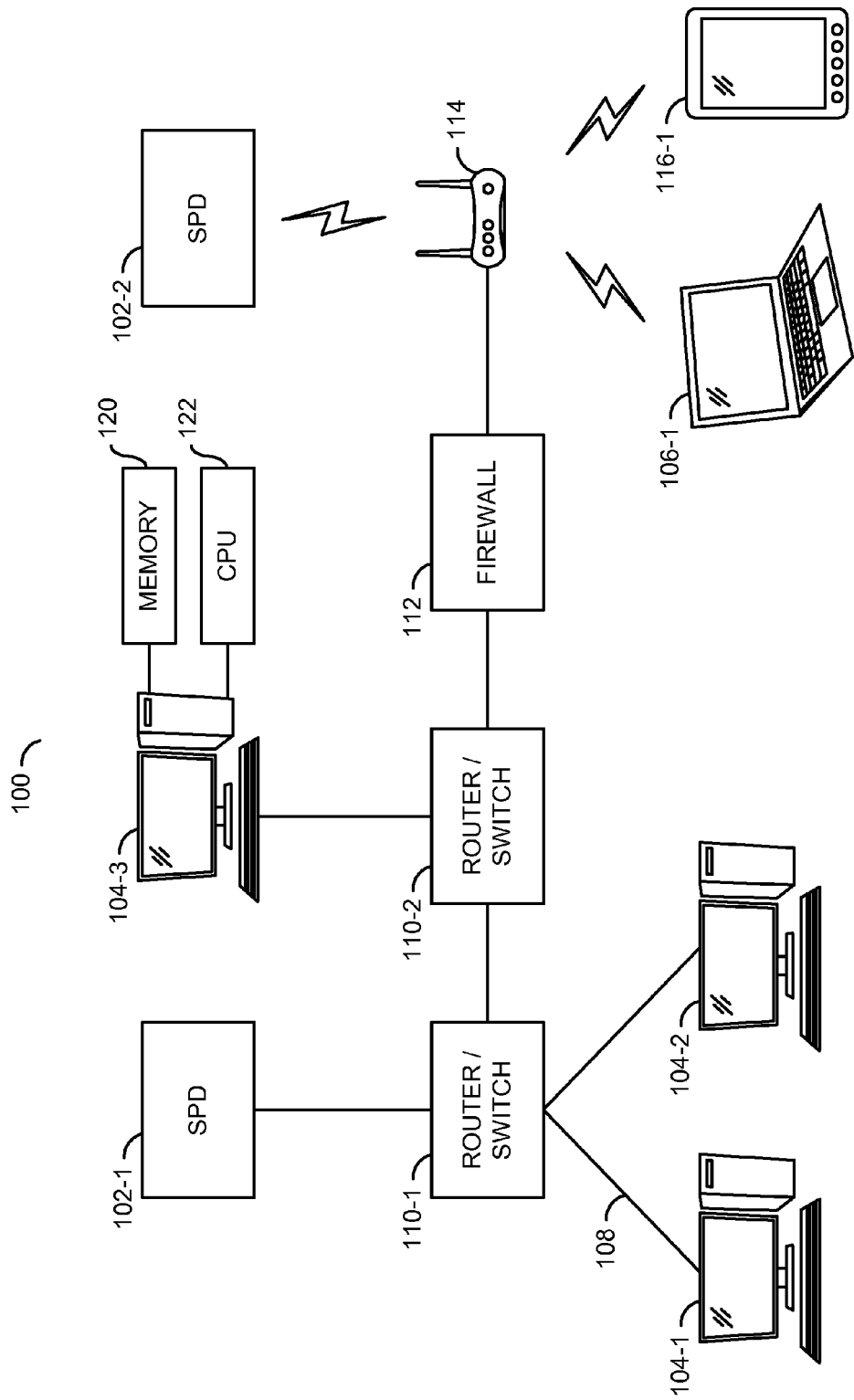
FIG. 1 is a block diagram illustrating an embodiment of a system including one or more self-powered devices.

FIG. 1 is a block diagram of a system 100 including one or more self-powered devices 102. The system 100 may also include other computing devices, such as desktop or stationary computers 104, laptop computers 106, personal digital assistants 116, cellular telephones, or the like. These computing devices may be connected to one another via one or more routers or switches 110, firewalls 112, wireless access points 114, fixed network connections 108, or other computer networking equipment, such as computers, cables, switches, firewalls, routers, bridges, gateways, or the like. These computing devices are generally located remotely from the SPDs 102.

In some embodiments, the system 100 has a single connection link between a SPD (such as SPD 102-1) and a remote computing device (such as computing device 104-1), while in other embodiments there may be many wired and/or wireless links between one or more of the SPDs 102 and the computing devices 104, such as Universal Serial Bus (USB), Firewire, Ethernet, coaxial cable, copper telephone line, optical fiber, wireless, infra-red, or the like. For example, SPD 102-2 may couple to the system 100 via a WiFi (Wireless Fidelity—IEEE 802.11x wireless networking protocol) access point 114. Also, the system 100 may communicate over private or public networks, such as an intranet and/or the Internet.

Figure 2:
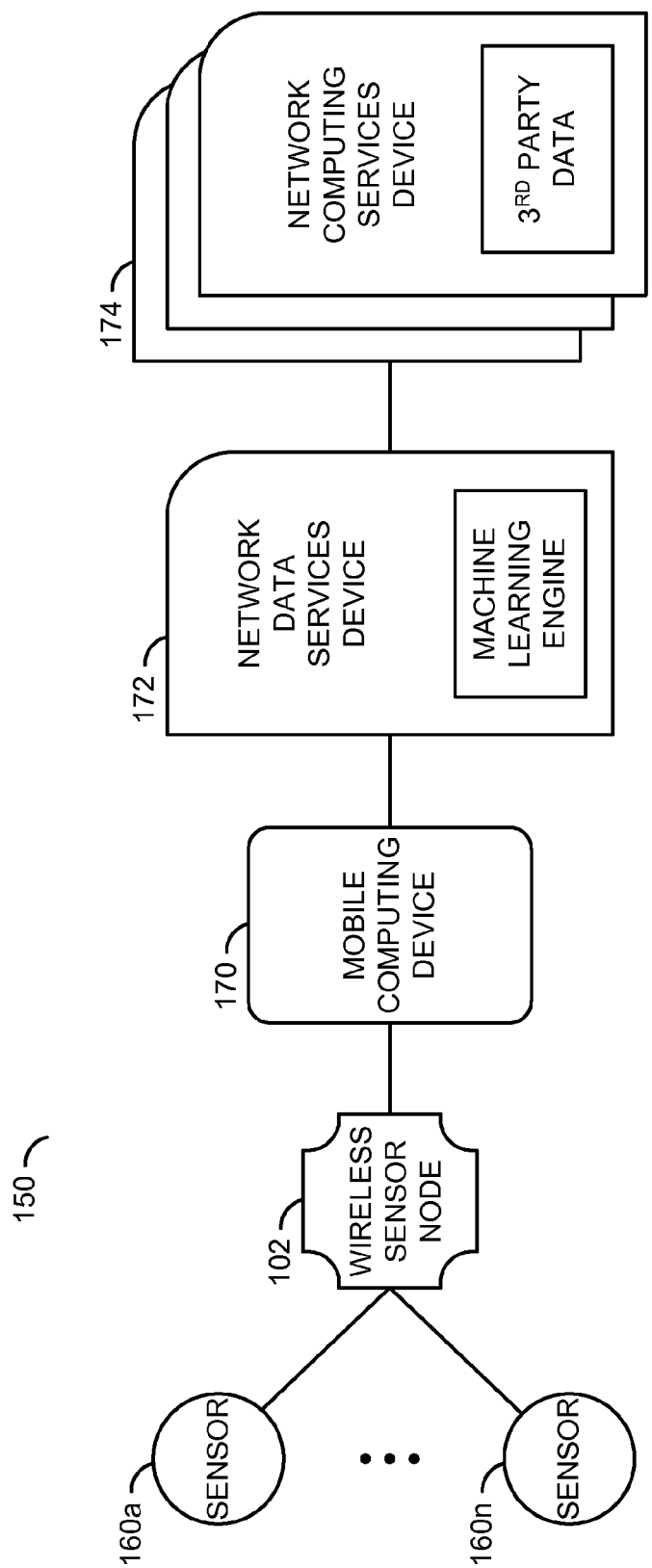
FIG. 2 is a block diagram illustrating a context of the invention.

Referring to FIG. 2, a block diagram of a system 150 is shown implementing a context of the present invention. The system is shown comprising a block 170, a block 172, a block 174, and a block 102. The block 170 may be implemented as a mobile computing device. The block 172 may be implemented as a network data services device. The block 174 may be implemented as a network computing services device. The block 102 may be implemented as a self-powered device, such as a wireless sensor node. In one example, the SPD 102 may be implemented as part of the mobile computing device 170. The SPD 102 is shown receiving inputs from a number of blocks 160a-160n. The blocks 160a-160n may be implemented as sensors. The sensors 160a-160n may also be referenced as sensors A, B, C, etc. The block 160a may represent (or capture) a contextual logic signal. Another block (e.g., 160b) may represent (or capture) a beacon signal. The block 160n may represent (or capture) a proximity signal. Various other signals may be captured by the sensor node 102.

Figure 3:
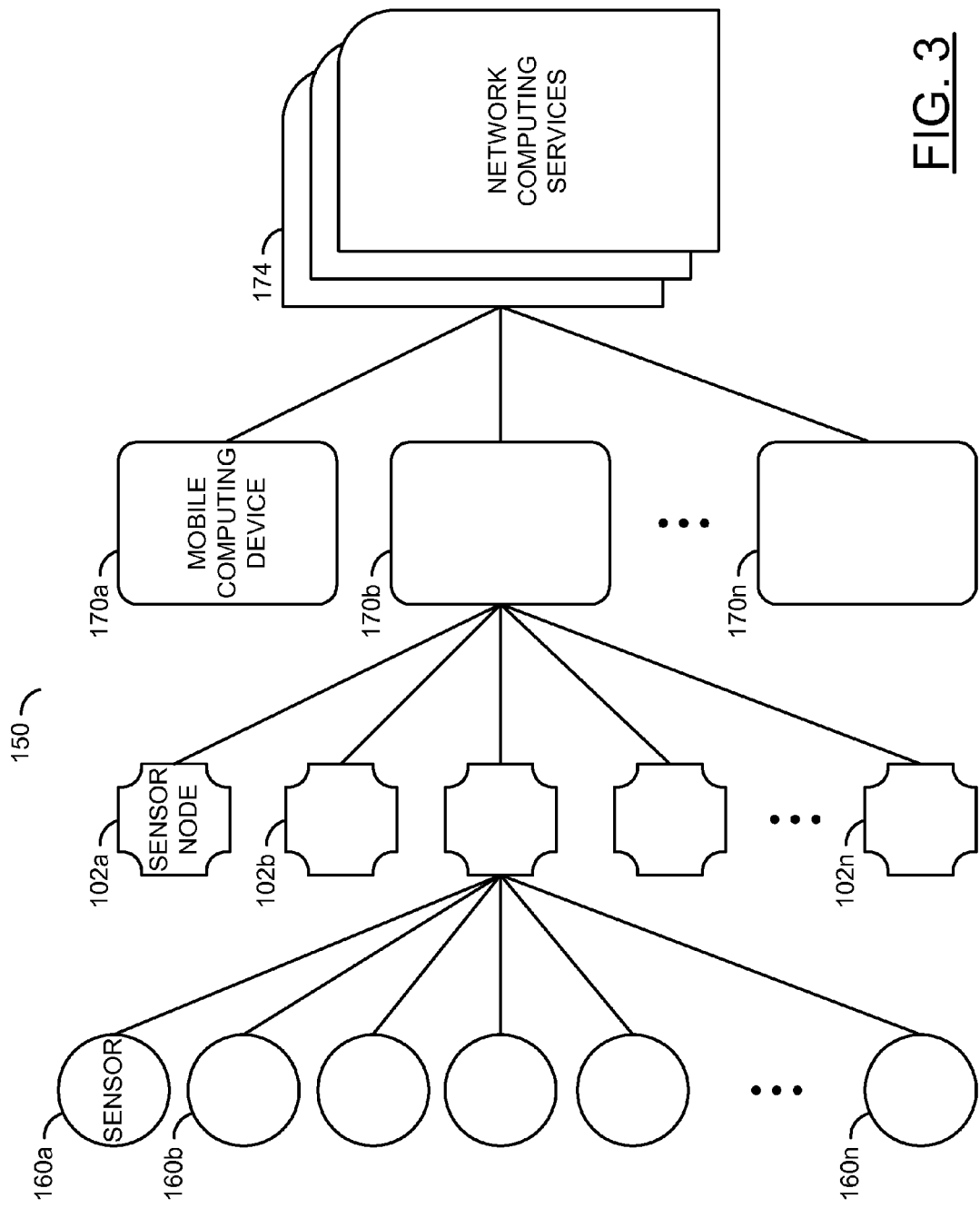
FIG. 3 is a block diagram showing an implementation with multiple sensor nodes.

Referring to FIG. 3, a diagram illustrating a plurality of sensor nodes 102a-102n is shown. The sensor nodes 102a-102n may be implemented as SPDs. The sensor nodes 102a-102n are shown connected to a mobile computing device 170b. However, some of the sensor nodes 102a-102n may be connected to a mobile computing device 170a, while others may be connected to the mobile computing device 170b, while still others may be connected to a mobile computing device 170n. The particular number of sensor nodes 102a-102n and wireless computing devices 170a-170n may be varied to meet the design criteria of a particular implementation.

Each of the sensor nodes 102a-102n may have a power budget based on predicted energy input and/or energy output needs. For example, an energy input need may be a function of past patterns and/or cycles as well as predictable future opportunities to harvest energy from the environment (e.g., weather and/or day/night/seasonal patterns on a photovoltaic device, etc.), at least up to the storage capacity. The predicted energy expenditures may also be based on the predicted power consumed given known upcoming calendar and/or event data as well as other inputs.

A context-aware activation signal may be used to wake up the device 102. The device 102 may begin sensing and/or processing other data, and/or provide power management that is context-aware. A higher priority may be placed on processing certain data. Such data may be data deciding whether to spend more power to transfer the data with less delay and/or more reliability. For example, logic may be implemented to boost radio power based on priority and/or distance from a cellular tower. Such logic may minimize the radio power that may otherwise reduce interference with other sensors.

One or more of sensors 160a-160n may be implemented internally as a beacon signal sensor or as a radiation sensor, a blood glucose sensor, a proximity sensor, chemical/gas sensor, blood pressure sensor, a location sensor, a pollution sensor, a heart rate sensor, a vibration sensor, an air flow sensor, a heart rate variability sensor, an acceleration sensor, a fluid flow sensor, a skin conductance sensor, a position sensor, a direction sensor, a rotation sensor, a weight sensor, a displacement sensor, a machine operations sensor, a fluid retention sensor, a velocity sensor, a leakage sensor, a respiration sensor, a magnetic field, a microphone, an ECG, one or more derived quantities, temperature, image, color, pulse oximetry, physical pressure, odor, drug delivery, air pressure, voltage, container opening, etc. One or more of the sensors 160a-160n, or a combination of the sensors 160a-160n may be implemented internally as part of the sensor node 102 (e.g., within a sensor node housing), or alternatively may be implemented externally (e.g., as a separate sensing device coupled to the sensor node 102). Additionally, the sensors 160a-160n may transmit data directly to a network, in which case the sensor node 102 may receive data as a network data source. Such network data sources may include, for example, environmental or weather data, location-based data, proximity data, etc.

The various sensors 160a-160n may be configured in one of a number of categories, such as a logical condition, a fluid/gas level, a biological process, etc. The logical conditions may be further configured to receive signals from devices such as a beacon, a proximity sensor, a location sensor, a vibration sensor, an acceleration sensor, a position/direction sensor, a displacement velocity sensor, a magnetic field sensor, a temperature sensor, a physical pressure sensor, an air pressure sensor, a force/strain sensor, a moisture/humidity sensor, etc. The fluid/gas level category of sensors may be implemented to receive signals from devices such as a radiation sensor, a chemical/gas sensor, a pollution sensor, an air flow sensor, a fluid flow sensor, a rotation sensor, a machine operations sensor, a leakage sensor, a microphone, an image/color sensor, an odor sensor, a voltage sensor, an electrical sensor, a current sensor, a gyroscope, etc. The biological process category of sensors may be configured to receive signals from devices such as a blood glucose sensor, a blood pressure sensor, a heart rate sensor, a heart rate variability sensor, a skin conductance sensor, a weight measuring device, a fluid retention sensor, a respiration device, and ECG, a pulse oximetry device, a drug delivery device, a container opening device, a medication dispensing device, a microbial device, etc.

Figure 4:
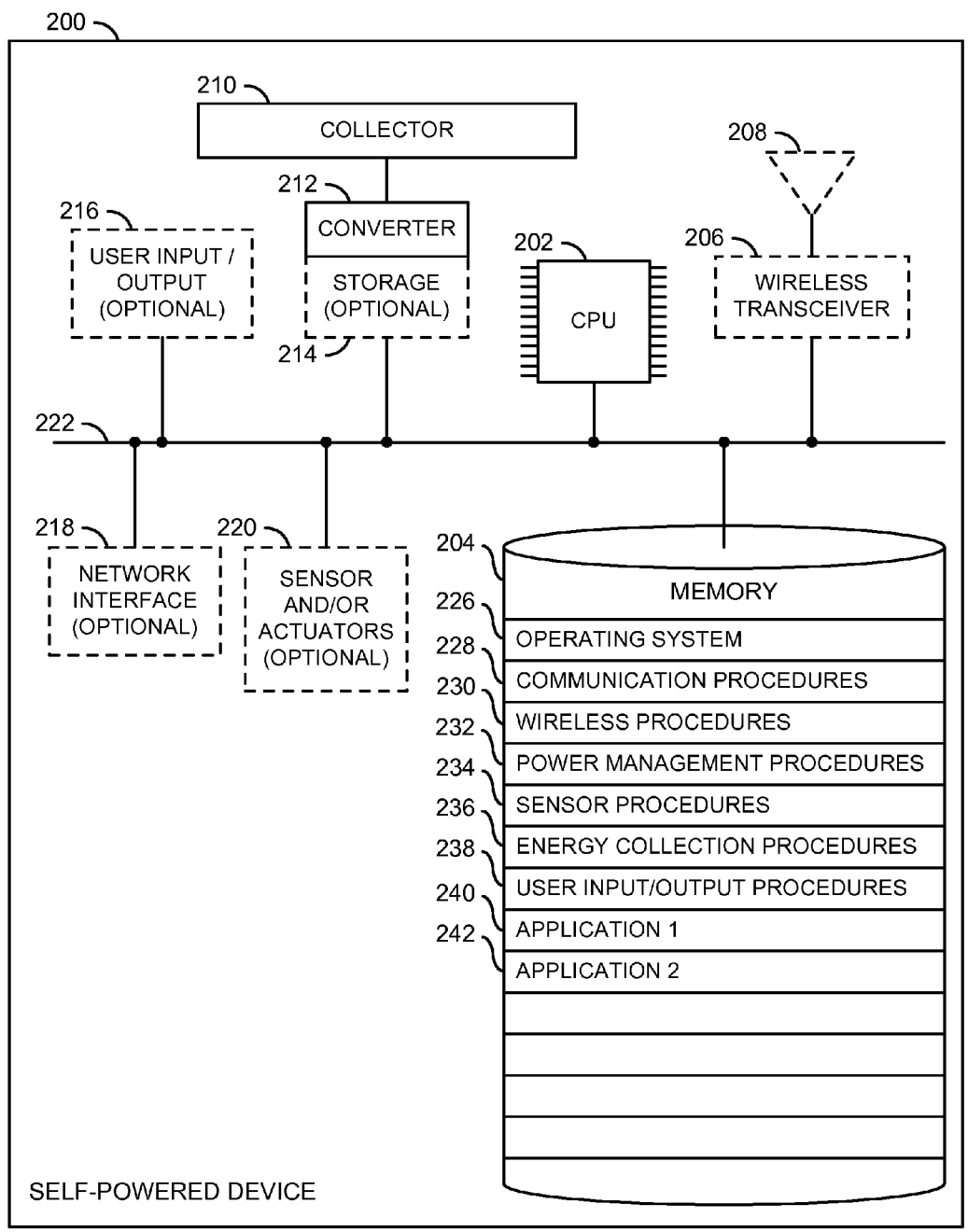
FIG. 4 is a block diagram illustrating an embodiment of a self-powered device.

FIG. 4 is a block diagram of an embodiment of a self-powered devices 102 shown in FIG. 1. SPD 200 contains a plurality of components, such as at least one central processing unit (CPU) 202, memory 204, an optional wireless transceiver 206 coupled to a wireless antenna 208, an energy collector 210, an energy converter 212 with an optional energy storage device 214, optional user input and/or output devices 216, an optional network interface 218, one or more optional sensors and/or output devices like actuators or one or more sensor/actuator interfaces 220 configured to be coupled to the one or more sensors, and at least one bus 222 that connects the aforementioned components. Different embodiments may include some or all of these components. Also in some embodiments, these components are, at least partially, housed within a housing, where the housing may be configured to withstand direct exposure to the elements, such as sun and rain.

The CPU 202 may include programmable or non-programmable circuits, such as ASICs or microcontrollers. This circuitry typically includes non-volatile memory to retain programmed memory 204 functionality, event logs, and/or data, even after a period of power that is insufficient for continued operation. In some embodiments, the data contained in memory 204 may be updated while the SPD is deployed, in response to either local and/or remote instigation, allowing new and/or different capabilities to be added to the functionality.

Using the memory 204, the CPU 202 operates and manages the remainder of the components in the SPD 200. In some embodiments, some SPDs may also operate and manage other SPDs in the system 100 (FIG. 1).

The wireless transceiver 206 includes a transmitter and receiver configured for transmitting and receiving radio signals via the antenna 208.

The energy collector 210 is any suitable mechanism for collecting energy from the surrounding environment in which the SPD is located. For example, the energy collector 210 may include photovoltaic cells that generate electrical energy from light, wind energy generator(s), thermo-electric energy generator(s), kinetic (motion) energy generator(s) (such as piezoelectric devices), magnetic/inductive energy generator(s), chemical-to-electricity generator(s), etc. Furthermore, the energy collector 210 may collect electromagnetic energy from, for example, a system of antenna(s) and rectifying device(s), or other suitable means. In addition, in some embodiments, electrical energy may be collected via signals received through the network interface 218. In other embodiments, energy may be collected from more than one of these sources at the same time, or at different times. Also in some embodiments, energy collection may be supplemented with more traditional power sources, such as replaceable batteries, AC (line) power, an external DC power supply, Power-over-Ethernet, or the like.

In embodiments where the collector 210 generates power from light, the collector may include one or more photovoltaic (PV) cells (also known as "solar cells"). These cells absorb incident radiation (light) and convert that radiation to electrical energy. In addition to the PV cell(s) themselves, the collector may contain any necessary interconnections to form a series and/or parallel array of cells. The properties of the electrical energy generated by a PV cell for a particular intensity of incident light are typically characterized by an open-circuit voltage $V_{OC}$, a short-circuit current $I_{SC}$, and a maximum power delivered $P_{MAX}$, which occurs at a particular output voltage $V_{MAX}$ (where $V_{MAX} \leq V_{OC}$) and output current $I_{MAX}$ (where $I_{MAX} \leq I_{SC}$). (For many PV cells, $I_{SC}$ and $I_{MAX}$ are roughly proportional to the intensity of the incident light across several orders of intensity magnitude, whereas $V_{SC}$ and $V_{MAX}$ are comparatively constant, perhaps changing by a factor of only 2 or 3 across the same large variation of incident lighting conditions).

The PV cells may be based on a number of different technologies, including monocrystalline silicon, multicrystalline silicon, amorphous silicon, thin-film, or other photovoltaic technologies. If the collector 210 uses more than one cell, the cells may be connected together in series to provide a higher voltage than a single cell, in parallel to provide a higher current, or in a hybrid configuration to provide higher current and voltage than a single cell. The cells may be physically arranged at the best possible location to receive incident light, such as above the SPD. In some embodiments, the cells form an integral part of the SPD housing so as to not detract from the appearance of the device. Also in some embodiments, energy collection procedures 236 (described further below) are configured to notify the user of the power output from the collector 210, such that the user may determine the best physical location of the cells for optimal energy collection. For example, the SPD may display an indication or emit an audible tone that varies and/or is representational of the instantaneous collected power. Since the SPD may have the ability to store excess collected energy, the ability to maximize the collected energy over some extended time may be particularly valuable for some SPD applications.

In some embodiments, the SPD 200 is intended to be used over a wide range of lighting conditions, varying from direct sunlight to low-level indoor fluorescent lighting. In these embodiments, the SPD 200 may efficiently collect and convert the incident light energy to usable electricity. Selection of the appropriate type and size of PV cell(s) to use for a particular embodiment of the SPD 200 is typically determined by the corresponding power required, expected radiant light conditions, and cost constraints for that embodiment of the SPD 200.

The energy converter 212 is electrically coupled to the collector 210 and the optional energy storage device 214. The converter 212 converts the energy collected by the collector 210 into a form that is usable by the SPD 200. Typically, this conversion is from one voltage to another, for example from the maximum power voltage (Vmax) of the PV cell(s) to the appropriate supply voltage(s) of the rest of the subsystems in the SPD 200. The storage device 214, which may more generally include an energy storage device such as a battery or capacitor, stores the converted energy for later use by the SPD 200. When excess energy is collected, this excess energy is stored until the battery 214 is fully charged. When there is insufficient energy being collected, the battery 214 provides additional energy until it has discharged or reached a minimum useable level. If the energy from the collector 210 is otherwise deemed adequate for use by the SPD 200, then the battery 214 of the collector may be minimized or eliminated.

For some embodiments, the SPD 200 may need a useful life of many years, and the converter 212 may need to operate over this lifetime without requiring replacement of any internal energy storage device(s), such as the battery 214. This lifetime may need to be maintained over the expected range of operating temperature and humidity, and also after many charge/discharge cycles, in some cases many of these cycles occur every day.

The network interface 218 and/or wireless transceiver 206 may include hardware as well as associated firmware and/or software components. The network interface 218 provides communications connectivity to the remainder of the system 100 (FIG. 1) via wired connections, while the wireless transceiver 206 and antenna 208 provide communications connectivity to the remainder of the system 100 (FIG. 1) via wireless connections. Some embodiments may include both wired and wireless connectivity, while other embodiments may include one or the other. Furthermore, some embodiments may include more than one network interface 218 and/or wireless transceiver 206. In still other embodiments, no network interface 218 or wireless transceiver 206 is provided, as the SPD 200 does not require connectivity to the system 100 (FIG. 1), such as for stand-alone, sense-and-display or sense-and-control applications.

The network interface 218 may be of any suitable type, such as a parallel interface, a serial interface, or the like. These interfaces may be based on a proprietary format or on industry-standard protocols, such as SCSI, printer-style Parallel Port, ESDI, GPIB, PCI, RS-232, Ethernet, I2C, USB, FireWire, Token Ring, DS1, or DS3. For purposes of this discussion, the possible wired connectivity also includes communication through optical fibers. These optical-fiber-based communications protocols may similarly be serial or parallel, and may be based on industry standards (e.g.— Fiber Channel, OC-3, OC-12, etc.) or may be proprietary in nature.

Possible wireless connectivity for the wireless transceiver 206 include radio-based protocols, light-based protocols, magnetic-induction-based protocols, or other methods of communicating that do not require some sort of physical connection. Radio-based interfaces may be based on industry standards, such as Wi-Fi (IEEE 802.11-based protocols), BlueTooth, RFID, and other interfaces known to those skilled in the art, or may be proprietary in nature. Light-based protocols may be industry standard (e.g.—IrDA, or other industry-standard protocols) or may be proprietary in nature.

The user input and/or output devices 216 may include input devices for controlling the SPD 200, such as one or more buttons or switches, a keyboard, a touch screen, a proximity sensor, a microphone, and other input functions known to those skilled in the art, or some combination of these. The user input and/or output devices 216 may also include output devices, such as one or more indicators (such as light-emitting diodes, or passive reflective indicators), multi-digit numeric or alpha-numeric displays, an array of pixels (such as bit-mapped LCD screen or another pixeled array of indicators), speakers, or the like. Inputs and outputs may be initialized and/or updated, through an automatic process and/or through user interaction, and coordinated remotely and/or locally at the installed location.

A number of techniques can be used to conserve the power of the user input/output devices, including operating the output devices at a lower duty cycle or turning the output devices off when available power is low. Depending on the underlying technology, displays may also be dimmed, or operated at reduced contrast or refresh rate, with different encoding/decoding parameters, and other power-conservation techniques known to those skilled in the art. In addition, various forms of input and output functions may be combined, such as the use of proximity sensors as a "user input" so that the display may activate automatically when sensing a user's presence.

The sensory I/O subsystem 220, if present, may include input and/or output functionality. For example, the sensors may include input device(s), such as temperature, humidity, pressure, vibration, light, motion, sound, proximity, flow rate, electrical voltage, and/or electrical current sensors; and/or output device(s), such as relays, electromechanical actuators, heaters, fans, speakers, solenoids, motors, electrical and/or magnetic field generators.

The memory 204 may comprise Random Access Memory (RAM) and/or Read Only Memory (ROM). The memory 204 may include an operating system 226 that has instructions for communicating, processing, accessing, storing, or searching data. Examples of suitable operating systems include embedded LINUX or a proprietary or scaled-down operating system. In addition, memory 204 may include communication procedures 228, wireless procedures 230, power management procedures 232, sensor procedures 234, the energy collection procedures 236, input/output procedures 238, and other applications, such as applications 240 and 242.

The communication procedures 228 are used for communicating with the remainder of the devices in the system 100 (FIG. 1). The communication procedures 228 may also control power management of the wireless transceiver 206 and/or network interface 218, protocol implementation and participation (such as with 802.11b, etc.), persistent network interface or wireless operating parameter management, network interface statistics management, bridging/routing functions, encryption and security services, etc.

The wireless procedures 230 may work in conjunction with the communication procedures 228 to facilitate wireless communication between other devices in the system 100 (FIG. 1) and the SPD 200. In some embodiments, the SPD 200 may also include a wireless network adapter, for example, as at least part of a printed circuit board that controls communication at the data link level (OSI layers 1 and 2) between an external computing device and the SPD 200.

For some embodiments of the SPD, conserving power is of utmost importance. In these embodiments, numerous techniques may be used to reduce power consumption. One or more of these techniques may be implemented using hardware and/or software, such as the power management procedures 232. For example, power consumption may be reduced by maximizing gain of the passive input components; coalescing messages; explicit attention to latencies; access point placement; duty cycling and/or sleep modes; priority ranking based on power levels; static and/or dynamic tokenization of commonly exchanged information blocks; static and/or dynamic distillation of repeated information blocks; periodic (versus continuous) transceiver enable; peer-forwarding based on power disparities; gateway routing based on power disparities; and other power-conservation techniques known to those skilled in the art.

Thus, in some embodiments, the power management procedures 232 are used to reduce power consumption by the SPD 200 by (i) initiating a series of prioritized shutdowns of partial or entire subsystems when the available power from the collector 210 and/or battery 214 becomes insufficient to keep the SPD 200 fully powered, and/or (ii) ensuring partial or entire subsystems are powered back on when sufficient power again becomes available to support additional operation usually according to the priority of each function in the subsystem.

The sensor procedures 234 are used to measure variables from the sensors and/or communicate with output devices. For example, the procedures may be monitoring the sensors for ambient and/or external stimuli, collecting and formatting the information, and then initiating any appropriate action based on that input information. For the output function(s), these procedures initiate, modify, and/or terminate the operation of the output device(s). In conjunction with the power management procedures 232, the sensor procedures 234 also manage the power consumption and operating characteristics of the sensors and/or the output devices 220.

The energy collection procedures 236 are used to control and manage energy collection and storage, such as by (i) monitoring the voltage and current produced by the collector 210 and, based on the known properties of the collector 210, determining the intensity of the input energy (light, heat, motion, etc.) to the collector 210 as well as the overall energy being made available to the SPD 200, (ii) ensuring that the current drawn from the collector 210 is adjusted to maximize the power extracted from the collector 210, (iii) ensuring that the storage device 214 (if present) is properly charged, and/or (iv) monitoring and controlling the available energy stored in the battery 214, etc.

The user input/output procedures 238 control and manage the user input/output devices 216, such as by collecting and formatting (thresholding, debouncing, etc.) the user input, and initiating any appropriate action based on that input. For the output function(s), these procedures are responsible for any necessary formatting/construction of the information to be displayed, as well as updates of that displayed information. In addition to these primary functions, these procedures in conjunction with the power management procedures 232 manage the power consumption of the user input/output devices 216.

Figure 5:
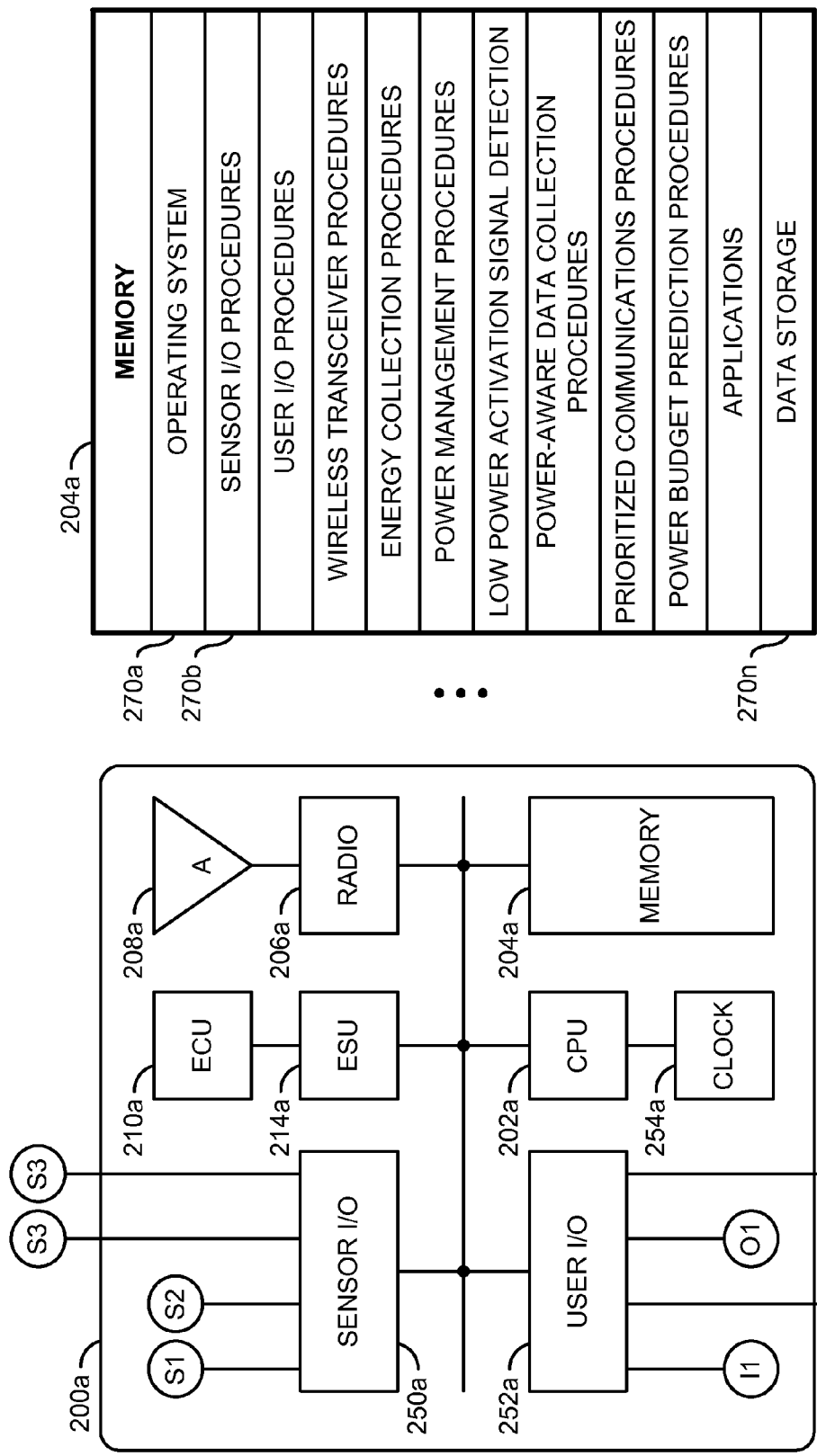
FIG. 5 is a more detailed diagram of one of the sensor nodes.

Referring to FIG. 5, a more detailed diagram of one of the sensor nodes 102a is shown as a block (or circuit) 200a. Each of the self-powered sensor nodes 102a-102n may include a processor, an RF transceiver, an energy storage unit, one or more sensors and a memory. The memory may store a set of instructions executable by the processor to evaluate and selectively store sensed data in the memory or transmit sensed data based on sensor data values and the stored instructions. The remote computing device 170 may be located separately from the sensor node 102a. The device 170 may be selectively coupled to one of the sensor nodes 102a-102n to collect stored data and/or to transmit new instructions to the sensor node.

The sensor node 200a is shown comprising a block 202a, a block 204a, a block 206a, a block 208a, a block 210a, a block 214a, a block 250a, a block 252a, and a block 254a. The block 202a may be implemented as a CPU (or processor) circuit. The block 204a may be implemented as a memory. Details of the memory 204a are shown by the blocks 270a-270n. The block 206a may be implemented as a radio. The block 208a may be implemented as an antenna. The antenna 208a and the radio 206a may form a transceiver. The block 210a may be implemented as an energy capture unit (ECU). The block 214a may be implemented as an energy storage unit (ESU). The block 250a may be implemented as a sensor I/O. The block 252a may be implemented as a user I/O circuit. The block 254a may be implemented as a clock generation circuit.

The output portion of the user I/O 252a may be configured to preset one or more signals to a speaker, a display, an LED, a vibrator, an actuator, an electrical field, a magnetic field, etc. The signals presented to the I/O 252a may be an electrical signal (such as a DC signal), a data signal, etc. The input portion of the user I/O 252a may be configured to receive signals from a microphone, a camera, a light sensor, a motion sensor, a position sensor, a button, a touch screen, a proximity sensor, etc. The signals presented to the I/O 252a may be an electrical signal, such as a DC signal, a data signal, etc.

In one example, the sensor 102 may implement a learning process and/or predictive modeling on the CPU 202a (to be described in more detail in connection with FIGS. 12-14). New rules may be stored in the memory 204a. In another example, the machine learning process(es) may be run on the mobile computing device 170 and/or the network computing services block 174. The processing power and energy to implement the learning process(es) may use more aggregated data and/or processing power than the sensor 102 can process efficiently while running on the energy storage unit 214a. By offloading the processing, the overall energy used by the sensors 102a-102n may be reduced.

Figure 6:
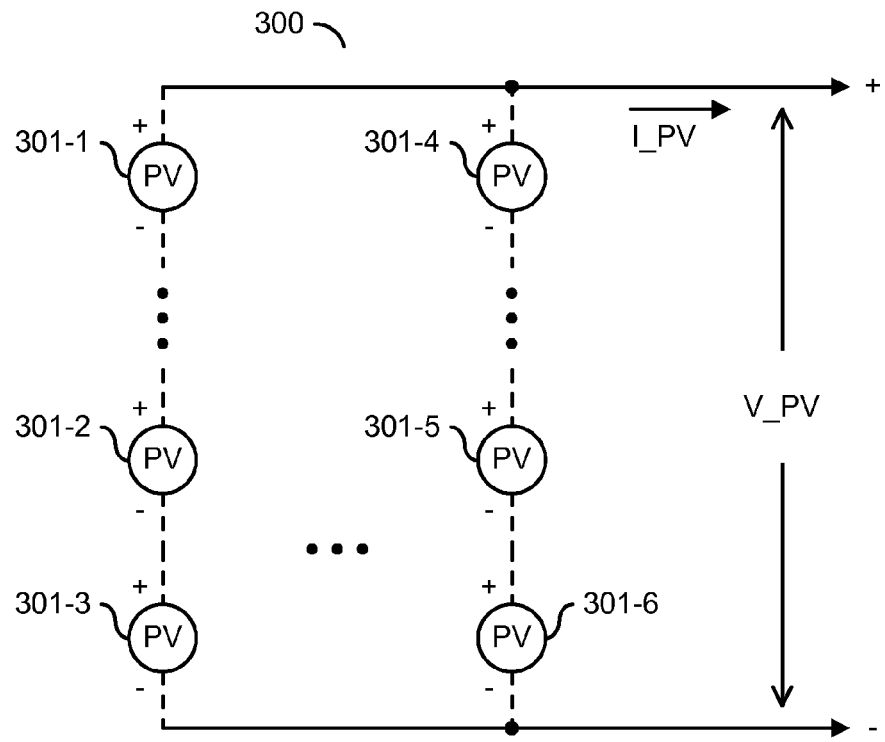
FIG. 6 is a block diagram illustrating an embodiment of a photovoltaic collector of FIG. 4.

FIG. 6 is a block diagram of a photovoltaic collector 300 of a self-powered device, such as the SPD 200 (FIG. 4). As described above, in some embodiments the collector 300 includes one or more PV cells 301 connected together to supply power to the converter 212 (FIG. 4). When illuminated, the interconnected PV cells 301 together produce a current $I_{PV}$ at a voltage $V_{PV}$. In other embodiments, other forms of energy collection and generation of electricity from external energy sources may be used. Whether the generator(s) derive their input power from light, heat, motion, chemical energy, vibration, pressure, network interface communications, other electromagnetic radiation, or some other form of energy, or some combination of these external sources, the electricity produced is characterized by an output voltage at some output current.

An optimal operating point typically exists where the output voltage at a particular output current yields a maximum power from the available input energy and operation at this optimal operating point may be achieved using the methods described below. Furthermore, more than one of these PV cells 301 may be combined as shown using PV cells of the same or different types. Furthermore, in some embodiments, switching mechanisms are provided so that the presence of one set of PV cells 301 do not adversely affect the operation of another set of PV cells 301, such as when one set is operating, and another set is not operating.

Figure 7:
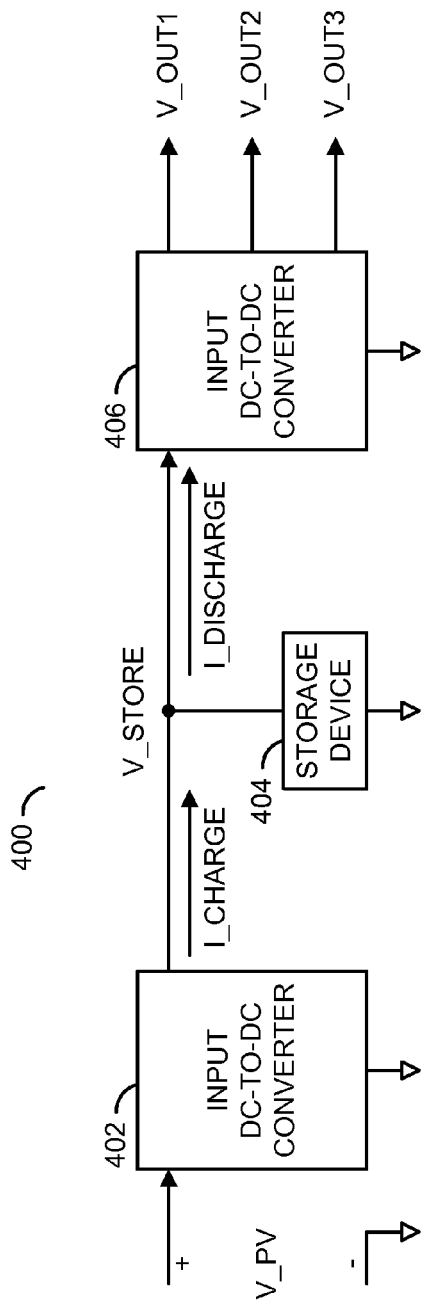
FIG. 7 is a block diagram illustrating an embodiment of a converter and storage system of FIG. 4.

FIG. 7 is a block diagram illustrating an embodiment of a converter 400, such as the converter 212 (FIG. 4). In some embodiments, the converter 400 includes an input DC-to-DC converter 402, a storage device 404, and an output DC-to-DC converter 406. The input DC-to-DC converter 402 transforms the current coming from the collector at $V_{PV}$ to the voltage $V_{STORE}$ of the storage device 404. The output DC-to-DC converter 406 transforms the current flowing from the storage device 404 to the voltage(s) used by the other subsystems in the SPD, known as $V_{OUT1}$, $V_{OUT2}$, etc. These output voltages may be the same or different depending on the requirements of the SPD. If present, the storage device 404 includes one or more physical rechargeable storage devices interconnected in series and/or parallel that meet the requirements of that embodiment. One should note that in some embodiments, a storage device may not be required. In these embodiments, all that is required is to convert the input voltage derived from the collector 210 (FIG. 4) to the output voltage required by the rest of the subsystems in the SPD. Additionally, other embodiments do not require the input DC-to-DC converter 406 if the optimal voltage supplied by the collector 210 (FIG. 4) is within a predefined acceptable range. Likewise, some embodiments do not require the output DC-to-DC converter 406 if the rest of the subsystems in the SPD are able to operate using the output voltage from the storage device 404.

Figure 8:
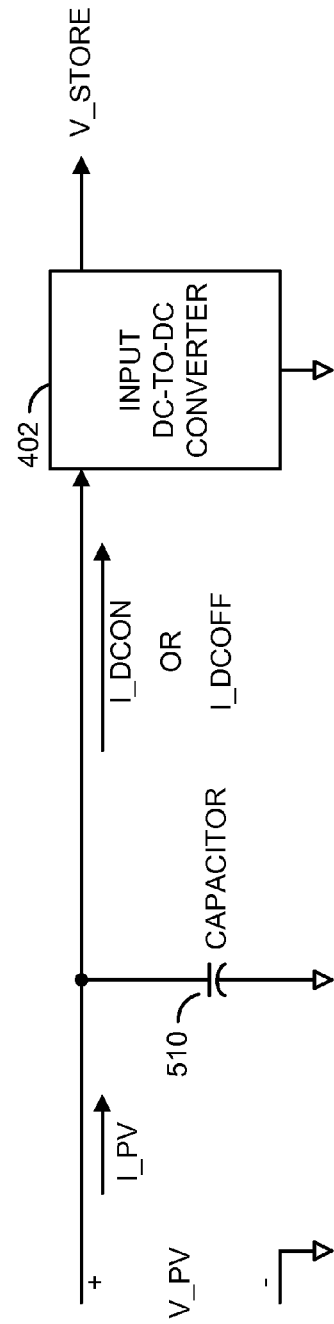
FIG. 8 is a block diagram illustrating an embodiment of the current flow from the collector of FIG. 4.

FIG. 8 is a block diagram illustrating an embodiment of the current flow 500 from the collector 210 (FIG. 4). In order to maximize the power taken from the collector 210 (FIG. 4), the converter 212 (FIG. 4) attempts to maintain the current flowing from the PV cells 301 (FIG. 6) at about $I_{MAX}$, which yields a voltage of approximately $V_{MAX}$. Since the optimal voltage $V_{MAX}$ of the collector 210 (FIG. 4) may be different from the voltage $V_{STORE}$ of the storage device 404 (FIG. 7), some embodiments may make use of a DC-to-DC converter (as described above) to make the voltage transformation, preferably with minimal power loss. Suitable DC-to-DC converters operate in a switching mode, which is to say that they periodically draw some current to "charge" an inductor, then "discharge" that current (at a different voltage) into the load. These two operations may then be repeated when more power needs to be transferred.

For DC-to-DC converters, the time that the current is being drawn into the converter to charge the inductor may be referred to as $T_{ON}$, and the time that the DC-to-DC converter is transferring the stored charge to its load (or is otherwise waiting for the next cycle to begin) may be referred to as $T_{OFF}$. The full cycle time of the converter may be expressed as $T_{ON}+T_{OFF}$. Similarly, the current drawn into the DC-to-DC converter when it is on may be referred to as $I_{DCON}$, and the current drawn into it when it is discharging its inductor to the load (or it is otherwise waiting for the next cycle to begin) may be referred to as $I_{DCOFF}$. In order to maintain the maximum power output from the collector, the time average of these two converter input currents may be kept to about $I_{MAX}$.

For most switching DC-to-DC converters, $I_{DCOFF}$ is approximately equal to 0, and assuming that the converter is on for only a small fraction of its full cycle time ($T_{ON}+T_{OFF}$), the $I_{DCON}$ usually needs to be greater than $I_{MAX}$. Unfortunately, for a DC-to-DC converter operating in these conditions connected directly to the collector 210 (FIG. 4), the current drawn alternates between $I_{DCON}$ during $T_{ON}$ and approximately 0 during $T_{OFF}$, neither of which are the optimal current $I_{MAX}$. Therefore, to maintain the optimal current drawn from the collector at about $I_{MAX}$, a capacitor 510 or other charge-storage device may be connected across the output of the collector, as shown. With the addition of the capacitor 510, when the DC-to-DC converter is on, the net current into the capacitor is $I_{PV}-I_{DCON}$. Since $I_{DCON}$ is typically greater in magnitude than $I_{PV}$, the capacitor 510 is therefore discharging during $T_{ON}$. During $T_{OFF}$, typically $I_{DCOFF}\approx0$, so the net current into the capacitor 510 is $I_{PV}-I_{DCOFF}\approx I_{PV}$, and the capacitor 510 is charging. The average value of the current into the capacitor 510 may be expressed as $$\frac{(I_{PV}-I_{DCON})\cdot T_{ON}+(I_{PV})\cdot T_{OFF}}{T_{ON}+T_{OFF}}$$

which may be set to be approximately $I_{MAX}$ for efficient operation of the collector 210 (FIG. 4). For large capacitances, the drop in the voltage of the capacitor 510 during $T_{ON}$ may be very small, and the rise in the voltage during $T_{OFF}$ may likewise be very small.

Since the average current drawn from the collector 210 (FIG. 4), $I_{PV}$, is now maintained at approximately $I_{MAX}$, the average voltage on the capacitor 510 (and the collector 210 in FIG. 4) is, therefore, approximately $V_{MAX}$. The value of the capacitor 510 is chosen such that the variation in voltage is small enough to be acceptably close to $V_{MAX}$.

As previously stated, the maximum power of one of the PV cells 301 (FIG. 6) typically occurs at a certain current $I_{MAX}$, and at a certain voltage $V_{MAX}$. However, the actual values of this operating point may change with incident light intensity, operating temperature, and may also vary from device to device due to processing and manufacturing differences. This may make it difficult to predetermine the ideal operating point values for any particular device at any particular light intensity and temperature. In some embodiments, the ideal operating point for the PV cell(s) 301 (FIG. 6) may be determined automatically and, furthermore, may be adjusted automatically as operating conditions change, using the following method.

To determine the power being delivered by the converter 212 (FIG. 4), the energy collection procedures 236 (FIG. 4) periodically measure the current $I_{PV}$ from the collector 210 (FIG. 4), and the voltage $V_{PV}$ on the collector 210 (FIG. 4), and multiplies these two values together. One way to increase the average current drawn by the input DC-to-DC converter 402, usually resulting in a reduced $V_{PV}$, is by increasing the on time of the DC-to-DC converter, $T_{ON}$. Likewise, by reducing $T_{ON}$, the average current drawn from the collector 210 (FIG. 4) may be decreased, allowing $V_{PV}$ to increase. Other means to increase or decrease the average current drawn by the input DC-to DC converter may be used.

To maintain the maximum power from the collector 210 (FIG. 4) under varying operating conditions, the energy collection procedures 236 (FIG. 4) (i) measure the power from the collector 210 (FIG. 4), (ii) increase $I_{PV}$ by a small amount, such as 0.1% to 1% of the full value, (iii) measure the power from the collector 210 (FIG. 4), (iv) if power has increased, go to step (ii) above, otherwise continue, (v) decrease $I_{PV}$ by a small amount, such as 0.1% to 1% of the full value, (vi) measure the power from the collector 210 (FIG. 4), (vii) if power has increased, go to step (v) above, otherwise go to step (ii) above. Using this process, the controller may continuously "hunt" for the maximum power delivered from the collector 210 (FIG. 4). As the operating conditions vary, this procedure may allow those changes to be tracked by the SPD, allowing the energy collection procedures to continuously adjust the operating point of the collector 210 (FIG. 4) in order to achieve maximum power delivery.

To prevent operating at only either the maximum current $I_{SC}$ or the maximum voltage $V_{OC}$, which may happen under very low lighting and/or other extreme conditions, when it may be difficult to determine how the power from the collector 210 (FIG. 4) has actually changed, the procedure may be modified to switch the direction of the "hunt" if the change in $I_{PV}$ value has moved in the same direction for the last 10 or 20 (or other appropriate number of) steps or iterations. This means that under extreme operating conditions, the operating point of the collector 210 (FIG. 4) may be scanned across a wide range of possible operating points to increase the likelihood that the maximum power delivery point is found. In some embodiments, to ensure that the storage device 404 (FIG. 7) in the converter 212 (FIG. 4) is maintained within its safe operating parameters, its voltage and/or current may be continuously monitored by the controller.

When the maximum capacity of the battery 214 (FIG. 4) is reached, the controller typically turns off the input DC-to-DC converter. This may be accomplished by setting the on time $T_{ON}$ of the DC-to-DC converter to approximately zero, or otherwise disabling its operation.

When the energy held in the battery 214 (FIG. 4) gets low, and/or is not otherwise being sufficiently recharged from the collector 210 (FIG. 4), the energy collection procedures 236 (FIG. 4) may reduce the power consumption of the other subsystems in the SPD. In some embodiments, the energy collection procedures 236 (FIG. 4) may compare the energy in the battery 214 (FIG. 4) against one or more predetermined low-energy thresholds, and once the threshold(s) is crossed, the energy collection procedures 236 (FIG. 4) may take one or more action(s) to reduce the energy demand from the battery 214 (FIG. 4), if appropriate.

When the remaining energy in the battery 214 (FIG. 4) drops to the lowest threshold, below which proper operation of the SPD may no longer be guaranteed, in some embodiments, the energy collection procedures 236 (FIG. 4) and/or the power management procedures 232 (FIG. 4) initiate a series of controlled shutdowns of any subsystems that remain on, including the majority of the SPD itself. Once this is accomplished, the SPD may be held in a reset condition, through the use of an automatic circuit until sufficient energy is delivered to the battery 214 (FIG. 4) to allow initiation of SPD startup.

When the energy level of the battery 214 (FIG. 4) transitions from below the lowest threshold to above that threshold, a subset of the SPD may be automatically brought out of reset and may begin to turn on various subsystems of the SPD, typically in a prioritized sequence, depending upon how much energy is in the battery 214 (FIG. 4), and/or how quickly it is being recharged. As increasing energy becomes available in the battery 214 (FIG. 4) and/or more power is available from the converter 212 (FIG. 4), and the various low-power thresholds are overcome, more and more SPD subsystems may be brought out of any low-power states until eventually the SPD may be returned to its full-power mode.

To eliminate unnecessarily repeated or oscillatory transitions between various low-power states, some embodiments may include an appropriate amount of hysteresis to be added to each threshold. This ensures that as a low-power threshold is approached in the decreasing direction, a slightly lower value than the nominal threshold value may be required to be achieved before transitioning the SPD to the next lower-power state. Likewise, when the energy in the battery 214 (FIG. 4) is increasing and that threshold is approached, a slightly higher value than the nominal threshold value may be required to be achieved before transitioning from the previous low-power state. The amount of hysteresis for each threshold level is chosen to minimize oscillatory transitions, yet not make the actual transition points too different from the nominal threshold value.

In a given embodiment, there may be zero or more network interfaces, such as the network interface 218 (FIG. 4) of one or more types. The specific type(s) of network interfaces utilized in an SPD do not necessarily imply a specific network behavior, and may include technologies such as, but not limited to, wired interfaces (RS-232, RS-485, USB, Ethernet, FDDI, Fiber Channel, or any other wire or cable-based protocol, standard or proprietary) and wireless interfaces (Bluetooth, Zigbee, IrDA, UWB, Wi-Fi, GPRS, GSM, CDMA, or any other wireless protocol, standard or proprietary).

Figure 9:
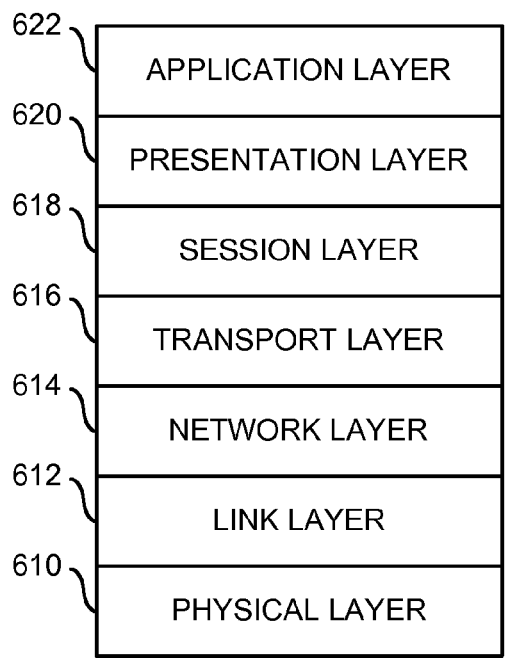
FIG. 9 illustrates an embodiment of a software protocol stack for a network interface of FIG. 4.

As illustrated in FIG. 9, typically each network interface includes the following hardware and software layers, as defined by the classic OSI networking reference model: physical layer 610 (such as RS-232, 100BaseT, T1 and radio), link layer 612 (such as Ethernet, FDDI, Wi-Fi and HDLC), network layer 614 (such as IP, IPX and similar protocols), transport layer 616 (such as TCP, UDP, RTP and SMB). Higher layers, such as session layer 618, presentation layer 620 and application layer 622, may be viewed as part of the client software, so are not discussed as part of the network interface itself.

In many embodiments, one of the key attributes of the network interface may be its operation on an extremely low power budget. This is discussed further below.

Numerous issues may affect power usage in an implementation of the network interface, including range requirements, the amount of power consumed per unit of time, the amount of power consumed per bit conveyed, and any needed networking layer overhead from the associated network interface software stack and its impact on the power consumed in generating, transmitting, receiving, and processing that overhead.

In general, the power consumption of a communication subsystem increases with the amount of data communicated and the distance that the communications traverse. Similarly, a low-bit-rate communications system may generally be designed to consume less power per unit of operating time than a high-bit-rate system, but may have a higher cost per bit communicated. Finally, communication subsystems based on newer, specialized, and/or proprietary communications protocols often consume less power for a given transmission distance or bit rate than existing, general-purpose, and/or standardized protocols.

Keeping in mind these general characteristics, the design, implementation, and usage of each network interface for a particular embodiment of an SPD may have various constraints including (but not limited to): The need for wireless vs. wired operation. The distance required for data transmission. The volume of data to be transferred for the SPD application. The sensitivity of the application to data stream latency. The frequency of communications needed to meet protocol requirements. Any compatibility requirements with installed network infrastructure. The average power available to the network interface subsystem. The tolerable cost and/or size of the subsystem.

Several methods to reduce average power in the network interface subsystem are described here. Embodiments of the SPD may use one, many, all, or none of these methods and strategies. Some strategies outlined are applicable to any network interface technology while others are applicable only to one or some network interface technologies.

One class of radio computer network technology is based on the IEEE 802.11 set of standards, commonly referred to as "Wi-Fi". Versions of this standard support various transmission distances and bit rates, and existing equipment may support more than one version simultaneously. In an exemplary embodiment, therefore, the SPD may be used with one or more IEEE 802.11 "Wi-Fi" Protocols. Implementation in embodiments that support a compatible version of Wi-Fi may typically not require installation of an additional wireless access point(s) in the external computer network. Instead, an existing, i.e., an already-installed, access point(s) may typically be used. In some cases, the access point functionality may already be incorporated into the remote device(s), such as computer devices 104 (FIG. 1), with which the SPD(s) 102 (FIG. 1) communicate.

An additional advantage of using a Wi-Fi radio is that the components needed to implement the radio are often readily available, physically small, and relatively inexpensive. The Wi-Fi data rate may also be high enough for most SPD applications. However, the existing component sets may consume relatively large amounts of power, even when not transmitting. Thus, in some embodiments, various schemes to dramatically reduce the power consumption of the Wi-Fi radio may be employed.

In some embodiments, the SPD includes sleep modes and/or duty-cycle control. Selectively shutting down or turning off some or all of circuits in the physical-layer networking subsystems may offer the ability to reduce power consumption. These features are typically referred to as "sleep modes". The duty cycle of such subsystems is the ratio of the time the subsystem spends in the "on" or "awake" state compared with the total time. Assuming the higher-layer protocols and/or applications may tolerate it, adjusting the duty-cycle of the network interface may allow the controller to reduce power consumption of the subsystem without requiring additional external hardware and/or reconfiguration of the device.

For some network interface technologies, a high-rate of power consumption when active may be more than offset by the low power consumption from remaining in sleep mode the majority of the time and powering the subsystem for the minimum time necessary to affect communication. Thus, for a given amount of data to be transferred, some implementations of the network interface may have a high power-per-unit-of-time cost but may still be efficient in the cost of the power per bit communicated.

This approach accepts a high power draw for short periods of time because it seeks to optimize the power per bit communicated through the network interface. It is possible for such an implementation to consume less average power than an implementation using a low-bit-rate protocol because the network interface may spend substantially less time powered on even though the network interface is drawing more power when it is powered on.

Often, it is not known beforehand when a message must be sent from an SPD to a remote device such as one of the computer devices 104 (FIG. 1) and vice-versa. In particular, if the network interface in an embodiment is operated with duty-cycle control (as described above and further below) then its transceiver spends some of its time active, and some of its time disabled in a sleep mode. If a message is to be properly communicated, the transmitting device must be enabled and the receiving device must likewise be enabled in order to detect the message and properly receive it.

When there are no power consumption constraints, the transceiver circuits in each device may be left enabled all of the time. In some embodiments, however, there may be power consumption constraints, so it may be desirable to use duty-cycle control as a power management technique. To ensure that message communication may occur reliably under these conditions, the duty cycles between the transmitting and receiving devices need to be aligned such that the transceivers are enabled in each device at the same time.

Figure 10:
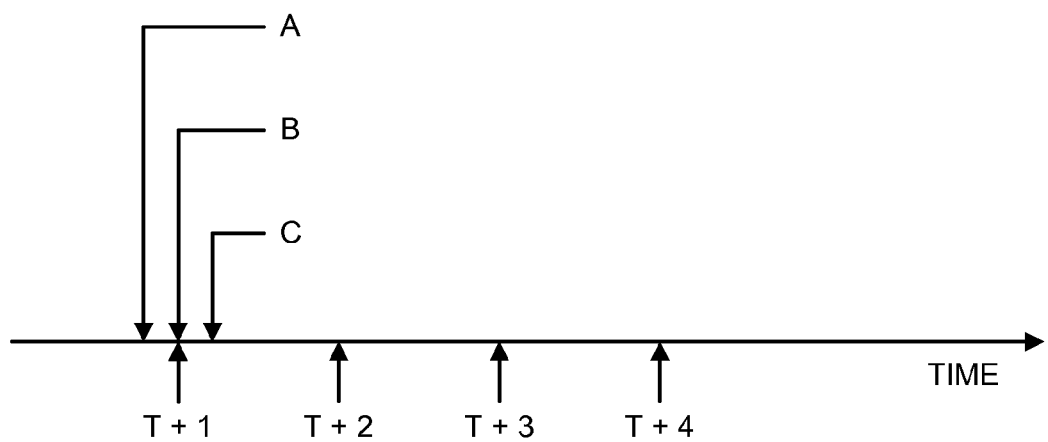
FIG. 10 illustrates periodic enabling of a transceiver of FIG. 4.

By using periodic communication windows, the duty-cycle alignment may be achieved through synchronization. This assures that the transmitter in the sending device and the receiver in the receiving device are enabled at the same time. This is illustrated in FIG. 10, in which (a) transceivers are enabled just prior to the communication time window, (b) communication occurs, often lasting just long enough to initiate a session (see FIG. 9) that will span numerous enable periods, and (c) each SPD shuts down its transceiver as soon as it can, but no later than after some limited period of time.

In some embodiments, therefore, periodic transceiver enabling is used. Different network interface protocols may support such enabling. For example, a sparsely populated Wi-Fi network may be used in conjunction with a periodic beacon signal having an appropriate rate. The periodic beacon signal may be adjustable. The periodic beacon signal notifies some or all radio NICs (the Wi-Fi nomenclature for a remote node versus an access point) of its presence, timestamp, supported rates, capabilities, and an indication of any traffic waiting to be transmitted (TIM). In concert with the beacon signal, a Wi-Fi NIC may be kept in sleep mode for an interval just short of the beacon signal interval, and then be automatically woken-up in time to receive the beacon signal. The NIC may then determine if there is any traffic queued up for it to receive, and then receive the traffic (if any). It may then send the pending items it has queued for transmission (if any) and then go to sleep again until the next beacon signal interval.

In some embodiments, to reduce the power consumed by a Wi-Fi radio subsystem that uses commercially-available chip sets, yet still maintain an adequate communications bit-rate, the radio may be kept in a low-power "off" or "standby" mode as much as possible. In some embodiments, the standby mode may be used the majority of the time. One way to do this is to take advantage of Wi-Fi's beacon feature, described above, whereby the Wi-Fi access point associated with an SPD periodically polls the SPD (and any other associated remote Wi-Fi devices the access point is aware of) at regular pre-set intervals. The beacon signal interval may often be set at once per 100 ms (although a different interval may instead be configured in the access point). By monitoring the beacon signal activity, the SPD determines the beacon signal period. Thus, the SPD knows when the next beacon signal will occur, thus when it must awaken to receive the next beacon signal.

By placing the SPD's radio in a low-power "off" or "standby" mode until just before the beacon signal arrives, the SPD's controller may ensure that the SPD radio is active during the beacon signal time so as to transfer any data to or from the access point, and then return the radio to its low-power state as soon as the data transfer is complete. Assuming the beacon signal interval is not set to be unreasonably short, this strategy may allow the SPD radio to spend the large majority of its time in a very low power state yet still maintain sufficiently low transmission latencies and adequate data throughput to support typical SPD operation.

Some techniques used to reduce power consumption in the network may benefit from having an SPD synchronized in some way with one or more other nodes and/or access points in the network. If all nodes and/or access points participating in the communications exchange are synchronized then they will know when to enable their transceivers for periodic communications.

In one embodiment, synchronization may be achieved using the Network Time Protocol (NTP) that is typically available in computer networks that adhere to the Internet Protocol (IP) set of standards. By utilizing the NTP facilities available in the network, an SPD and other nodes may accurately determine the time of day and, from this information, facilitate their periodic communications.

In another embodiment, synchronization may be achieved by leaving the SPD's network interface receiver enabled long enough to receive several periodic transmissions. By observing the periodicity of the transmissions, the SPD may then enter a sleep state between the periodic transmissions, gradually increasing the length of the intervening sleep states until the duty cycle of the network interface is low enough to achieve the desired power savings but high enough to ensure sufficient probability of being awake during the periodic transmissions.

Moreover, standardized communications between computers typically operate in layers. However, additional layers increase overhead costs that negatively impact efficiency, as measured in terms of payload data communicated per unit of energy and/or power consumed. Coalescing messages is a systems approach to efficiency, and allows for communications to be optimized by having additional knowledge about the communicating devices and/or the protocols they are using to communicate.

In a typical embodiment, messages for various purposes flow between the SPD and one or more remote device(s). In the event that more than one such message is going to the same remote device, it may be possible to examine the pending messages destined for that remote device and combine the messages into a form of multi-block message so that layering overheads are minimized.

Combining or coalescing messages may be combined with periodic transceiver enabling and duty-cycle control to create a natural collection or "queuing" point in time where opportunities for combining the messages prior to communication may be found.

Most messages to and from an SPD may be categorized into various classes. Attention messages include a message from a client node on the network requesting information or service from a server node. Information messages include a message to or from an SPD containing information. This message may be in response to an Attention Message and/or may contain unsolicited information. Ack/Nak Messages include a message to or from an SPD indicating that a previous message is being acknowledged, or negatively acknowledged.

In an exemplary embodiment of coalescing, an information block consisting of 1000 bytes in total of data is to be sent from a remote device to an SPD. Even though the 1000 bytes are to be sent from the same remote device to the same SPD, because of the way the information block is typically created using modern software methods, it is often sent as a series of smaller messages, each consisting of 50 to 100 bytes of payload data. Each message, if sent individually over Ethernet, typically may have a wrapper that includes the UDP header, the IP header, and the 802.3 header, plus the preamble. In total, this may double the number of bits transmitted in each message, as compared with just the bits in the payload data. Therefore, coalescing these messages into a multi-block message may require a frame to indicate the coalescing behavior (perhaps 4 bytes) and an additional approximately 2 bytes per block of data to demarcate each sub-block for later extraction. This multi-block message may still have the UDP header, the IP header, the 802.3 header, and the preamble, but only one for each of these, thus requiring approximately one tenth the overhead necessary as compared with no coalescing of the information.

Communicating a message from one computer to another generally involves some form of acknowledgment (positive or negative) that the message was seen, acted on, or otherwise processed. When an SPD sends a message to a remote device, the time that the SPD spends waiting for acknowledgment to return from the remote device may often be time that the SPD is waiting with its network interface and/or other subsystems powered on. Minimizing the time waiting for the return Ack/Nak Message minimizes the overall time that the SPD subsystems remain powered on, thus reducing the average power consumption of the SPD.

There are a variety of ways such latency may be reduced or minimized, including: Arrange for the remote device to acknowledge a message immediately upon its receipt by the remote device, and not to wait for the message to be fully processed and/or any message-requested action to be completed. Arrange for the remote device to acknowledge a message as a high-priority task in its internal task-scheduling algorithm. Allow the remote device to coalesce the Ack/Nak Messages it needs to return to an SPD and then let the SPD "decoalesce" them upon receipt for distribution to the SPD's internal sending entities. The coalescing of Ack/Nak Messages by the remote device may be performed separately for each SPD that is communicating with the remote device. Process the messages where the sender is awaiting a response preferentially over other message types. Some, all, or none of the above methods may be used in an SPD and/or remote device implementation in order to reduce the power consumption and/or otherwise increase the operating efficiency of an SPD.

In applications where a remote server is handling information for multiple requesting SPDs, there may arise cases where some SPDs have a lower average power budget than others. In such cases, the scheduling of resources when dealing with multiple SPDs simultaneously may favor those with lower power budgets to minimize the impact of latency on their power budgets.

Figure 11:
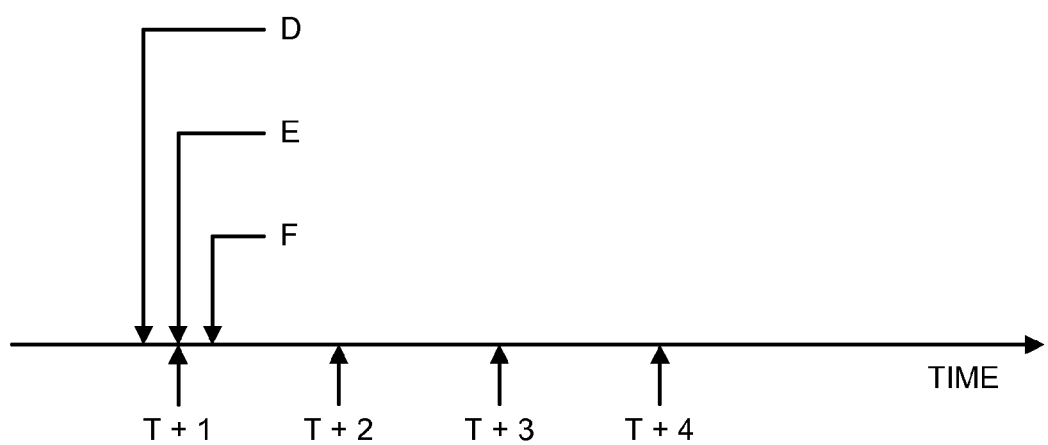
FIG. 11 illustrates coordinated communication.

In the case of multiple SPDs requesting communication in an environment using periodic transceiver enabling, one technique to optimize power consumption includes a coordinating element (such as the server handling the requests) giving preferential permission to communicate to the energy-poor SPD(s) ahead of the energy-rich SPD(s) during the period of permitted communication. The energy-poor SPD(s) may then disable their network interfaces(s) and/or other subsystems sooner, better conserving their less-abundant power than the energy-rich SPDs. This approach is illustrated in FIG. 11, in which (d) transceivers are enabled just prior to the communication time window, (e) numerous SPDs vie for the ability to communicate so that a coordinating element (such as a server) utilizes a token scheme to control which SPDs communicate thereby allowing energy-poor nodes to communicate preferentially in order to allow them to disable their transceivers sooner and save power, and (f) each SPD shuts down its transceiver as soon as it can, but no later than after some predetermined and limited period of time.

In the case of multiple SPDs requesting service from a remote device, another technique to optimize power consumption includes the server preferentially servicing the power-poor SPD(s) ahead of the energy-rich SPD(s) if requests from more than one SPD are pending completion at the server. Minimizing the response time to the energy-poor SPDs may help them conserve their less-abundant power by allowing them to place their network interface(s) and/or other subsystems in a sleep mode sooner at the expense of more energy-rich SPDs.

As a refinement on the ideas of periodic transceiver enable and duty-cycle power management, pseudo-time slot allocation may be used. This technique recognizes that multiple SPDs operating in a network or ecosystem may experience contention in communicating, especially to a central point such as a Wi-Fi access point and/or a server. This technique allows each client SPD to attempt to exercise its periodic communications during the same periodic interval but each in a time slot that occurs at a different, pre-assigned phase within the periodic interval. Just prior to the periodic communications interval, the master/server node may queue up time slot assignment messages, one destined to each client SPD, indicating when the SPD may exercise its right to communicate within the periodic interval. Alternatively, another method of assigning time slots may be used as long as only one client SPD is assigned a particular time slot or as long as there is an effective way to handle time-slot conflict issues.

At the beginning of the periodic interval, all SPDs accept one (or a small number of) message(s) to allow the time slot assignment message to be received. Alternatively, this part of the protocol may be eliminated if the time slots have already been assigned through some other method. If the assigned time slot for an SPD has not yet arrived, the SPD may place its network interface and/or other subsystems in a sleep state (if they are not already in such a state) and reawaken them just before the time slot arrives. When the assigned time slot does arrive, the appropriate SPD may then transfer any pending messages with the master/server node.

The method(s) used to assign the order of the time slots may use any number of algorithms or procedures, such as pseudo-random, round-robin, fairness, and other algorithms known to those skilled in the art, and may also offer the most energy-poor SPD in the ecosystem the first right to communicate, followed by the next-most-energy-poor SPD, and so on in an orderly progression. The scheduling algorithms may take advantage of information such as the energy available to the SPD, the estimated energy it may need to communicate, its communications bandwidth and/or latency requirements, how often it has communicated in the past, and/or other relevant information.

In a communications system between computers that implement an application having a predefined function, blocks of information are typically communicated repeatedly, and the contents of some of the blocks may often be known beforehand. For a communications subsystem where every communicated bit represents another reduction in the available power, replacing large blocks of this type with reference tags may reduce the number of bits that must be exchanged to accomplish a given functionality. Receipt of a particular reference tag may indicate to the receiving device that it may replace the reference tag with the associated block of information.

In an exemplary embodiment, an SPD is used to display a calendar. A calendar view may be represented by a series of visual "planes". Each plane may represent something either new to a day's calendar entry or something that does not change from one day to the next. The unchanging elements may be considered background planes that may be stored in the SPD memory and referenced by a symbolic name (a reference tag) that is shorter than the image they represent. Typically, when displaying a calendar, the elements that must change regularly from one day's view to the next are few and are generally the label for each block of allocated time. All other items may effectively be referred to by the reference tag, effectively reducing the number of bits that must be transmitted to display the calendar view.

An enhancement to traditional static distillation (as described further below) is a process of dynamic distillation of repeated blocks. In this dynamic process, a server (either an SPD or a remote device) may associate a block of information represented by a reference tag "on the fly". After establishing the meaning of the reference tag with the client (either a remote device or an SPD), the server thereafter utilizes the tag to communicate the intended information in a more cost-effective manner than communicating the information itself.

In an exemplary embodiment, an SPD is used to display a calendar. Consider a block of time on the calendar with a label describing that block of time. If the total calendar time was 8 hours and the label applied to a 30 minute interval, the label describing that time frame may typically be transmitted to the SPD, in full, approximately 16 times. Conversely, sending a single message to define the label image along with its reference tag may allow use of just the tag in all subsequent communications, thus reducing the amount of information transmitted (and possibly stored).

As discussed previously, it is often the case that proprietary and/or shorter range communication protocols may operate on less power than standard and/or longer-range protocols. In addition, it is possible for the different SPDs in a network or ecosystem to have vastly different power budgets due to available energy conditions, opportunity for wired operations, or other factors. In such cases, a gateway/peer-forwarding behavior may be implemented that utilizes SPD power reserves as a link-cost metric. Combined with routing behaviors among SPDs in an ecosystem, such a routing algorithm may provide the optimal communications path by allowing the energy-rich SPD or SPDs to operate as gateway nodes to other parts of the network.

In an exemplary embodiment, a Wi-Fi transceiver and a very-low-power radio transceiver are provided as network interfaces in each of several SPDs in a network. The SPDs communicate with each other and with a non-SPD remote device. The Wi-Fi network interface has a power-per-bit-communicated cost of transceiver operation that is many times what the same bit costs to communicate over the very-low-power radio link. Furthermore, at least one of the SPDs may have an abundant energy source. In such a case, the SPD that has abundant energy may be selected to communicate through its Wi-Fi network interface to the remote device, forwarding messages to and from the other SPDs through its very-low-power radio link. The other SPDs, which may have relatively scarce energy sources, may therefore communicate through their very-low-power radio links, and, therefore, reduce the power consumed for communications.

In addition, some embodiments of the SPD contain software and/or hardware mechanisms to aid in the placement of an entire SPD and/or access point. These mechanisms may be utilized in order to maximize the quality of the wireless networking signal in order to improve communications bandwidth, to reduce the communications error rate, and/or to reduce the power consumed for communications. For example, in some embodiments, the SPD includes a mechanism that displays an indication or emits an audible tone that varies proportionally with and/or is representative of the quality of the communications signals to aid in the placement of the SPD and/or access point.

In addition to (or instead of) optimizing the placement of SPD nodes and/or access points, the existing placements may be utilized along with a mechanism to additionally take advantage of the nodes and/or access points with better placements. As an extension to the concept of gateway operations for wireless networks (described further below), the SPD may dynamically or statically select which SPD and/or access point is to be used as the gateway for the others based on a combination of SPD energy reserves and/or communications signal strength.

In an exemplary embodiment, obstructions may sometimes severely influence the signal strength seen by a wireless node on a network. Moving the antenna, emitter and/or detector for an access point or SPD by a few feet may make dramatic differences in signal strength. Treatment of a group of SPDs as a system and selecting the SPD(s) with the best signal strength to operate as the gateways for the group of SPDs may allow for higher communications quality and/or lower communications power.

In some embodiments, another method to reduce the power consumption of an SPD wireless radio subsystem is to turn the radio on briefly after a period of "off" time, such as once every 10 or 100 seconds. Assuming the "on" time during this period is kept to 10 or a few 10s of milliseconds (or less), this may result in a sufficiently low average power such that even low-cost, readily-available wireless protocol (such as Wi-Fi) chip sets may be used in SPDs with extremely tight power constraints. The ratio of "on" time to "off" time and the corresponding ratio of "on" power to "off" power determines the average power consumption of the SPD's communications subsystem. Thus, the "off" time may be chosen to achieve a particular low average power consumption given a minimum "on" time to complete the wireless protocol steps needed to send and/or receive a complete message, the "off" time may be chosen to be appropriately long.

One difficulty with this approach may be in keeping the access point (or other centralized wireless protocol device) from concluding that the remote wireless protocol device (in this case, the SPD) has left the wireless network. If the access point has concluded that the SPD has left the network and then subsequently the SPD attempts to reestablish communications with the access point, this may require the SPD to go through a complete wireless protocol "rejoin" procedure each time the SPD wanted to have data wirelessly transferred. By convincing the access point that the SPD has been subject to a temporary interference with its transmission signal, the communications may be reestablished without requiring the more involved, time-consuming, and power-consuming "rejoin" procedure. Various schemes known to those skilled in the art may be used to convince the access point that the SPD has not left the wireless network, even if the SPD has not communicated for many seconds.

Some embodiments may have a minimum amount of user input/output (I/O) functionality for setting basic operating parameters. In some embodiments, even this minimum amount of user I/O functionality may be unnecessary for normal operation and this I/O may be made inaccessible after initial deployment of the device.

In some embodiments, one or more SPDs may include a single-indicator display. A variety of power-saving techniques may be applied to a single-indicator display. These include (but are not limited to): Applying intermittent power to the indicator at a high-enough frequency such that it appears to be on continuously when viewed by the human eye. This frequency may be in the range of 60 cycles per second or greater. In concert with intermittently powering the single indicator, adjust the duty cycle of the power circuit for the indicator such that the indicator is powered for substantially less than 100% of each cycle. This technique relies on the human eye's propensity to integrate the light that it receives in such a way that a rapidly-pulsing indicator may appear to be on continuously if the frequency of pulsation is high enough, and also that the eye will tend to overestimate the width of the pulses such that the indicator will appear brighter than the duty cycle may otherwise suggest.

Also in some embodiments, one or more SPDs may include a simple numeric or alpha-numeric display. A variety of power saving techniques, such as those described above, may be used with these types of displays.

In some embodiments, one or more SPDs may include a pixeled display. A variety of power-saving techniques may be applied to pixeled displays. These include (but are not limited to): Application of sleep modes based on scheduled "night" periods. Leaving the display in sleep mode until user proximity is automatically detected and/or the user otherwise triggers active operation of the display. Requiring an explicit user trigger for high-power-drain items such as backlights.

Depending on the application being served by the SPD, numerous forms of sensors may be utilized in an SPD embodiment. Sensors with implications for power management or other unique purposes are described below, but any form of sensor operable within the SPD's power budget, size restrictions, product cost, and/or other constraints may be supported.

In some embodiments, one or more SPDs may include a passive infra-red (PIR) device or some other mechanism to effect proximity detection of personnel. Their application in an SPD embodiment for display of information may alter the behavior of the SPD to minimize power consumption. For example, driving or updating an LCD display consumes power that may be reduced or eliminated by suppressing updates to the display and/or shutting down the display if no one is present to observe the content of the display.

In some embodiments, one or more SPDs may include a photo-detector, since the presence of light may be an indicator of current or pending activity. In one embodiment, to display information, the absence of light may also indicate it may be prudent to enter a power-down state. The SPD may also inform a central monitoring point that insufficient light is present in an area that is intended to be lit for security, safety, aesthetic, or other reasons.

A variety of methods and strategies may be used to reduce power in the controller. Some embodiments of the SPD may use one, many, all, or none of these methods and strategies.

In some embodiments, operating power is reduced during periods of inactivity. Often times the controller's periodic tasks may be arranged such that they are completed in a burst of activity followed by a period of inactivity until the periodic tasks again need to be performed. As long as these periods of activity and inactivity are kept relatively short and frequent, it may appear to the rest of the SPD that the controller is performing these tasks continuously, albeit at a slower rate.

In some embodiments, the controller may be designed to "sleep" during the periods of inactivity, and "wake up" in response to some stimulus, change of state, and/or elapsed time. This may be useful when the power consumption of the controller during sleep is lower than when it is awake. The average power consumption for the controller operating in this way may be less than if it were awake all of the time.

Some techniques to reduce power in the controller during periods of inactivity include running the controller's internal circuitry at a lower frequency and/or lower voltage than when it is fully awake, executing fewer instructions per unit time than when it is fully awake, and selectively disabling some or all of the functions within the controller.

In some embodiments, operating power may be reduced during periods of reduced activity. For example, the controller may have several different reduced-power modes of operation, as compared with its full-power, full-operation mode. Often, only a subset of the full capabilities of the controller is needed at any particular time. In this case, some of the functions of the controller may be unused except during specific times and may be disabled the rest of the time to reduce average power consumption. Additionally, some of the functions within the controller may be needed but only at a slower operating rate so operating them at a lower frequency may reduce average power consumption. Continuously adjusting the operating frequency of one or more subsystems to better match the needed performance at any particular time may also reduce the controller's average power consumption. By automatically selecting the appropriate low-power operating mode appropriate for the tasks it needs to perform at any particular period of time, the controller may reduce its average power consumption while still allowing the SPD to operate acceptably well.

In some embodiments, operating power is reduced by running at a lower or lowest voltage. Often, the circuitry that may be used to implement a particular controller embodiment is specified to operate properly over a range of voltages. Typically, the lowest power consumption is achieved at the lowest supply voltage. In some embodiments, the maximum frequency of guaranteed operation is reduced when the supply voltage is reduced, even if the supply voltage remains within the specified operating range. Also, in some embodiments, certain functions of the controller may be guaranteed to operate only at a higher minimum voltage than the minimum voltage required by other functions.

By allowing the operating voltage of the controller to be varied, some embodiments may have the controller select its operating voltage based on the frequency at which it needs to operate and/or which functions it needs to use during any particular period of time. Using this technique, the average power consumption of the controller may be lower than if the controller were to be operated at the highest minimum guaranteed operating voltage of all of its frequencies and functions.

In some embodiments of the SPD, updating the controller's non-volatile program and/or data memory may allow the controller to maintain the contents of its memory after a loss of power. In some cases, these non-volatile memory circuits require a higher operating voltage during update operations than during read operations. Allowing the controller to adjust the operating voltage of the non-volatile memory subsystem, such that it is operated at the higher voltage only during update operations, and operated at the lower voltage during read operations, may reduce the average power consumption of some embodiments of the SPD.

In some embodiments, the total extra power consumption needed in the controller when the higher voltage is used for writing to non-volatile memory circuits may be further reduced by grouping together the non-volatile-memory update operations. The "overhead" time spent raising and lowering the voltage may, therefore, be shared among multiple update operations. This means that for a given set of update operations, the time (and excess power) spent on most of the "overhead" may be eliminated.

A variety of methods may be used to initialize the SPD operating parameters. One method that may be used is through the inclusion of a USB port or similar serial interface for initial configuration and/or initial power charge of the SPD and to use a laptop or computer that is able to directly operate at the MAC layer of the Wi-Fi protocol to set up the higher layer operations. In many environments where the SPD is operating, the DHCP protocol is often available, so the IP address(es) may be obtained automatically. In environments where the DHCP protocol is not available or is otherwise inappropriate to be used, the IP address(es) and other relevant operating parameters may be allocated manually.

Some embodiments include a button on the back of the SPD that invokes the display of the IP address momentarily. With the IP address known, a configuration utility downloadable from a web site or other convenient location may be used to configure the operating behaviors of the SPD. Alternatively, for embodiments in which the SPD includes touch-screen capability, triggering a configuration mode may lead to a series of menu queries that may adequately drive initial configurations.

For some of SPD applications, compromise of the host network by the SPD is typically not possible due to the limited network interface power budget and/or lack of standard higher-layer protocols that will be present on the device. For example, in many SPD embodiments, there will not typically be support for TCP operations. The SPD functional behaviors, therefore, will be governed by an entirely proprietary message set. In some embodiments, however, passwords and/or other means may be used to limit access to the SPD to authorized personnel and/or designated remote device(s).

Figure 12:
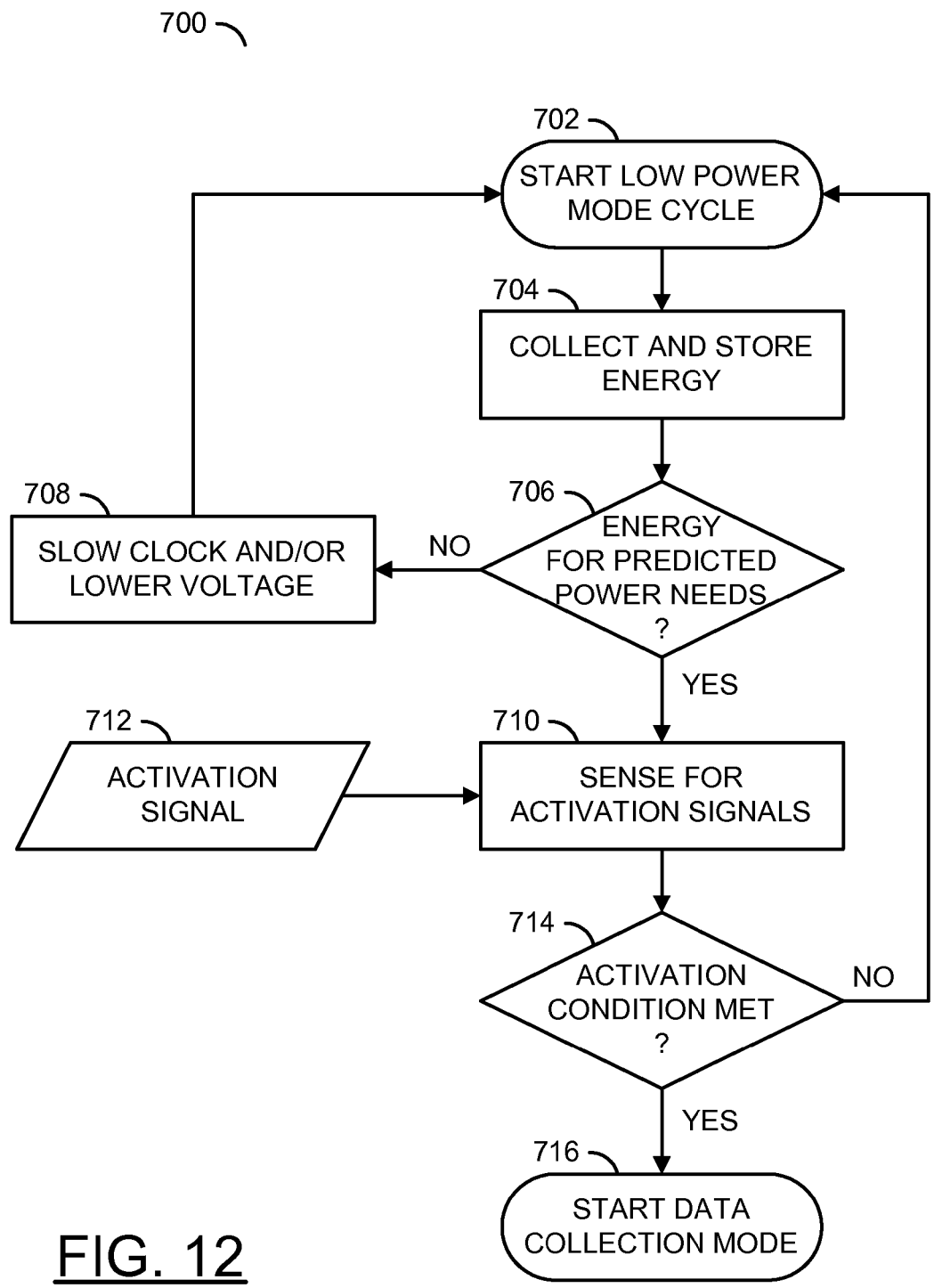
FIG. 12 is a flow diagram illustrating a low power activation signal monitoring mode cycles.

Referring to FIG. 12, a method (or process) 700 is shown. The method 700 illustrates an example of a low power activation signal monitoring process. The method 700 generally comprises a step (or state) 702, a step (or state) 704, a decision step (or state) 706, a step (or state) 708, a step (or state) 710, a step (or state) 712, a decision step (or state) 714, and a step (or state) 716. The step 702 may start a low power mode cycle (or process). Next, the step 704 may collect and store energy. Next, the step 706 may determine the amount of energy needed for the predicted power usage. If there is not enough energy stored, the method 700 moves to the step 708. To reduce power usage, the step 708 may slow down an internal clock to the CPU 202a and/or may lower the operating voltage. If there is enough energy for the predicted power needs, the method 700 moves to the step 710. The step 710 senses one or more activation signals. If an activation signal is present, such as a signal received from the step 712, the decision step 714 determines if an activation condition has been met. If not, the method 700 moves back to the step 702. If an activation condition has been met, the method 700 moves to the step 716. The step 716 starts a data collection mode (to be described in more detail in connection with FIG. 13).

Figure 13:
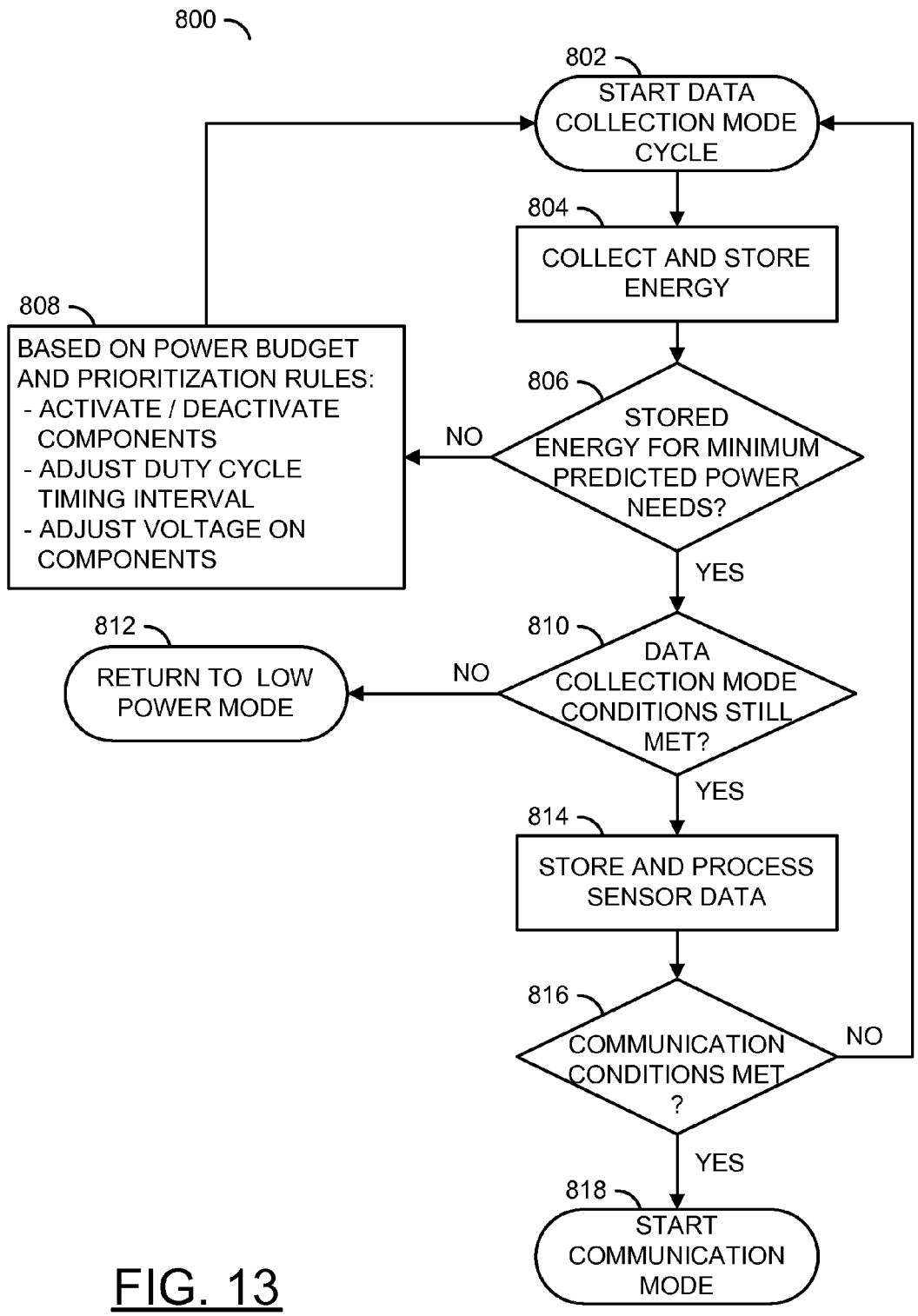
FIG. 13 is a flow diagram showing a power-aware data collection mode cycle.

Referring to FIG. 13, a method (or process) 800 is shown. The method 800 illustrates an example of a power-aware data collection process. The method 800 comprises a step (or state) 802, a step (or state) 804, a decision step (or state) 806, a step (or state) 808, a step (or state) 810, a step (or state) 812, a step (or state) 814, a step (or state) 816, and a step (or state) 818. The step 802 starts the data collection mode cycle. Next, the step 804 collects and stores energy. Next, the step 806 determines if enough energy has been stored to perform a minimum predicted operation based on the predicted power needs. If not, the method 800 moves to the step 808. The step 808 may perform a number of prioritization rules based on a power budget. For example, the step 808 may activate/deactivate one or more components, adjust the duty cycle and/or timing interval, adjust a voltage on the components or other power saving parameters (or rules). If there is enough energy stored for the predicted power needs, the method 800 moves to the state 810. The decision state 810 determines if the conditions are still met to remain in the data collection mode. If not, the method 800 moves to the state 812, which returns to the lower power mode. If the conditions are still met, the method 800 moves to the state 814. The state 814 stores and processes sensor data. Next, the decision state 816 determines if the communication conditions have been met. If not, the method 800 moves back to the state 802. If the communication conditions have been met, the method 800 moves to the state 818. The state 818 starts the communication mode (to be described in more detail in connection with FIG. 14).

Figure 14:
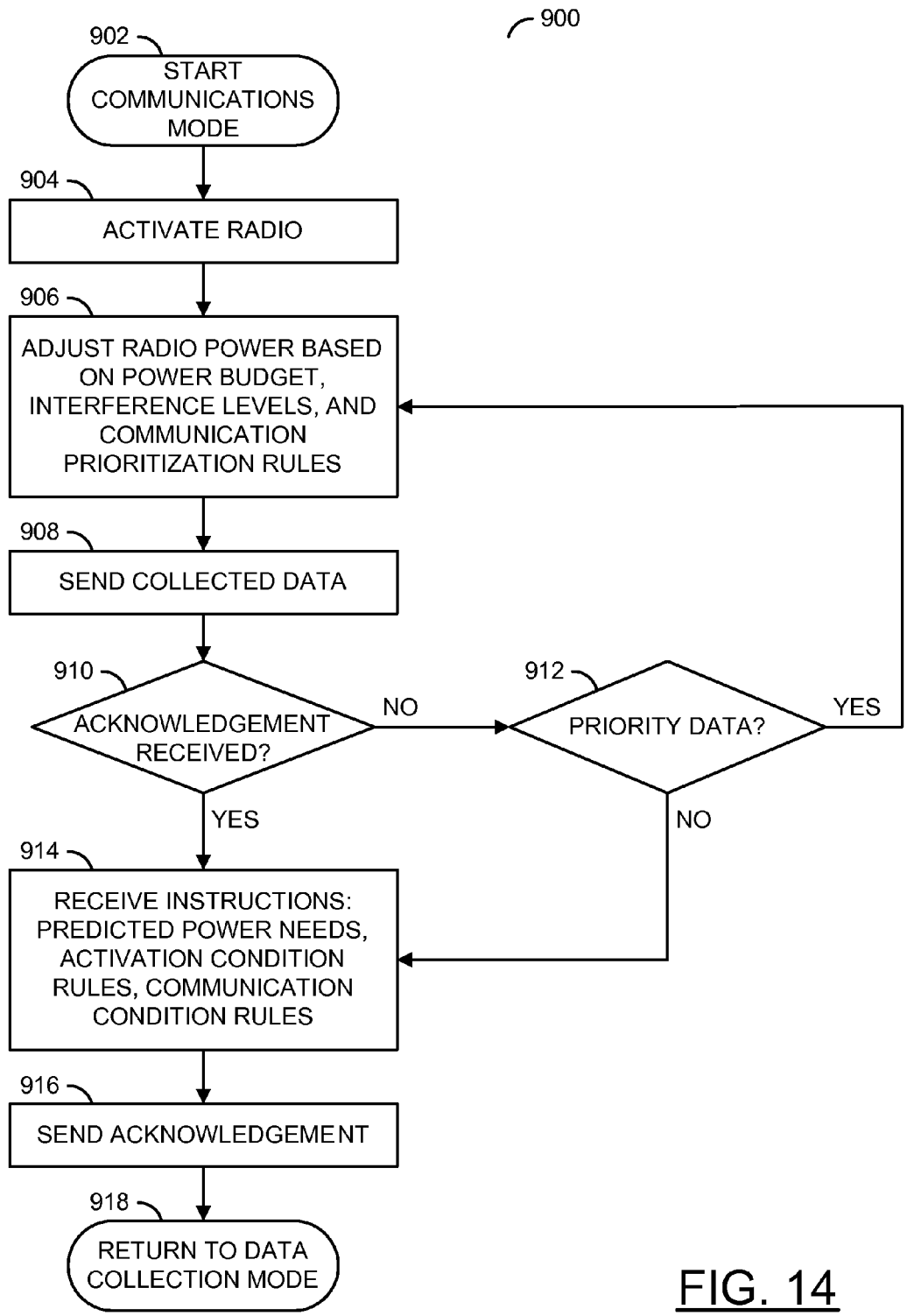
FIG. 14 is a flow diagram showing a power-aware communications mode.

Referring to FIG. 14, a method (or process) 900 is shown. The method illustrates a power-aware communications mode. The method 900 generally comprises a step (or state) 902, a step (or state) 904, a step (or state) 906, a step (or state) 908, a decision step (or state) 910, a decision step (or state) 912, a step (or state) 914, a step (or state) 916, and a step (or state) 918. The state 902 starts the communication mode. Next, the state 904 activates the radio (or wireless transceiver). Next, the state 906 adjusts the broadcast power of the radio based on a power budget, interference levels, and/or communication prioritization rules. Next, the method 900 moves to the state 908. The state 908 sends collected data. Next, the decision state 910 determines if an acknowledgment has been received. If not, the method 900 moves to the decision state 912. The decision state 912 determines if the data received is priority data. Priority data may be considered data that may break low power operation rules.

If so, the method 900 moves back to the state 906. If the data is not priority data, the method 900 moves to the state 914. In the decision state 910, if an acknowledgment has been received, the method 900 moves to the state 914. In the state 914, the method 900 receives instructions related to predicted power needs, activation condition rules, and/or communication rules. Next, the method 900 moves to the state 916, which sends an acknowledgment. Next the state 918 returns to the data collection mode (e.g., the process 800).

The controller in the SPD may maintain the physical and logical address of the SPD. A default set of these addresses may be pre-programmed when the SPD is manufactured. If necessary, some or all of these addresses may be set or changed when the SPD is initially deployed and/or changed while the SPD is operational.

In the event that the SPD is deployed in a network that does not broadcast its security information, the network interface access codes will need to be entered as part of the initial configuration of the SPD.

The issues of privacy and encryption are of concern when there is a need for protection of information communicated across an open network interface. This need may be addressed in a number of ways with respect to SPD communications with a remote device, including: Information communicated across the external computer network may be sent in a proprietary format, minimizing the risk of casual observance through the use of a network "sniffer" or similar device. Standard encryption techniques may be applied to communications across the external computer network for even more robust privacy and protection against unauthorized observation.

In embodiments that include communication with the remote device(s), this communication typically takes place through the external computer network. Some embodiments of the SPD may contain one or more network interfaces that implement a wireless communications protocol. The wireless protocol may be a standard, commonly-deployed technology, such as "Wi-Fi" (IEEE 802.11a, IEEE 802.11b, IEEE 802.11g, etc.), or the protocol may be a specialized one particularly tailored to the low-power transmission distance, and/or other needs of the SPD and/or its application. Combinations of different network interface types are also possible, allowing for gateway operations where applicable.

Regardless of the type of wireless protocol, one (or more) devices in the external computer network typically provide the wireless connection to the overall external computer network. Whether the external computer network is inherently wireless or a hybrid of wired and wireless networking technologies, the device that operates as the intermediary to provide the connection is often referred to as a wireless access point. In some cases, the wireless access point may be built into a node on the network, and/or may be part of one or more remote device(s). In some cases, the wireless access point may be a device dedicated to bridging the wireless network to a wired network. In some cases, the remote device may use a built-in wireless interface to directly communicate to the SPD (in Wi-Fi nomenclature, this is known as "ad-hoc" operation mode).

The wireless access point used by the SPD may be a standard commercially-available device that is typically used with other standard wireless products or the access point may be a specialized device whose wireless port may be used only with the SPD. The access point may be configured to support one or more SPDs, one or more other commercially-available wireless products, or any combination of these. In most cases, the function of the access point for the SPD may be to convert the wireless messages from the SPD to the wired networking protocol used by the external computer network and vice-versa.

A role of the external computer network when used with the SPD is typically to transfer messages from the SPD to the remote device(s) and vice-versa. In many cases, it is expected that standard, already-installed computer networks may be used for this function. Therefore, the SPD may typically be operated such that its messages may be easily converted by the existing wireless access point(s) for carriage across the computer network.

Typically, the SPD does not require any protocol changes in the wired part of the external computer network and in some cases, requires no special protocol changes for the wireless portion either. SPD messages may therefore be constructed, formatted, and addressed for easy transport across the external computer network to the remote device(s), and vice-versa.

In cases where proprietary communication methods are used between SPDs, a gateway function may exist either among the SPDs or in a special-purpose device co-located with the SPDs but connected to the external computer network via a standards-oriented wired or wireless means.

Once the network connectivity has been established between the SPD and the remote device(s), they may typically communicate with each other using the standard messaging format and protocol(s) used in the external computer network. Each SPD may have a unique network address, or other means to be addressed uniquely, and likewise, each remote device may have a unique network address, or a means to be addressed uniquely. Properly-addressed messages may be sent across the external computer network by both the SPD(s) and the remote device(s) using the existing networking mechanisms.

Figure 15:
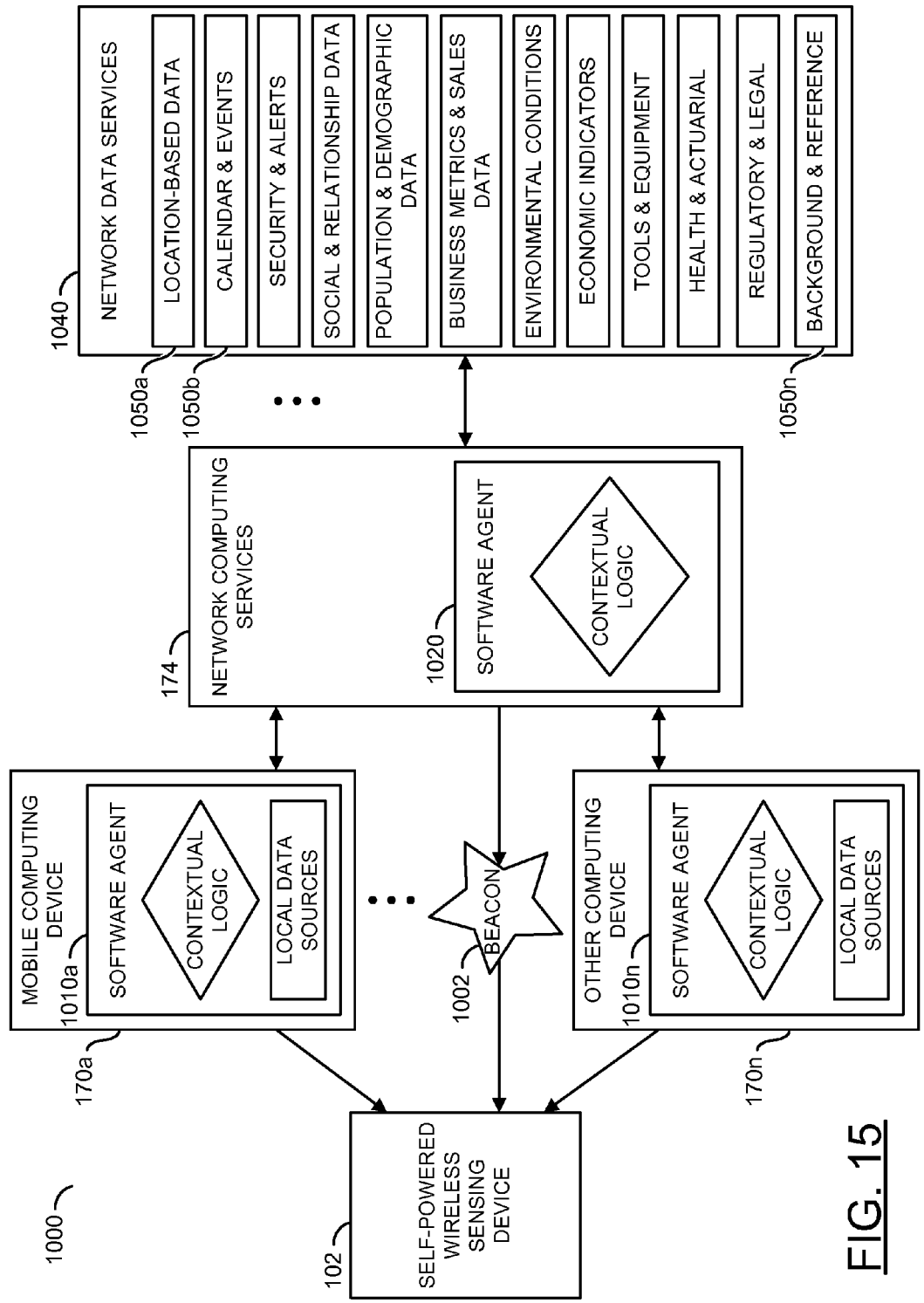
FIG. 15 is a context diagram showing wireless signal configurations.

Referring to FIG. 15, a context diagram of a system 1000 showing wireless signal configurations is shown. The memory 204a may contain instructions outlining a set of threshold conditions for storing sensed data (e.g., the process 800). The memory 204a may also contain instructions outlining a set of threshold conditions for transmitting sensed data (e.g., the process 900). The instructions for storing and/or transmitting data may be based on a power budget and/or available power. The instructions may contain computational logic for computing a threshold condition based on one or more types of sensed data and/or one or more data points over time. A beacon 1002 is shown connected between the network computing services block 174 and the wireless sensing device 102. The beacon 1002 may be used to send a signal from the network computing device 174 to the sensor node 102. The beacon 1002 may send a signal to wake up the node 102, or to prepare the node 102 to receive new instructions, etc. A software agent block 1010a is shown in the mobile computing device 170a. Similarly, a software agent block 1010n is shown in the computing device 170n. A software agent block 1020 is shown in the network computing services block 174. The software processing may be distributed between the mobile computing devices 170a-170n and the network computing services block 174. A network data services block 1040 is shown connected to the network computing services block 174. The network data services block shows a number of classifications of network data services 1050a-1050n.

In one example, the computational logic may include a cascade (e.g., one or more) of threshold conditions that may be used to determine when additional features of the sensor node 102 will be powered on or powered off. For example, when the sensor node 102 determines that one of the sensors (e.g., a sensor A) detects a signal over a determined threshold, then one or more other sensors (e.g., a sensor B and/or a sensor C) may be activated. In another example, when the sensor node 102 determines that the sensor B in combination with the node C are below a threshold, then the sensors B and C may be turned off. In such an example, one of the sensors 160a-160n may be awake (or operational) continuously. Other sensors 160a-160n may only be powered on when the sensor node 102 determines that monitoring is needed (e.g., by the continuously operated one of the sensors 160a-160n). Other input parameters may be uploaded by the mobile computing device 170 to the sensor node 102. Such parameters may include a schedule of when sensor data should be captured and/or stored.

The computational logic cascade may implement a power-aware prioritization of sensor data capture and/or communications information. For example, when power stored in the ESU circuit 214a is low, the duty cycle of the sensor node 102 may be changed less frequently. In one example, the logic may only receive signals from the sensors 160a-160b when power is sufficient.

The computational logic may include logic for coalescing data, such as only recording changes to a base state or expected state. A computationally efficient process may be implemented. For example, a process that only records the average value of one or more of the sensors 160a-160n over a period of time may be used. The sensor 102 may begin to record events if a measurement received from the sensors 160a-160n is significantly above average.

Since the sensor nodes 102a-102n are self-powered (through the energy storage unit 214a), the power budget of the sensor nodes 102a-102n is generally kept small. By capturing additional energy with the ECU 214a, the nodes 102a-102n may operate for long periods of time on a single battery. The energy storage unit 214a may be implemented as a battery or other storage device. The energy capture unit 214a may store energy through various sources, such as energy created through harvesting of light, vibration, thermal variation, thermal gradient, infrared, chemical, RF sources or some combination.

The computational logic for determining the threshold conditions for storing and/or transmitting data may be based on currently available power, predicted future energy harvesting opportunities (e.g., based on forecasting the future environment), and/or predicted energy consumption (e.g., based on applying the threshold rules to the forecast environment).

A machine learning process that optimizes the predictive model may be set up as a series of energy input functions and/or energy consumption functions with scaling factors that are optimized based on historical data for the sensor nodes 102a-102n. Based on prior patterns, the model may operate with techniques of machine learning optimization including, but not limited to, a least square minimization of the difference between model predictions and actual historical data, various gradient descent techniques, etc.

In order to adapt the duty cycle, the sensor sampling rates, the adaptive and conditional powering of additional sensors based on a set of initial sensors, the data storage and data transmission policies of the sensor node 102, each energy use in the system 150 may be characterized as an energy cost function. For example, energy harvesting may be a negative cost, or energy contribution. Each data captured may be characterized as a utility or benefit function. An optimization may be performed to maximize the utility within a set of cost parameters. Alternatively, optimization may be performed to maximize utility per unit of cost.

In one example, the remote computing device 170 may be a local device on the edge of the network. For example, the remote computing device 170 may be implemented as a smartphone, or personal digital assistant (PDA) type device, which in turn is connected to the central data storage and computing facility 174. In such an implementation, some or all of the computational logic for determining the threshold conditions and/or rules may be implemented on the devices 170a-170n. In such an example, only the threshold values (or simplified rules) may need to be transmitted to the sensor nodes 102a-102n. In one example, a subset of the processing is done on the sensor nodes 102a-102n. If power is not an issue, the devices 170a-170n may capture a more complete stream of data from the local sensor nodes. The data may then be processed and/or be evaluated locally before being sent to a central server on the computers facility 174. Such an implementation may reduce network traffic and/or storage needed at the central data center 174. The central data center 174 may send program instructions to one or more of the smartphones 170a-170n for computing threshold conditions. The program instructions may in turn be sent to one of the sensor nodes 102a-102n.

Various sources of data may be used to generate energy consumption and/or harvesting predictions. Such sources may include (i) a schedule of upcoming calendar events in the neighborhood of the sensor, (ii) the proximity to or presence of nearby people, objects, buildings, vehicles, (iii) security or threat conditions that increase the importance of sensing, (iv) location-based data (such as features of the location of the sensor), (v) weather forecasts and/or other environmental conditions, (vi) scheduled or location-based energy harvesting opportunities, (vii) presence of increased ambient or directed RF power, (viii) known or observed cycles including day, week, month, season, and/or (ix) other patterns in prior data.

Various energy harvesting technologies may be used in the energy capture unit 214a. Examples of such technologies include piezoelectric effects of stress and/or strain, vibration, thermal gradient, thermal variation, solar photovoltaic, ambient light photovoltaic, infrared, radio frequency, chemical energy, air or fluid flow, and electromagnetic fields. Many of these effects are context dependent and may vary with location, time, proximity to other devices or environmental features and other factors. Being able to predict future energy inputs based on the context of the sensor node 102 may help to determine the current power budget.

In addition to the environmental context, the predicted power inputs and predicted power consumption may take into account various application rules encoded in the control logic of the memory 204a. Such inputs may be used to determine the duty cycle sensor node 102, the sampling rate of the sensor, the conditional powering of different components, as well as the data storage and/or data transmission policies.

In an example of a security application used to detect intruders, the sensor node 102 may have a very different predicted power need than the same presence or proximity sensor node 102 used to optimize lighting and heating based on building or room usage. The security application may consume power when an office is closed. The lighting and heating application may need to be active during the scheduled office hours. The energy harvesting opportunities may also be different. The security application may need to store enough power during the day to last throughout the night. The office energy application may be able to harvest enough energy during the day to meet most needs. The transmission policies for the security application may be immediate during non-office hours. The transmission policy for the energy application may be daily or weekly. In another example, a seismic vibration sensor might have a high sampling rate after an initial threshold event, while a temperature sensor might be needed less frequently. For many applications, a diminishing return on the value of the data occurs at higher sampling rates. The particular value depends on the application.

The predicted power needs and/or harvesting opportunities may be computed through machine learning techniques in which the contribution of environmental features to energy harvesting and energy consumption are learned based on prior observations. For example, consider an application where during a time interval $t_i$ and at location l, energy contribution or cost is expressed as a linear relationship between a set of environmental features f and energy the contribution by the following equation:

$$\Delta e(t_p, l) = a_1 f_1(t_p, l) + a_2 f_2(t_p, l) + a_3 f_3(t_p, l) + a_4 f_4(t_p, l)$$

For environmental factors that cost energy, the scaling factors are negative. For environmental conditions that add to energy harvesting, the factor is positive. The change in energy does not go over the storage capacity of the node. The charge does not generally fall under a threshold without shutting down the sensor node 102.

For a time series over all the time intervals, an expression with F being a matrix (where each row is a time interval and each column is a feature) may result in a total energy contribution or drain from environmental factors of $$E = F \times a$$

The time intervals before the current time, the actual features and/or energy needs or contributions have already been measured and may be considered the ground truth or training set for a predictive model. The scaling factors may be fit using well known machine learning techniques. The functions describing dependence of the change in energy and features of the environment may first be estimated with known relationships (e.g., such as solar radiation and the contribution to a photovoltaic) so that the machine learning is focused on scaling the relationship to the particular sensor node rather than discovering the relationship in the first place. The sensor node 102 may be implemented with known components. The energy inputs and/or cost functions of such known components should be related to the technology used. The scaling factors are normally related to the context and/or application.

In order to create the most efficient power management in a wireless sensor network, the machine learning techniques may be trained with data collected on a subset of the sensor nodes and/or for a subset of time. The power budget and/or power predictions may be calculated at a central computer in the network computing services block 174 for larger calculations. For calculations with fewer features, the power budget may be calculated on the remote computing device 170. The results of the optimization of the model may be communicated to the sensor node 102 in the form of program instructions and/or thresholds.

The optimization of the scaling factors of the predictive model may also take into account the effect of the control logic and the rules currently in use to adapt the duty cycle sensor of the node 102, the sensor sampling rate, as well as the data recording and/or transmission policies. The functions that express the relationship between a predicted feature of the environment or context to power consumption can include the rules in the calculation so that the optimization is application-specific.

In some SPD applications, the software agent(s) 1010a-1010n running on the remote device(s) 170a-170n may be used to communicate with the SPD through the external computer network. In some embodiments, the communication may be automatic, with each interaction triggered by some change of status in the remote device, the SPD, or both. In some embodiments, the communication may be manually initiated by a user of the remote device, such as to change the configuration or other state of the SPD. In some embodiments, both initiation modes may be supported.

Note that in some embodiments, the user directly interacts with the remote device(s), such as with a keyboard and/or mouse and/or display/monitor. In some embodiments, the user interacts indirectly with the remote device(s), such as across a computer network and/or additional communications link.

In some embodiments, communication is automatically initiated by the remote device. Some examples of uses of automatic communication initiated by the remote device may include: The SPD displays a subset of database information: a software agent running on the remote device periodically searches a database resident in the remote device and/or in a computer reachable through the external computer network. The results of the search, possibly along with other relevant information, are formatted by the software agent and are sent to the SPD, especially when those results have changed since the previous update. The SPD displays meeting room information: a software agent running on the remote device monitors the reservations for the meeting room to which the SPD is attached. The software agent may periodically interrogate the networked calendar and/or reservation system (such as Microsoft Outlook, IBM/Lotus Notes, etc.) and send the reservation information, possibly along with other relevant information, to the SPD for display. This application may be useful for general businesses, as well as businesses making rooms available to third parties, such as hotels, convention centers, etc. The SPD displays examination room information in a hospital or doctor's office. A software agent running on the remote device monitors the patient reservations for the room to which the SPD is attached. The information may allow the medical personnel to know who is in the room without having to enter the room and disturb the patient, and without having to find the reservation clerk and ask him/her about the status of the room. The SPD displays news, advertising, and/or market information: a software agent running on the remote device gathers various news, advertising, stock quotes, headlines, or other relevant information from internal and/or external sources (such as from the Internet). The software agent may format the information and periodically sends the formatted information to the SPD for display. The SPD displays pricing or other product status information: the SPD (or a set of SPDs) may be positioned adjacent to its (their) corresponding retail product(s). Each SPD may be used to display up-to-date pricing and/or other product status information in a supermarket, retail store, warehouse, or other locations. The software agent running on the remote device may gather data to be displayed on each SPD from a database or other computer system, and/or from direct user input at the remote device. The SPD is used as a personal display for each employee/user/customer: an SPD may be attached to each employee's cubicle or office, and may be used to display personal information, such as where the employee is presently, if the employee is on vacation, if the employee is available for drop-in conferences, or other employee circumstances. The employee may update the display by sending messages through the software agent running on the remote device, and this information may be sent to the SPD, possibly along with other relevant information, such as scheduling derived from other sources. The SPD displays room status information: an SPD may be placed in a room used by many people, such as an area with several cubicles, a ball room, an auditorium, or other locations. The software agent running on the remote device may gather any messages relevant to that room, such as general notices, announcements, or other messages, and may merge that with relevant local data, such as time, date, the current temperature in the room, and may send the formatted information to the SPD for display. The SPD is used as an annunciator: the SPD may be used to display important real-time information needed by people in the room where the SPD is located. For example, in a technical support or telephone call-center application, the SPD may display the average wait for customers on hold, the number of customers presently being served, whether the wait time is increasing, or other relevant information. The software agent running on the remote device may collect real-time information from the telephone switch and combine that information with other relevant information, such as time of day, recent history, or up time, to generate formatted data to send to the SPD for display. The SPD is used as an actuator: the SPD may contain one or more motors, actuators, electrical contacts, or other similar components which may be used to move or position some external mechanical or electrical apparatus. The SPD may receive a message from the remote device requesting that the mechanical or electrical apparatus be moved, repositioned, turned on, turned off, or otherwise adjusted. Alternatively, the SPD may receive a message requesting the status of the mechanical or electrical apparatus, and the SPD may respond with a message reporting that status.

In some embodiments, communication is automatically initiated by the SPD. Some examples of uses of automatic communication initiated by the SPD may include: The SPD used as a security sensor: the SPD may contains sensors to detect various environmental states, such as temperature, humidity, lighting, motion, vibration, noise, shock, pressure, or other environmental states. For example, in a security application, a small SPD may be attached to a window and used to detect if the window has been opened or broken. If such a stimulus is detected, the SPD may send a message to the remote device for further processing. The SPD may also send non-urgent messages periodically to confirm its continued correct operation and/or that the communication link is still functional. SPD reports its own health status: the SPD may send messages to the remote device to indicate that the SPD continues to operate correctly and/or the communication link is still intact. When the SPD detects an internal problem, such as insufficient input power and/or internal energy storage to continue operation, the SPD may send a message to the remote device to request maintenance service or other appropriate action. When the remote device does not receive a periodic health status message from the SPD, the remote device may conclude that the communications link and/or the SPD have failed, and the remote device may then take an appropriate action. SPD used as a HVAC sensor: the SPD may be used in a heating/ventilation/air-conditioning application, and may sense temperature, humidity, lighting, or other environmental states. The information may be sent to the remote device for further processing with data from other sensors, and the state of the HVAC system may then be sent to the SPD for display, along with current time, date, local temperature, or other relevant information. SPD used as an intercom: the SPD may contain a microphone and speaker, and perhaps "doorbell" and "talk" buttons. The SPD may send a message to the remote device when the "doorbell" button is pushed, and may digitize/decode voice signals for use with the internal microphone and speaker. The digitized voice data may be sent to and from the remote device, or another computer interconnected with the external computer network.

The software agent (SA) running on the remote device(s) may perform a variety of tasks, depending upon the embodiment(s) of the SPD(s) with which it communicates and the intended functionality of the SA and its embodiment(s). SA embodiments typically contain combinations of subprograms which each perform a specific task or set of tasks. For example, some subprograms may be responsible for reading information from a database while other subprograms write to a database. Some subprograms may perform both tasks. SAs that contain both readers and writers may have complex interactions with their corresponding database(s) as well as when communicating with the associated SPD(s).

An example SA application and associated environments that may be used with SPD(s) are described below. Actual embodiments of SAs may implement one, some, all, or none of the following examples.

In an exemplary embodiment, the SA may implement a calendar. This application allows an SPD (or set of SPDs) to be used for resource management, such as for reservation management of a conference room. The SPD(s) used for this application may typically contain a display of some sort that may show resource scheduling information. The SPD(s) may communicate with the remote device(s) running the calendar SA(s), and the calendar SA(s) may typically interact with a separate calendar management program/database, such as Microsoft Outlook or IBM Lotus Notes. Through the interaction with the separate calendar management program/database, the SA(s) may gather the necessary data to send to the SPD(s) for appropriate display of scheduling information, and/or gather the necessary data from the SPD(s) to appropriately update the separate calendar management program/database.

The calendar application may be implemented in a variety of environments. Exemplary environments include small offices using off-site hosted MS-Exchange services, small offices using off-site hosted World Wide Web Distributed Authoring and Versioning or WebDAV services (a set of extensions to the Hypertext Transfer Protocol (HTTP) that allows users to collaboratively edit and manage files on remote web servers), medium-to-large offices using MS-Exchange, and medium-to-large offices using local WebDAV.

Figure 16A:
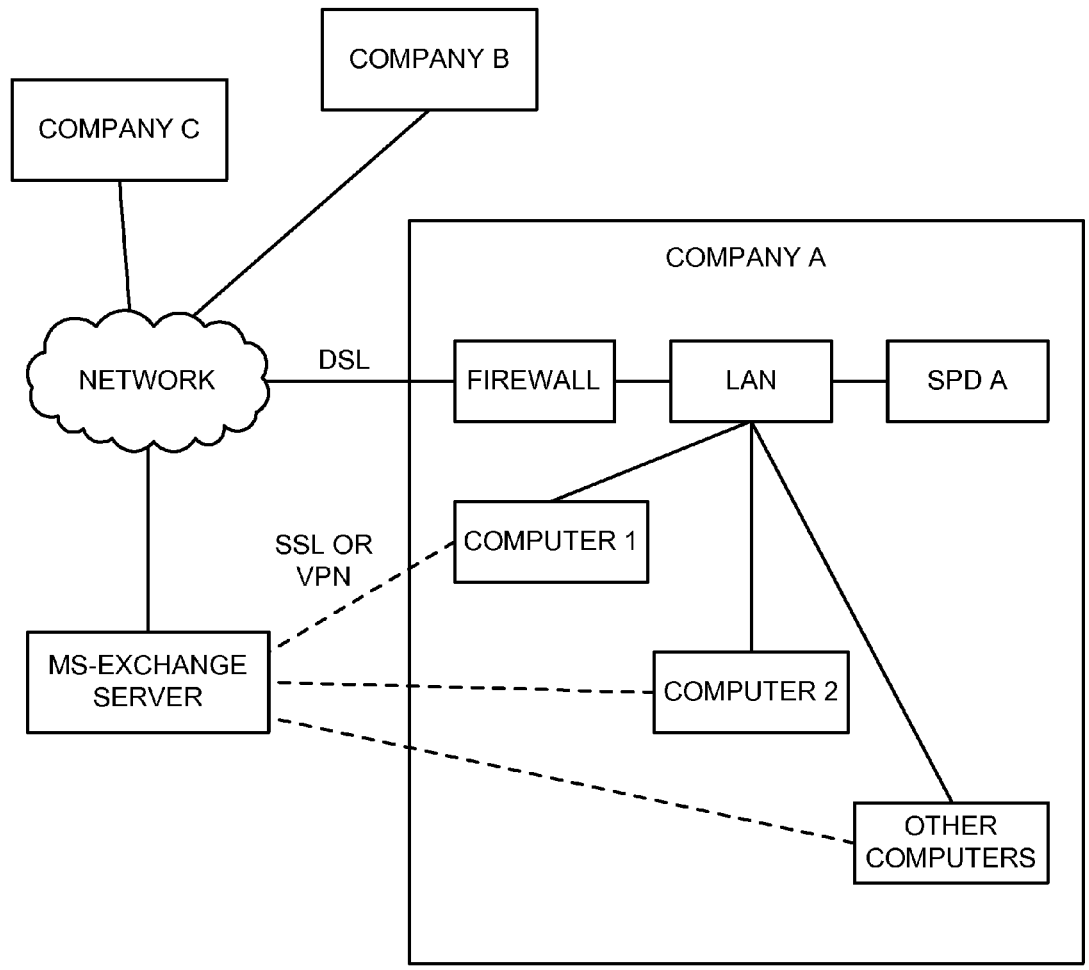
FIG. 16A is a block diagram illustrating a computer network having an MS-Exchange server.

For small offices using off-site hosted MS-Exchange, FIG. 16A illustrates an expected environment for a small office using a hosted MS-Exchange server for their mail services. In, this example, company A may have 3 conference rooms, and computer 2 may be an administrative computer that is running Outlook and the SPD A Software Agent (SA). Note that in this example, multiple companies share a single MS-Exchange server, accessing the server via their internet connection perhaps over SSL or VPN connections through a firewall. Routers, hubs, etc. are assumed to be in the LAN cloud but are omitted for clarity.

The configuration illustrated in FIG. 16A poses several challenges: Installation/operational simplicity: Small offices often operate with little to no information technology staff available for applications training, management or installation. Exchange server modification avoidance: hosting companies providing MS-Exchange services often resist extensions to shared server platforms. Additional outlook license avoidance: MS-Outlook seat license costs are often high for small offices. As a consequence, they typically have less volume discount and purchasing leverage. Minimizing communications hops: Offsite hosting often creates large, variable latencies in communications to the MS-Exchange server. A variety of software architectures may be used to address these challenges. These are described below.

In some embodiments, installation and operational simplicity are linked as an issue but may be accomplished in several only somewhat-related ways as follows: Software Agents (SAs) may be designed to be installed only on client workstations.

In this way, access to a server machine by an SPD administrator may not be necessary. Two software elements may be used to fulfill the SA behaviors in each of two client workstations: one is an Outlook VBA extension (a version of Visual Basic that is embedded in Outlook) and the other is a separate supporting service. Both software elements may be installed in the same process. As a consequence, decisions about which is needed under what conditions may not be necessary. Delegation may be "hooked" so that the notification of delegate status for a resource managed with an SPD may be provided to the (potentially new) delegate with the option of installing the necessary components to manage the resource. Standard Outlook resource management may be used for creation and management (i.e., delegation) of the resource as a mailbox. This may allow meeting organizers, even for those individuals who are not administrators of the rooms, to use the source when scheduling meetings. Standard Outlook resource management may be used to avoid data collisions or conflicts in accepting resource booking requests. Installation of VBA elements may be largely invisible. To all appearances there may be an additional tool available to manage the SPDs and client software but otherwise it is just standard Outlook for handling the resource. The supporting service may be "fed" information by the Outlook VBA extension in the background on an event-driven basis. This may provide display updates to the SPD, such that no user intervention may be necessary. The supporting service may be a member of a cooperating group of services running on the machines of all resources owners and delegates. SPD communication may be performed only by the currently elected master whose role may be constantly negotiated behind the scenes without administrator input.

In some embodiments, utilization of the Outlook VBA mechanism and a local high-priority software service may allow scheduling and creation of resources without changes to the MS-Exchange server.

In some embodiments, utilization of the Outlook VBA mechanism and the creation of the resources as a resource mailbox may avoid any need for an additional Outlook license.

In some embodiments, utilizing the locally-located workstation of the administrator(s) reduces the latency and communications delays to a best case path over the LAN versus the uncertain path to the MS-Exchange server, thereby minimizing communication hops.

Figure 16B:
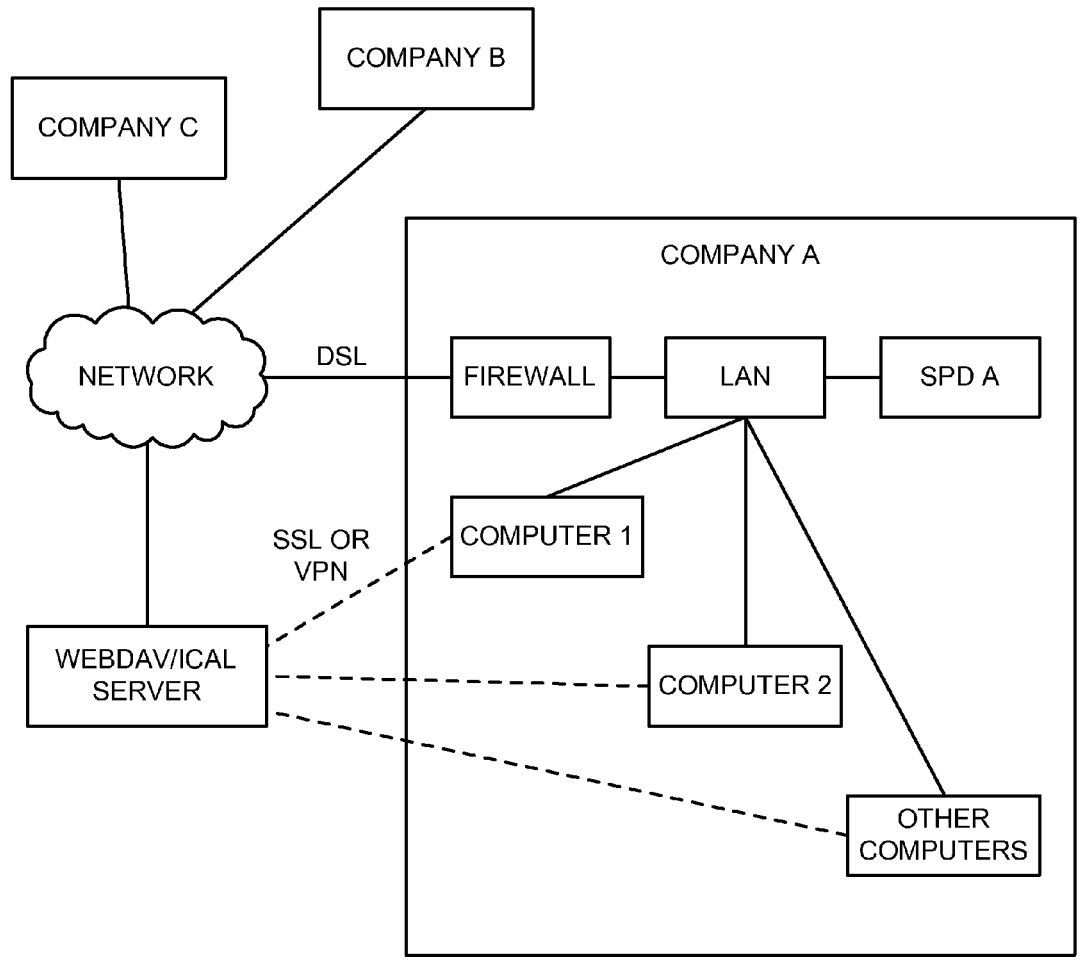
FIG. 16B is a block diagram illustrating a computer network having a web DAV/iCal server.

For small offices using off-site hosted WebDAV, FIG. 16B illustrates an environment for a small office using an offsite hosted iCalendar (a calendar application developed by Apple Computer). In this example, company A may have 3 conference rooms, and computers 1 and 2 may be running the SPD management utilities and Software Agent (SA). Note that the server is accessed via an Internet connection, such as over SSL or VPN connections through a firewall. Routers, hubs, etc. are assumed in the LAN bubble above but are omitted for clarity.

The configuration illustrated in FIG. 16B poses several challenges: Installation/operational simplicity: Small offices often operate with little to no information technology staff available for applications training, management or installation. The generic nature of WebDAV/iCal services: No calendar behaviors really exist within a WebDAV/iCal service. Instead, the application provides a web-based transactional-based information storage service on which a group calendaring system may be built. Minimizing communications hops: Offsite hosting creates large, variable latencies during communication with the WebDAV server. A variety of software architectures may be used to address these challenges. These are described below.

In some embodiments, installation and operational simplicity are linked as an issue but are accomplished in several only somewhat related ways as follows: Installation of software may be limited to client workstations such that no administrator access to any form of server machine is necessary. Two software elements may be used to fulfill the SA behaviors in each of two client workstations. One of these may be an SPD management utility to fulfill the same purpose as the Outlook VBA application. The other may be a separate supporting service. Both software elements may be installed in the same process. In this way, no decisions regarding which one is needed under what conditions may be necessary. Delegation may be handled using an email notification that indicates the delegation status for the resource to be managed. An attached executable file, which is generated and pre-configured for the WebDAV options necessary, may be optionally installed to install the components necessary to manage the resource.

Figure 16C:
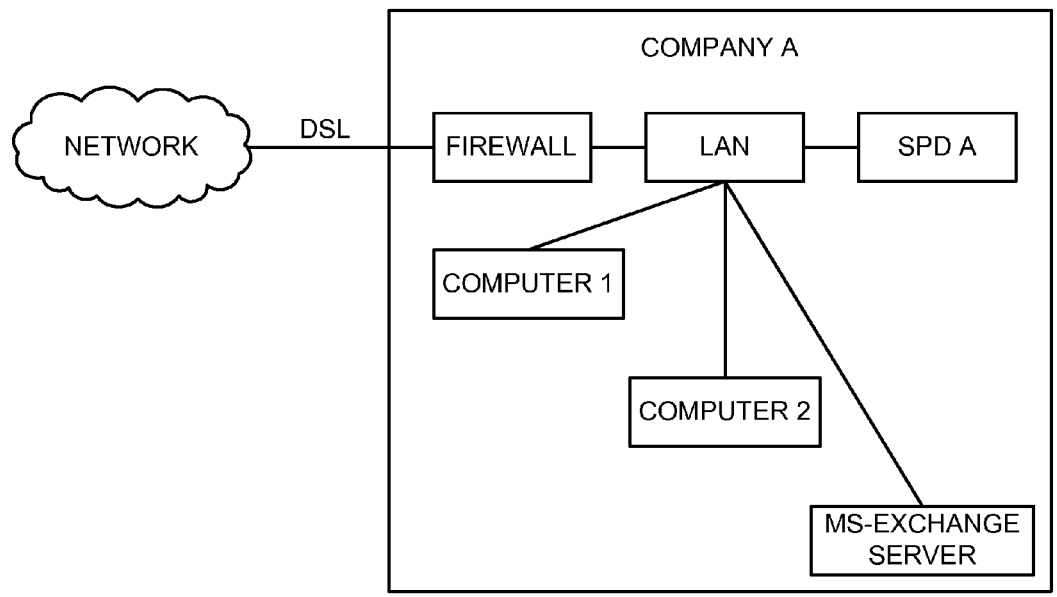
FIG. 16C is a block diagram illustrating a computer network having an MS-Exchange server.

For medium-to-large offices using MS Exchange, FIG. 16C illustrates a local MS-Exchange server for their mail services. In this example, Company A may have 3 conference rooms, and computers 1 and 2 may be running Outlook and the SPD Software Agent (SA). Note the more direct connections between the system components. Once again, routers, hubs, etc. are assumed in the LAN bubble above but are omitted for clarity.

Figure 16D:
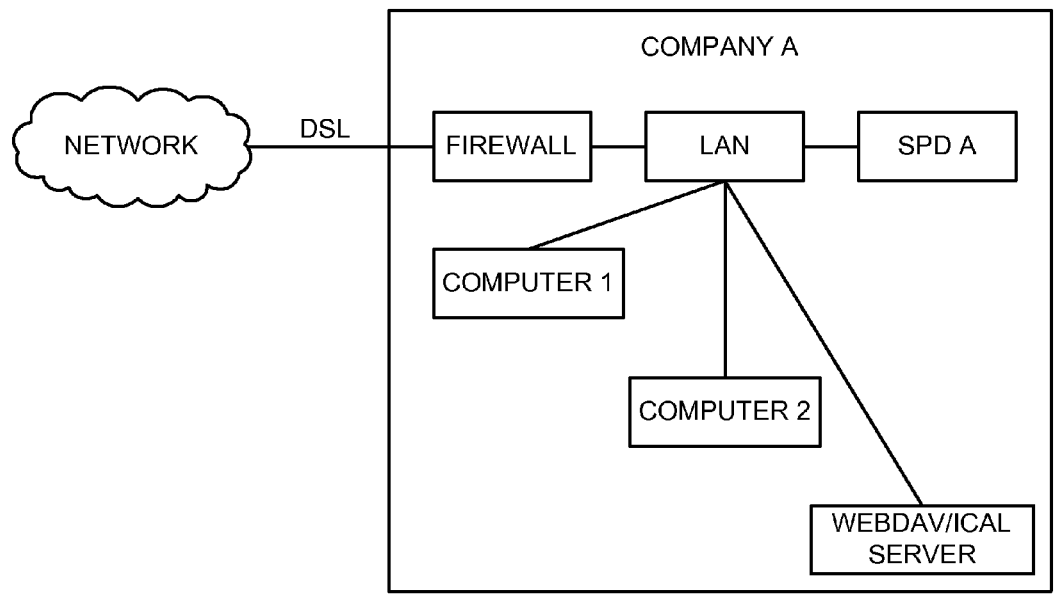
FIG. 16D is a block diagram illustrating another computer network.

For medium-to-large offices using off-site hosted WebDAV, FIG. 16D illustrates a local WebDAV server for iCalendar services. In this example, company A may have 3 conference rooms, and computers 1 and 2 may be running SPD management utilities and Software Agent (SA). Note the more direct connections between the system components. Once again, routers, hubs, etc. are assumed in the LAN bubble above but are omitted for clarity.

In other embodiments (not shown), the SPDs may be used in systems that implement or use Microsoft Outlook and/or Lotus Notes (an application offered by IBM).

The remote device(s), such as computer devices 104 (e.g., as described in FIG. 1) may have a CPU and a memory (e.g., shown as 122 and 120 in FIG. 1, respectively). The CPU of the remote device(s) 104 may be similar to the CPU 202 of the SPDs 102. The memory of the remote device(s) 104 may be similar to the memory 204 of the SPDs 102. The type, functionality, throughput and/or capacity of the CPU and/or the memory of the remote device(s) 104 may be varied according to the design criteria of a particular implementation.

The remote device(s) 104 may also be implemented as the mobile computing device 170 and/or the network data services device 172. For example, the software agent 1010a may be stored in the memory of the mobile computing device 170a (e.g., as shown in FIG. 15). In another example, the software agent 1020 may be stored in the memory of the network computing services 174 (e.g., as shown in FIG. 15). The implementation of the remote device(s) 104 may be varied according to the design criteria of a particular implementation.

Effective use of equipment and/or resources may be an important factor for management of an enterprise environment (e.g., a hospital, a corporate office, a government services building, etc.). For example, efficient room reservation may prevent conflicting use of resources. In some embodiments, pieces of equipment (e.g., resources) may not be fixed to rooms and/or locations. For example, resources may be mounted on movable stations and/or trolleys. In another example, some equipment may be leased and/or rented for a particular occasion.

In an embodiment implemented in a hospital, room reservations may be expanded to include movable equipment. Generally, enterprise environments may want an effective way to trace/track resources to ensure resources are available and not underutilized (e.g., used inefficiently). Different types of rooms may have different purposes. For example, some rooms may be used for consultations and/or examinations. In another example, some smaller rooms may be for patient care and/or small meetings. In yet another example, rooms may be used for operations (e.g., a sterile environment). In another example, large rooms may be used for large gatherings (e.g., dozens and/or hundreds of people). In still another example, some rooms may have expensive lab equipment such as MRIs and/or X-ray machines. The predictability of needs for each type of room may be different. There may be an associated risk when a piece of equipment and/or resource goes offline and/or becomes unavailable.

Resources may be rooms, equipment (e.g., stationary equipment such as MRI machines, moveable equipment such as defibrillator units, etc.), personnel, heating and cooling systems, emergency systems, security systems, etc. The type of resource may be varied according to the design criteria of a particular implementation. The resources may have a consumable such as a refillable product (e.g., toner, water level, chemical level, power capacity, etc.). For example, if the resource is personnel the consumable may be considered an amount of time available for efficient and/or safe work before rest is needed. In some embodiments, the resources may have an expiry time (e.g., a time when the consumable needs replacing, a time before maintenance is needed, a time before the entire resource should be replaced, etc.). The resources should be configured to satisfy health, safety and/or regulatory standards. The type of resource and/or consumable may be varied according to the design criteria of a particular implementation.

In some embodiments a resource may be backed-up with a secondary power source (e.g., a battery). For example, in regular circumstances the battery may not be used, but the battery may have a mandated level of charge to ensure compliance (e.g., safety concerns, regulatory compliance, etc.). The level of charge of the batter may be affected by storage time, battery deterioration and/or actual usage. For example, battery-powered resources, especially movable equipment, should satisfy battery compliance.

Generally, enterprise environments want the right equipment at the right place to ensure efficient use of resources. For example, in some cutting-edge hospitals stations may be implemented as mobile robots. In another example of a conventional hospital environment, hospital stations may flag and/or signal an orderly, nurse and/or technician to indicate where to be and/or go next. The remote device(s) 104 may implement scheduling data to ensure efficient use of resources.

Determining scheduling data may be a resource-constrained project scheduling problem (e.g., RCPSP). The remote device(s) 104 may formulate the RCPSP to determine the scheduling data. The scheduling data may be comprised of various activities. The remote device(s) 104 may determine that there are N activities in a project. For example, a set (e.g., $J=\{j\_0, j\_1, \ldots, j\_N, j\_N+1\}$) may denote the set of activities. The remote device(s) 104 may implement restraints to manage and/or solve the RCPSP. For example, constraints may be that activities cannot be both segmented and preempted (e.g., the activities have to be scheduled).

Generally, some activities may have to precede others (e.g., have a higher priority, be completed sooner, etc.). The remote device(s) 104 may determine precedence and/or priority by managing precedence relationships. For example, the precedence relationships may be represented by an acyclic graph (e.g., represented as $G=(V, E)$) stored in the memory of the remote device(s) 104. The vertices V of the acyclic graph may be a set of activities. The edges E of the acyclic graph may represent the precedence relationship. In some embodiments, a placeholder activity (e.g., $j\_0$) having no predecessor and/or a placeholder activity (e.g., $j\_N+1$) having no successor may be implemented for analytical convenience.

The remote device(s) 104 may determine a set (e.g., $Q=\{q\_0, q\_1, \ldots, q\_i, \ldots, q\_M\}$) to denote renewable resource types. The remote device(s) 104 may determine a set (e.g., $R=\{rq\_0, rq\_1, \ldots, rq\_i, rq\_M\}$) to denote a resource capacity for resource of type. For example, the value $rq\_i$ may be a value greater than or equal to zero indicating the resource capacity of the renewable resource type $q\_i$. Each activity in the set J may have an associated duration (e.g., $dj\_0, dj\_1, \ldots, dj\_i, \ldots, dj\_N+1$). Each activity in the set J may have an associated resource requirement (e.g., $rjq\_0, rjq\_1, \ldots, rjq\_i, \ldots, rjq\_M$), where $rjq\_i$ may represent a requirement of resource the $q\_i$ when activity j is scheduled.

The remote device(s) 104 may store a schedule. The schedule may be denoted by a vector (e.g., $S=\{sj\_0, sj\_1, \ldots, sj\_N, sj\_N+1\}$), where $sj\_N$ denotes a start time of the activity $j\_N$. A makespan may be defined. The makespan may be a difference between a maximum finish time and a minimum starting time over all activities. The remote device(s) 104 may determine whether a schedule is feasible. For example, the schedule may be feasible if (1) no activity is started before predecessors of the activity are finished and (2) for every time t, a sum of the resource requirements for all ongoing activities does not exceed enforced capacities.

The RCPSP solved by the remote device(s) 104 may comprise finding a feasible schedule with a minimal makespan. The remote device(s) 104 may implement techniques to solve the RCPSP. For example, one technique to solve the RCPSP is the Ant Colony Optimization method. More details on Ant Colony Optimization may be found in "Ant Colony Optimization for Resource-Constrained Project Scheduling", by Merkle et al, IEEE Trans. On Evolutionary Computation, Vol. 6, August 2002 and "Using an Enhanced Ant Colony System to Solve Resource-Constrained Project Scheduling Problem", by Chen et al, IJCSNS, Vol. 6, No. 11, November 2006, the appropriate sections of which are incorporated by reference. The technique implemented to solve the RCPSP may be varied according to the design criteria of a particular implementation.

The remote device(s) 104 may determine the scheduling data by mapping the management problem to the RCPSP. In some embodiments, rooms, movable equipment stations and/or personnel may be denoted as resources. Resources of the same type may be considered fungible. For an example in a hospital, there may be 5 examination rooms which are all similar and/or identical for most purposes. The 5 examination rooms may be given a resource label of 'Examination Room', and a resource capacity value of 5. In another example, there may be 3 identical rooms for meetings. The identical meeting rooms may be given a resource label of 'Customer Meeting Room' and/or 'Staff Meeting Room'.

Some resources may be non-fungible for some purposes. For an example in a hospital, there may be four ophthalmologists on call, all fungible for most purposes (e.g., have the same credentials and/or capable of performing the same activities). However, if a patient requests a specific specialist then the requested ophthalmologist become non-fungible (e.g., the resources may not be capable of performing the same activity). In another example, various meeting rooms may be suitable for most purposes and may be part of the same resource capacity. However, one room may have extra equipment (e.g., a projector) and may be non-fungible for a particular purpose. The remote device(s) 104 may label each resource having a non-fungible purpose with a unique label. The unique label may be one implementation to resolve non-fungible functions performed by the resources.

Customer and/or patient services and/or demands may be mapped as activities. In one example, if a patient requests a consultation with a dermatologist then the consultation may become an activity to be scheduled. In another example, if a patient is to be admitted overnight then the room reservation may become an activity. In yet another example, if a client sets up a meeting with a facility manager then the facility manager meeting may become an activity. In still another example, if a group books an outdoor activity on the front lawn of an office complex over the weekend, the booking of the front lawn may become an activity.

The activities may be assumed to last a pre-determined time unit (e.g., a time slot of one hour, a time slot of 30 minutes, a time slot of 15 minutes, etc.). Activities that last longer than the pre-determined time slots may be broken-up into units having the same time as the pre-determined time slots. Activities that last longer than the pre-determined time slots may form contiguous blocks of time. Contiguous blocks of time may be enforced by storing these as precedence relationships in the acyclic graph $G=(V, E)$.

In some embodiments, specific treatments and/or studies during a patient stay may be represented as activities. For example, a heart-surgery patient may need a lung capacity test twice a day, which may be entered as two activities. The precedence relationships may be that both of the lung capacity tests have to be scheduled after the surgery. Further precedence relationships may be that the second of the lung capacity tests should be performed after a certain amount of time after the first of the lung capacity tests.

The remote device(s) 104 may model the enterprise management as a type of RCPSP. For an example of a hospital, the hospital may want to clear an activity queue as quickly as possible (e.g., to discharge patients quickly and/or file claims with the insurance company). However, unlike a conventional RCPSP, the scheduling data in the enterprise environment may be revised constantly (e.g., at pre-defined intervals, as new information is received, as prompted by a user, etc.).

The remote device(s) 104 may perform refinement rounds for various time frames (e.g., similar to how weather forecasting operates). For example, an RCPSP refinement round may be performed by the remote device(s) 104 for the next 6-8 hours. In another example, an RCPSP refinement round may be performed by the remote device(s) 104 for the next 24 hours. In yet another example, an RCPSP refinement round may be performed by the remote device(s) 104 for the next 5-7 days. The time frame of the refinement rounds may be varied according to the design criteria of a particular implementation.

The SPDs 102 may be assigned and/or paired with every possible resource. Assigning the SPDs 102 to each resource provides each resource with an ability to self-monitor, switch to stand-by mode and/or wake from sleep when the resource is scheduled to be used. Using the SPDs 102, the resource may communicate with the remote device(s) 104. The SPDs 102 may select one or more modes based on the scheduling data. For example, the SPDs 102 may enter an active state during an activity and/or an inactive (e.g., low-power) mode during an activity based on whether the assigned resource is used for the particular activity.

In some embodiments, personnel may wear one of the SPDs 102. For example, in a hospital environment emergency residents may be assigned one of the SPDs 102. The SPDs may measure an alertness (e.g., based on hours spent working) of the emergency workers. The SPDs 102 may indicate to the emergency workers that time is available to rest. While the emergency workers are resting, the SPDs may communicate to the remote device(s) 104 that the worker is unavailable. In another example, the SPDs 102 may indicate that unionized employees should stop working to prevent the employees from exceeding overtime regulations.

The SPDs 102 may be in communication with the remote device(s) 104. The SPDs 102 may store updated the scheduling data communicated by the remote device(s) 104 in the memory 204. For example, the SPDs may communicate periodically, as new information is available to send, and/or at pre-determined time periods. The remote device(s) 104 may receive updates about incoming activities involving the resources assigned to the SPDs 102. For example, a mobile instrument station may start signaling and/or flagging that the resource (e.g., the mobile instrument station) should be moved to a new location (e.g., to be used for a different activity). In another example, a consultation room may display a name of the next patient on a door plate display (e.g., one of the SPDs 102 configured to operate as a display). In yet another example, an ICU nurse may be messaged by the SPD 102 to perform a check (e.g., one of the activities). In still another example, a staff member may be reminded by the SPD 102 to check that a conference room is prepared for a meeting. The remote device(s) 104 may send updated scheduling data to the SPDs 102 (e.g., the scheduling data may be updated based on information sent by the SPDs 102 to the remote device 104).

The SPDs 102 may be configured to flag the assigned resource as unavailable. For example, the SPD 102 may perform a diagnostics test to detect a malfunction (e.g., of the assigned resource and/or the SPD 102). If the SPD 102 flags the resource as unavailable a communication may be sent to the remote device(s) 104. The remote device(s) 104 may reduce the resource capacity of the resource that is unavailable. For example, the next refinement round may not include the unavailable resource. The unavailable resource may not be used during the refinement rounds until the SPD 102 communicates that the resource is available (e.g., repaired, refilled, recharged, etc.).

In some embodiments, the SPDs 102 may be notified of future activities based on the scheduling data. The SPDs 102 may communicate to the remote device(s) 104 that the assigned resource may be depleted soon (e.g., the remote device 104 may check the power budget of the SPD 102 and/or the assigned resource). In one example, a portable generator may have enough gasoline (e.g., gas may be a consumable of the portable generator resource) for a current outdoor event, but not the next event. The resource assigned to the SPD 102 may be capable of completing the activity currently assigned but may not be capable of completing upcoming activities. For example, the back-up battery of the assigned resource may have enough charge for the ongoing shift, but not enough charge for the next day. The remote device 104 may communicate to the SPD 102 to enter a conservation and/or recovery mode of operation when the SPD 102 has an insufficient power budget.

The SPD 102 may signal to the centralized RCPSP (e.g., the remote device(s) 104) that the assigned resource will be unavailable. The remote device(s) 104 may retire the resource from the refinement rounds for the next day, but not from the refinement rounds for the current shift. The resource paired with the SPD 102 may run a local scheduling problem to opportunistically go into recharge and/or maintenance mode when not expected to be in use. For an example of irrigating an outdoor lawn, there may be a maintenance operation scheduled for a particular time of day (e.g., 8 pm). If another activity (e.g., an outdoor corporate function) spans past 8 pm the maintenance mode may not start. The SPDs handling the sprinkler system may delay irrigation to the next available opportunity.

The enterprise environment may also comprise an outdoor environment (e.g., the front lawn of an office complex). For example, the SPDs 102 may measure grass deterioration. If the grass deterioration level exceeds a pre-determined amount, the resource (e.g., use of the lawn) may be retired until the grass recovers.

The remote device(s) may include risk metrics when determining the scheduling data. The resources may be assigned usage risk (e.g., based on a current condition of the resource, a capacity of the resource, etc.). Each time slot may be assigned a risk capacity. For example, the risk capacity may be a risk budget the enterprise environment is capable of handling and/or may be afforded at a particular time. The determination of usage risk and/or the risk capacity of time slots may be varied according to the design criteria of a particular implementation.

For an example of a hospital, fewer specialists and/or personnel may be available during a night shift. The remote device(s) 104 may determine there is low risk capacity during the time slots of the night shift (e.g., fewer resources are available if some resources fail). In some embodiments context information and/or historical data may be used to determine risk capacity. For example, the enterprise environment may expect more activity on certain dates. The remote device(s) 104 may be programmed (e.g., based on management decisions of the enterprise environment) to lean towards safety prior to and/or during a particular period and assign a low risk capacity.

The SPDs 102 assigned to the resources may be configured to self-monitor and/or update a risk cost associated with the assigned resource. The SPDs 102 may determine the risk cost associated with the assigned resource based on various factors. For example, the risk cost associated with the resource may be inferred from collected data and/or historical data using machine learning techniques. In an example of a hospital, the risk cost may be a function of a medical history of the patient and/or a patient type (e.g., the risk cost may not always be a function of something intrinsic to the resource). In another example, particular employees may be known to be careless with some resources. The resource may be assigned a higher risk cost when assigned to the careless employee.

Based on the risk metrics the scheduling data may be different. For example, risky activities may be spread in time to avoid clustering risky activities together. In another example, risky activities may be managed by scheduling the activity when more resources are available (e.g., provide a higher probability of avoiding the risk and/or manage the risk better if an undesirable outcome occurs).

Figure 18:
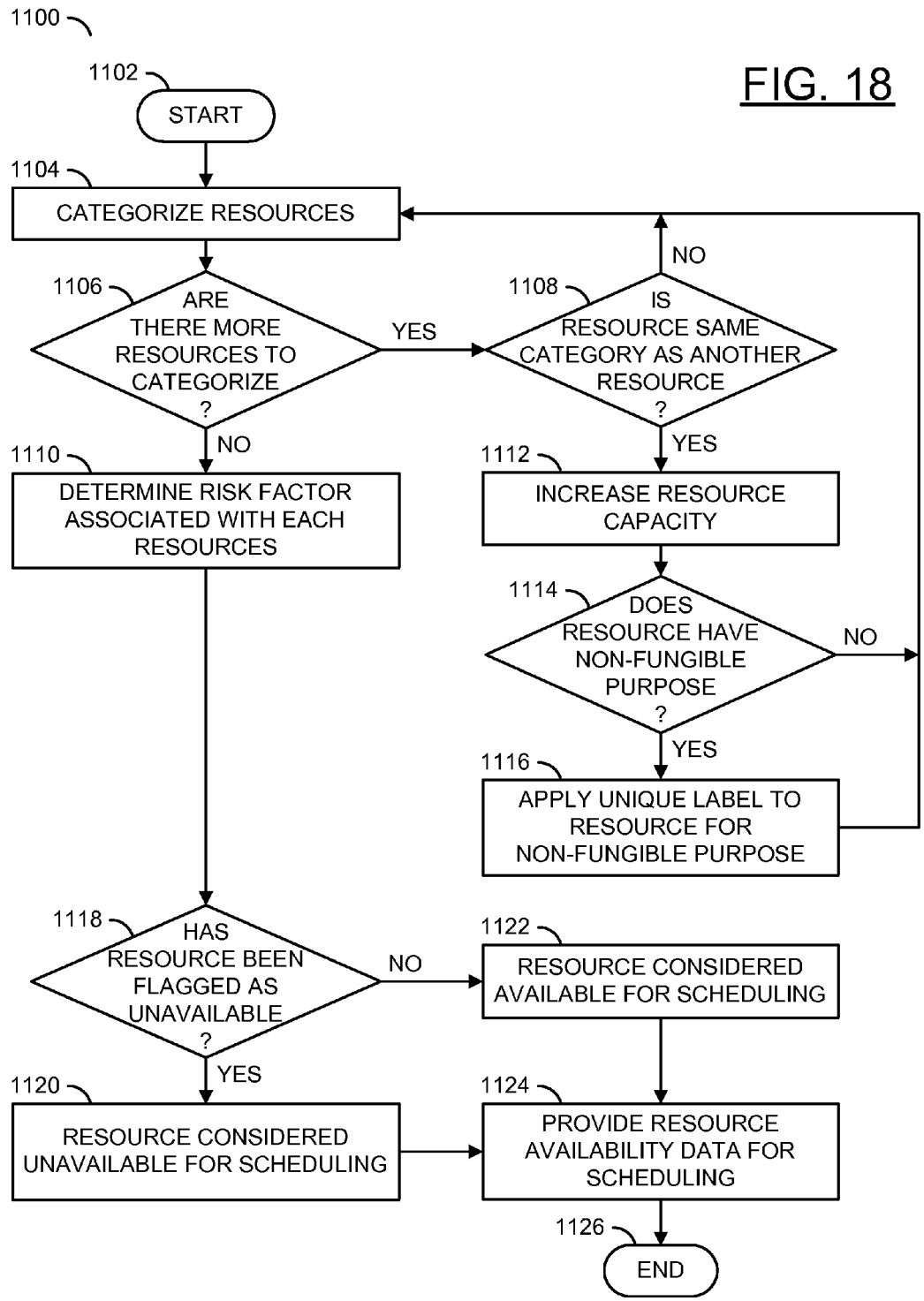
FIG. 18 is a flow diagram illustrating a method for categorizing resource availability.

Referring to FIG. 18, a flow diagram of a method 1100 is shown. The method 1100 may categorize resource availability. The method 1100 generally comprises a step (or state) 1102, a step (or state) 1104, a decision step (or state) 1106, a decision step (or state) 1108, a step (or state) 1110, a step (or state) 1112, a decision step (or state) 1114, a step (or state) 1116, a decision step (or state) 1118, a step (or state) 1120, a step (or state) 1122, a step (or state) 1124, and a step (or state) 1126.

The step 1102 may be a start state. In the step 1104, the remote device(s) 104 may categorize one or more resources (e.g., based on information from the SPDs 102). The decision step 1106 may determine if there are more resources to categorize. If so, the method 1100 moves to the decision step 1108. If not, the method 1100 moves to the step 1110. The decision step 1108 determines if a particular resource is in the same category as another resource. If so, the method 1100 moves to the step 1112. If not, the method 1100 moves back to the step 1104. The step 1112 may increase a resource capacity. Next, the decision step 1114 determines if a particular resource has a non-fungible purpose. If not, the method moves back to the step 1104. If so, the method moves to the step 1116. The step 1116 applies a unique label to the resource for the non-fungible purpose.

In the step 1110 the remote device(s) 104 may determine a risk factor associated with each of the resources (e.g., based on information from the assigned SPDs 102). Next, the decision step 1118 determines if a resource has been flagged as unavailable. If so, the method 1100 moves to the state 1120. If not, the method 1100 moves to the state 1122. The step 1120 marks a resource as considered unavailable for scheduling. The method 1100 then moves to the step 1124, which provides a resource availability data for scheduling. The step 1122 marks a resource as considered available for scheduling. The method 1100 then moves to the step 1124. Next, the step 1126 ends the method 1100.

Figure 19:
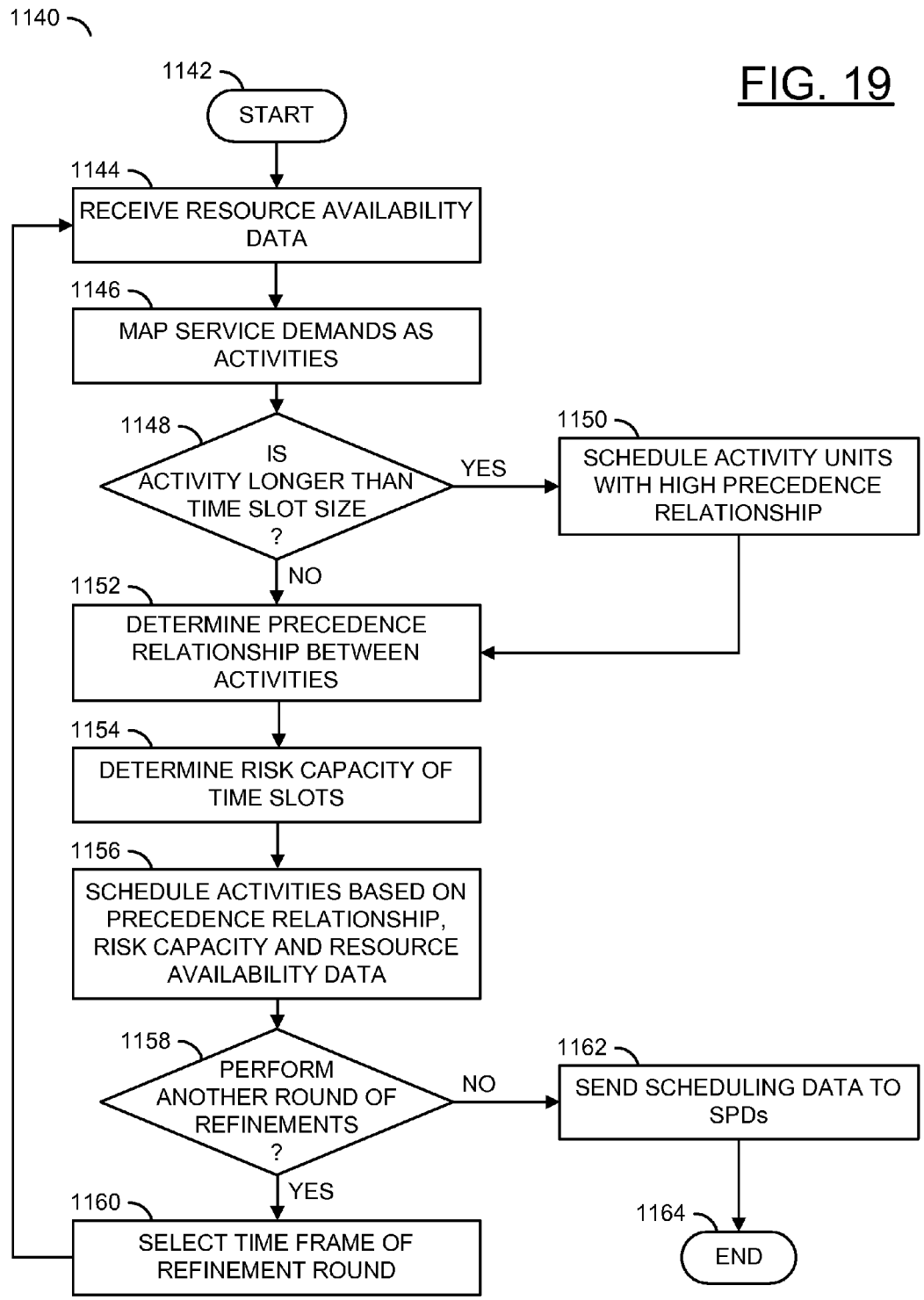
FIG. 19 is a flow diagram illustrating a method for determining scheduling data.

Referring to FIG. 19, a flow diagram of a method 1140 is shown. The method 1140 may determine scheduling data. The method 1140 generally comprises a step (or state) 1142, a step (or state) 1144, a step (or state) 1146, a decision step (or state) 1148, a step (or state) 1150, a step (or state) 1152, a step (or state) 1154, a step (or state) 1156, a decision step (or state) 1158, a step (or state) 1160, a step (or state) 1162, and a step (or state) 1164. The step 1142 starts the method 1140. In the step 1144, the remote device(s) 104 receives resource availability data. Next, the step 1146 maps service demands as activities. Next, the decision step 1148 determines if the activity is longer than a time slot. If so, the method 1140 moves to the step 1150. If not, the method 1140 moves to the step 1152. The step 1150 schedules the activity units with a high precedence relationship. The step 1150 moves to the step 1152. In the step 1152, the remote device(s) 104 determines a precedence relationship between the activities.

Next, the step 1154 determines a risk capacity of the time slots. Next, the step 1156 schedules the activities based on precedence relationships, risk capacity and/or resource availability data. Next, the decision step 1158 determines if another round of refinements are needed. If so, the method 1140 moves to the step 1160. If not, the method 1140 moves to the step 1162. The step 1160 selects a time frame of a subsequent refinement round, then moves back to the step 1144. The step 1162 sends scheduling data to the SPDs 102. The step 1164 ends the method 1140.

Figure 20:
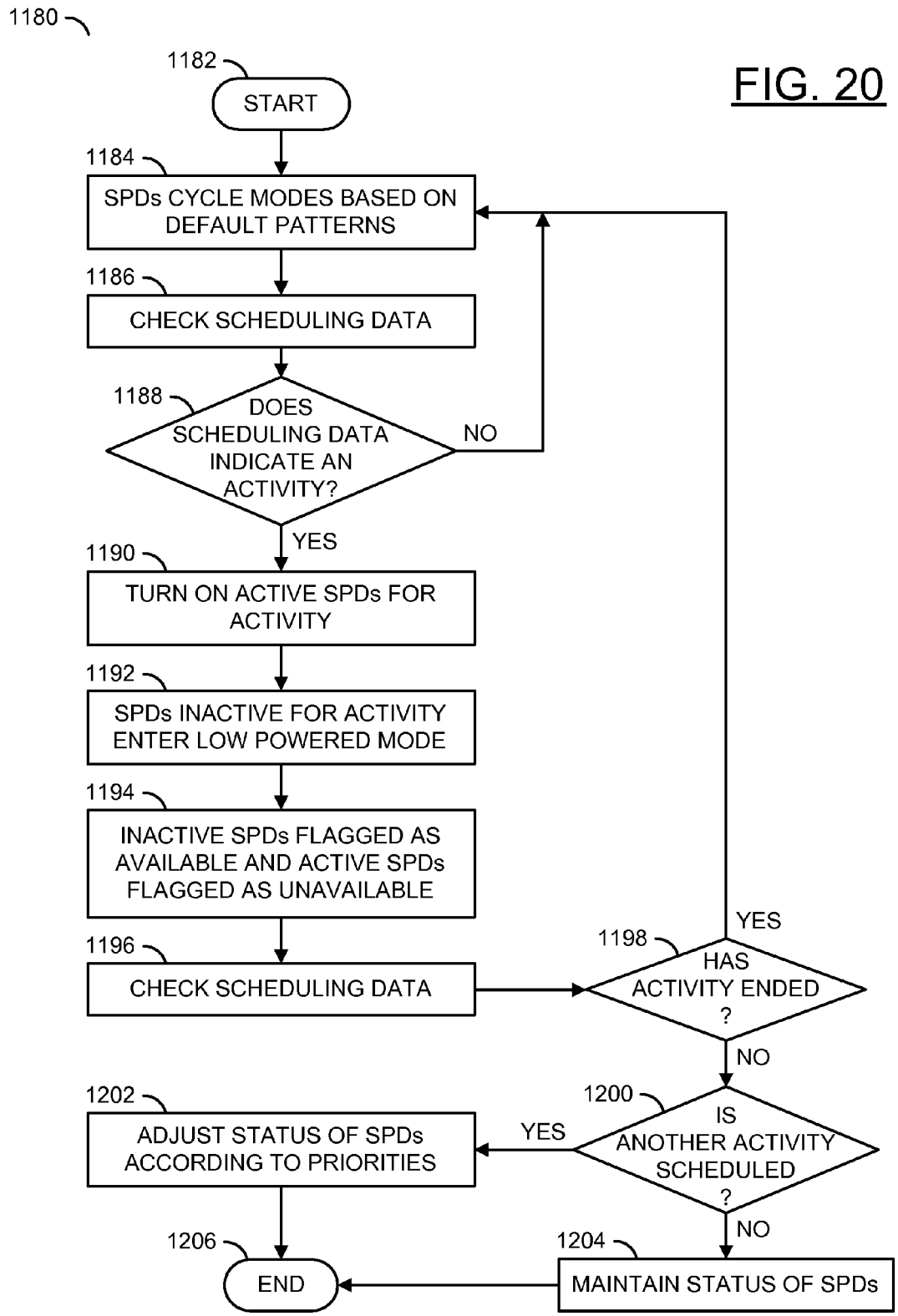
FIG. 20 is a flow diagram illustrating a method for operating self-powered devices and/or associated resources based on scheduling data.

Referring to FIG. 20, a flow diagram of method 1180 is shown. The method 1180 may operate the SPDs 102 and/or the associated resources based on the scheduling data. The method 1180 generally comprises a step (or state) 1182, a step (or state) 1184, a step (or state) 1186, a decision step (or state) 1188, a step (or state) 1190, a step (or state) 1192, a step (or state) 1194, a step (or state) 1196, a decision step (or state) 1198, a decision step (or state) 1200, a step (or state) 1202, a step (or state) 1204, and a step (or state) 1206. The step 1182 generally comprises a start step. In the step 1184, the SPDs 102 cycle between various modes based on default patterns (e.g., patterns already scheduled and/or pre-configured patterns). Next, the step 1186 checks the scheduling data. Next, the decision step 1188 determines if the scheduling data indicates an activity. If so, the method 1180 moves to the step 1190. If not, the method 1180 moves back to the state 1184.

The step 1190 turns on one or more active SPDs for a particular activity. In the step 1192, the SPDs inactive for the particular activity may enter a low powered mode. Next, in the step 1194, the inactive SPDs may be flagged as available and/or the active SPDs may be flagged as unavailable (e.g., for refinement rounds performed by the remote device(s) 104). Next, the step 1196 checks scheduling data. The decision step 1198 determines if a particular activity has ended. If so, the method 1180 moves back to the step 1184. If not, the method 1180 moves to the step 1200. The decision step 1200 determines if another activity has been scheduled. If so, the method 1180 moves to the step 1202. If not, the method 1180 moves to the step 1204. The step 1202 adjusts a status of the SPDs 102 according to the priorities (e.g., based on the precedence relationships). The step 1204 maintains the status of the SPDs 102. The step 1206 ends the method 1180.

Figure 21:
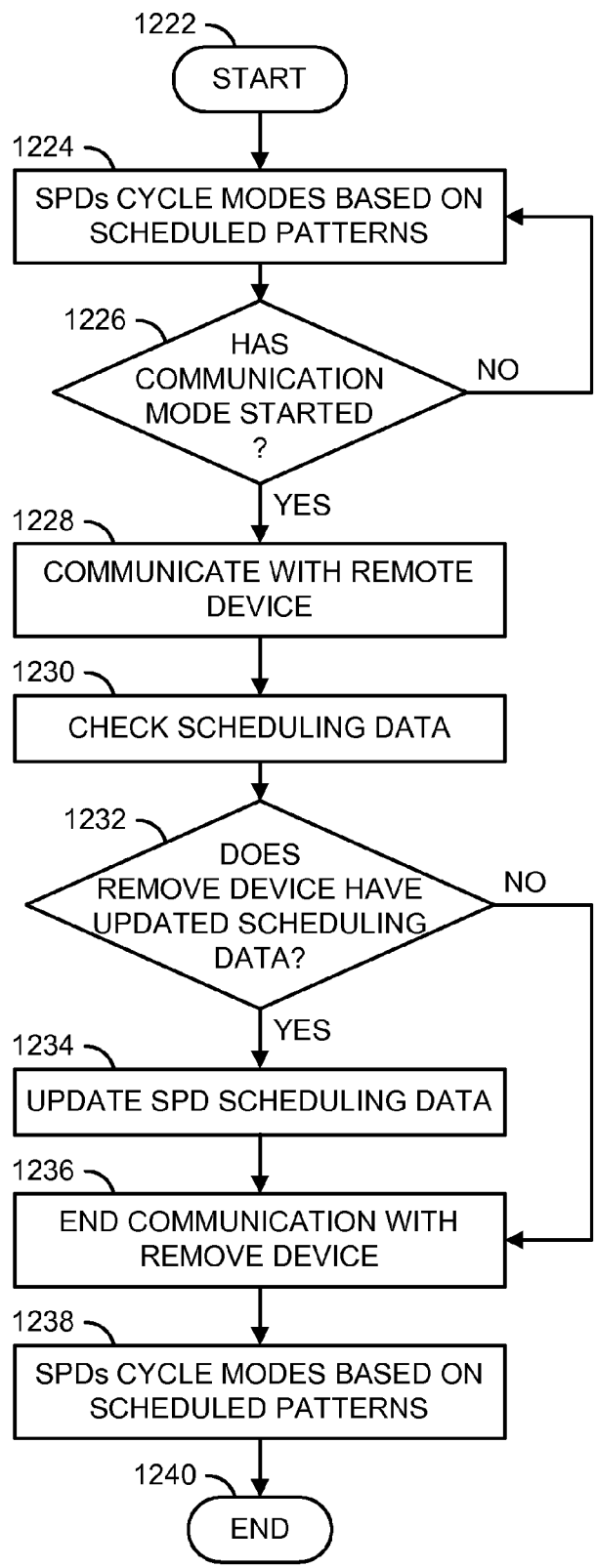
FIG. 21 is a flow diagram illustrating a method for updating scheduling data for self-powered devices from a remote device.

Referring to FIG. 21, a flow diagram of a method 1220 is shown. The method 1220 may update scheduling data for the SPDs 102 from the remote device(s) 104. The method 1220 generally comprises a step (or state) 1222, a step (or state) 1224, a decision step (or state) 1226, a step (or state) 1228, a step (or state) 1230, a decision step (or state) 1232, a step (or state) 1234, a step (or state) 1236, a step (or state) 1238, and a step (or state) 1240.

The step 1222 may be a start step. The step 1224 may cycle modes of the SPDs 102 based on one or more scheduled patterns. Next, the decision step 1226 determines if a communication mode has started. If not, the method 1220 moves back to the step 1224. If so, the method 1220 moves to the step 1228. In the step 1228, the SPDs 102 communicate with the remote device 104. Next, the step 1230 checks the scheduling data. Next, the decision state 1232 determines if the remote device 104 has updated the scheduling data. If so, the method 1220 moves to the step 1234. If not, the method 1220 moves to the step 1236. The step 1234 updates the SPD scheduling data. The step 1236 ends communication with the remote device 104. The step 1238 cycles the modes of the SPDs based on the scheduled patterns (e.g., the scheduling data). Next, the step 1240 ends the method 1220.

Figure 22:
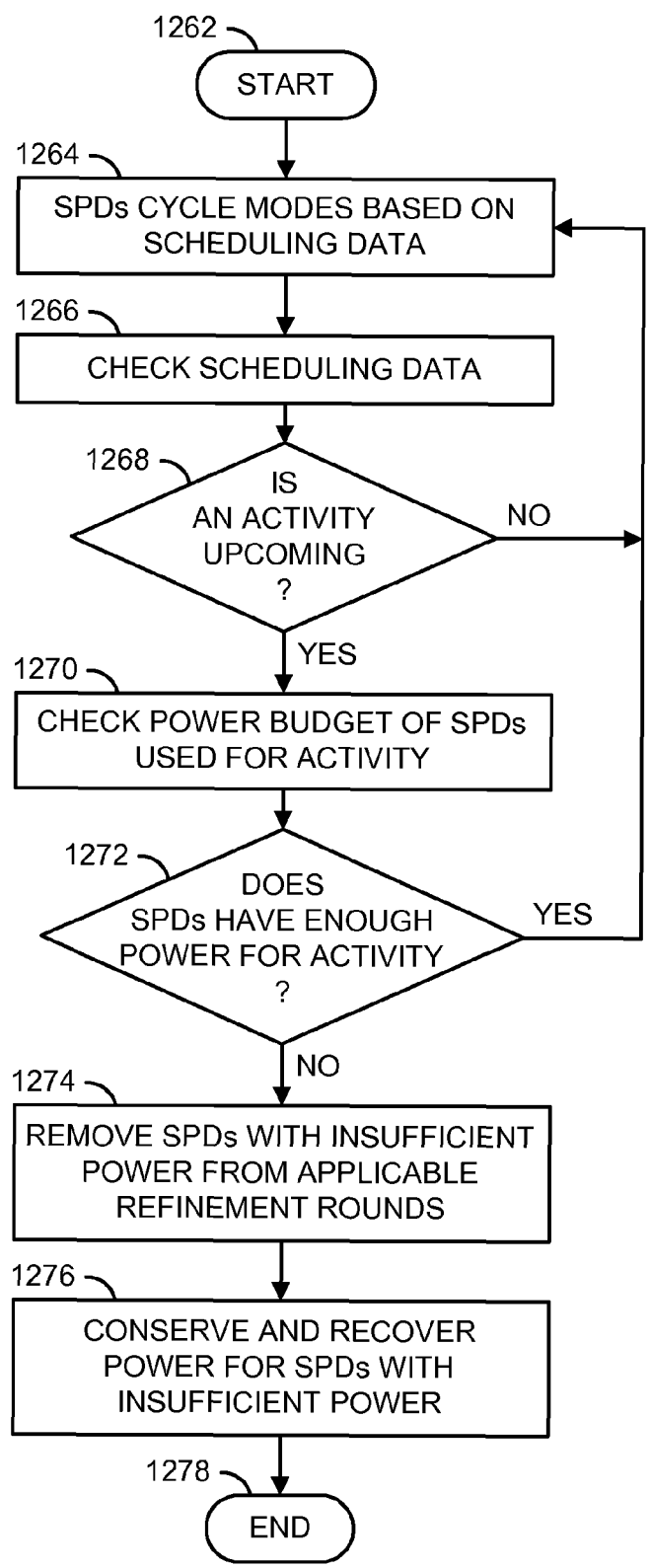
FIG. 22 is a flow diagram illustrating a method for checking a power budget of self-powered devices.

Referring to FIG. 22, a flow diagram of a method 1260 is shown. The method 1260 may check a power budget of the SPDs 102. The method 1260 generally comprises a step (or state) 1262, a step (or state) 1264, a step (or state) 1266, a decision step (or state) 1268, a step (or state) 1270, a decision step (or state) 1272, a step (or state) 1274, a step (or state) 1276, and a step (or state) 1278. The step 1261 may be a start step. Next, the step 1264 may cycle modes of the SPDs 102 based on the scheduling data. Next, the step 1266 may check the scheduling data. Next, the decision step 1268 determines if there is an upcoming activity. If not, the method 1260 moves back to the step 1264. If so, the method 1260 moves to the step 1270. The step 1270 checks the power budget of the SPDs 102 used for the specified activity. Next, the decision step 1272 determines if the SPDs 102 have enough power for the activity. If so, the method moves back to the step 1264. If not, the method 1260 moves to the step 1274. The step 1274 removes the SPDs with insufficient power from the applicable refinement rounds (e.g., the next shift, the next day, the next week, etc.). Next, the step 1276 conserves and/or recovers power for the SPDs with insufficient power. Next, the step 1278 ends the method 1260.

Figure 23:
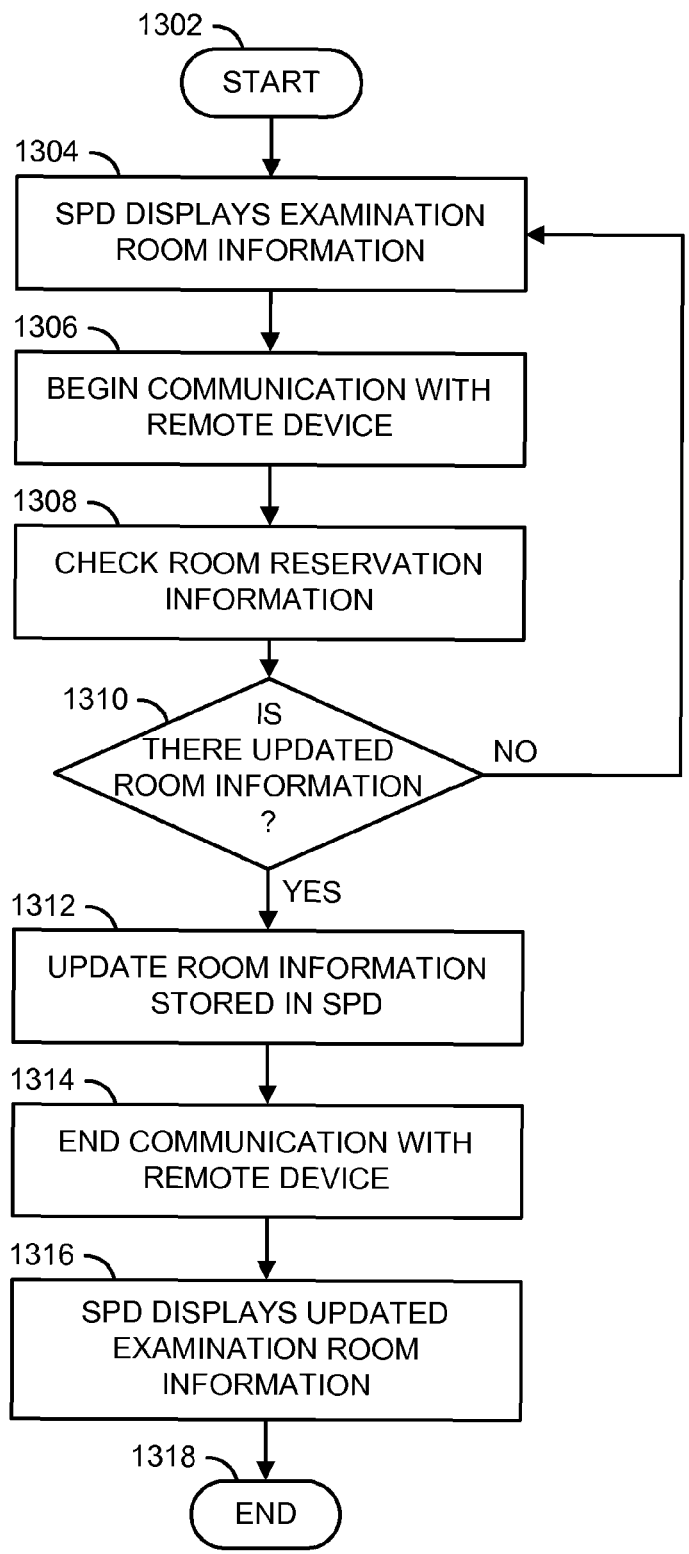
FIG. 23 is a flow diagram illustrating a method for displaying resource availability of an examination room.

Referring to FIG. 23, a flow diagram of a method 1300 is shown. The method 1300 may display resource availability of an examination room. The method 1300 generally comprises a step (or state) 1302, a step (or state) 1304, a step (or state) 1306, a step (or state) 1308, a decision step (or state) 1310, a step (or state) 1312, a step (or state) 1314, a step (or state) 1316, and a step (or state) 1318. The step 1302 may be a start step. In the step 1304, the SPD (e.g., a display device) may display examination room information. Next, in the step 1306 the SPD 102 begins communication with the remove device 104. Next, the step 1308 checks the room for reservation information (e.g., an activity from the scheduling data). Next, the step 1310 determines if there is updated information for the room. If not, the method 1300 moves back to the step 1304. If so, the method 1300 moves to the step 1312. The step 1312 updates the room information stored in the SPD (e.g., in the memory 204). Next, in the step 1314 the SPD ends the communication with the remote device 104. Next, in the step 1316 the SPD displays updated examination room information. The step 1318 ends the method 1300.

The SPDs 102 may be configured to perform a self-assessment of the assigned/paired resource. The self-assessment may determine an amount of measured wear of the assigned resource. For example, the measured wear may be a fluid level of the resource (e.g., a lubricant level). In another example, the amount of measured wear may be a number of recharges of a rechargeable battery pack. The SPDs 102 may communicate the amount of measured wear to the remote device(s) 104. In some embodiments, the SPDs 102 may be configured to run and/or solve a local scheduling problem to opportunistically enter a maintenance mode for the assigned resource. The maintenance mode may be entered based on the scheduling data and/or the amount of measured wear (e.g., a function of the measured wear). In some embodiments, the maintenance mode may be performed by the SPD 102 and/or the assigned resource (e.g., recharging a battery, cooling down, waiting for a lawn to regrow, etc.). In other embodiments, the maintenance mode may be performed by personnel (e.g., repair personnel).

In some embodiments, the resources may be leased equipment. The SPDs 102 assigned and/or paired to leased resources may flag the leased resource as unavailable. For example, a manager of the enterprise environment may determine a budget (e.g., a cap) for various resources. The leased resource may have a cost driven by actual usage. The leased resource may be flagged as unavailable if an accumulated cost over a time period exceeds a pre-determined cap. For example, a vehicle may be leased based on mileage (e.g., use). When the vehicle reaches a particular mileage, the cost of continued use of the vehicle may exceed the available budget. The vehicle may be flagged as unavailable to prevent exceeding the available budget.

In some embodiments, the remote device(s) 104 may assign prices (e.g., a representation of a value of the resource) to the resources. The activities in the scheduling data may be assigned budgets. The assigned prices of the resources may go up or down based on an amount and/or a demand of the resource. For example, the assigned price of a resource may increase as the resource becomes depleted (e.g., has a lower capacity). In another example, the assigned price of the resource may increase when the resource is in high demand. The SPDs 102 and/or the remote device(s) 104 may communicate and/or update the assigned prices of the various resources. The remote device(s) 104 may use the assigned prices of the resources and/or the assigned budgets of the activities to determine the scheduling data.

In some embodiments, the SPDs 102 assigned and/or paired with the resources may be configured to adjust settings of the assigned resources. For example, a setting may be a high-speed mode and a low-speed mode for a fan. In another example, the setting may be an intensity of lights in a meeting room. In yet another example, the setting may be turning on/off lawn sprinklers. The type of setting may be varied according to the design criteria of a particular implementation.

Some resources may perform similar activities. In some embodiments, using one resource may have an indirect effect. For example, a setting to open a ceiling skylight in an office building may be performed to let in more natural light. However, an indirect effect may be that opening the ceiling skylight lets more heat into the office building. For example, the remote device(s) 104 may know that the ceiling skylights are scheduled to be open and a heat level in the enterprise environment may be increased. Based on the activation of one resource (e.g., the skylight being opened) another of the resources may have a setting changed (e.g., the air conditioning system may be activated to operate at a higher capacity).

The SPDs 102 may be assigned and/or paired with resources. Based on the type of resource assigned, the SPD 102 may perform a particular function. For example, a subset of the SPDs 102 may be proximity and/or presence SPDs. The proximity SPDs may be configured to detect a presence. In some embodiments, the proximity SPDs may be implemented using cameras, motion detectors, heat detectors, pressure sensors, RFID detectors, etc. For example, the proximity SPDs may be configured to perform facial recognition to distinguish between various people attending an activity. More details on methods for detecting a presence may be found in "A survey of human-sensing: Methods for detecting presence, count, location, track, and identity", by Teixeira et al., ACM Computing Surveys 5, 2010, the appropriate sections of which are incorporated by reference. The implementation of the proximity SPDs may be varied according to the design criteria of a particular implementation.

A number of people attending an activity may affect the amount of resources that should be allocated. For example, if a greater number of people attend the activity than accounted for during the refinement rounds performed by the remote device(s) 104 then more resources may need to be allocated for the activity. In another example, if a lesser number of people attend the activity than accounted for during the refinement rounds performed by the remote device(s) 104 then fewer resources may need to be allocated for the activity. The number of people attending the activity may be determined based on the presence detected by the proximity SPDs. The remote device(s) 104 may receive the detected presence information and then may run refinement rounds to re-allocate resources (e.g., provide updated scheduling data to the SPDs and/or the assigned resources).

The proximity/presence SPDs may be configured to detect people arriving/entering, currently present and/or leaving a room and/or working area. In some embodiments, the proximity SPDs may be configured to recognize a presence of specific individuals, a particular person, and/or a class of people (e.g., a VIP). For example, the VIP may be a CEO of a company.

Using the presence detected by the proximity SPDs, the RCPSP may change on the fly. Changing the RCPSP may affect resource capacity and/or the prioritization of the activities. For example, the precedence relationships may be altered based on the detected presence.

A consequence of presence may be an effect on consumption of one or more of the resources. For example, a lawn may need more time to recover based on the detected presence (e.g., if 100 people attend a garden party activity instead of 20 people). In another example, an AC unit may consume more electricity if an auditorium is at full capacity as opposed to half empty and/or completely empty. The SPDs 102 assigned/paired to the AC unit may be configured to select a higher power consuming mode of operation based on the presence detected in the auditorium by the proximity SPDs.

An expected number of attendees may affect the scheduling data and/or the allocation of resource for an activity. For example, context information may comprise the expected number of attendees. Generally, the RCPSP may be solved by the remote device(s) 104 using the expected number of attendees. For example, the expected number of attendees may be determined based on context information. The method of determining the expected number of attendees may be varied according to the design criteria of a particular implementation.

During an activity, presence information detected by the proximity SPDs may indicate that more or less resources are being consumed. In some embodiments, activities may span consecutive time slots. The remote device(s) 104 may assign more or less resources based on the detected presence (e.g., a number of attendees, a VIP being identified, etc.).

For example, a 2 hour seminar may be an activity scheduled in a company auditorium. The seminar activity may be broken up into 8 sequential activities (e.g., based on a time slot size of 15 minutes). The seminar may be encoded in the graph G=(V, E) by the remote device(s) 104. Based on the expected number of attendees, the refinement rounds may assign a given cost of the seminar in terms of resources (e.g., AC settings, equipment reserved, attending staff, etc.). If the remote device(s) 104 run the refinement rounds every hour, the scheduling data may be updated prior to the midpoint of the seminar (e.g., when 4 of the 8 activity time slots are still remaining for the seminar). Based on the presence detected by the proximity SPDs, the actual attendance may be determined. For example, if the actual attendance detected by the proximity SPDs indicates 50% of the expected attendance then the remote device(s) 104 may communicate to the SPDs 102 to reduce AC operation and/or reallocate some of the attending staff to other activities.

The detected presence by the proximity SPDs for one activity may affect the expected number of attendees for another activity (e.g., a related activity). For example, a cocktail reception may be scheduled after the seminar. The cocktail party may be a related activity of the seminar (e.g., the attendance of the seminar may be related to the attendance of the cocktail party). For example, if the actual attendance of the seminar is lower than expected then the expected number of attendees for the cocktail reception may be lowered accordingly.

Machine learning techniques may be implemented by the remote device(s) 104 to determine the expected number of attendees. For example, the remote device(s) 104 may use context information such as past attendance to similar activities. In another example, the remote device(s) 104 may estimate attendance to the activity based on a topic and/or keywords used to describe similar activities. An estimation of the expected number of attendees may be used as the expected attendance for a new activity. The method of determining the expected number of attendees and/or the context information used may be varied according to the design criteria of a particular implementation.

The detected presence by the proximity SPDs may affect the maintenance time of the resources. The SPDs 102 assigned and/or paired with the resources may receive presence detection information during the activity. In some embodiments, the remote device(s) 104 may receive the detected presence, update the scheduling data and then communicate the updated scheduling data to the SPDs 102. In other embodiments, the SPDs 102 may store the scheduling data and may make adjustments based on the detected presence communicated by the proximity SPDs. For example, the SPDs 102 may store the scheduling data along with rules and/or guidelines indicating permitted adjustments to the use of the assigned resource based on the presence detected (e.g., to allow the SPDs 102 to select modes of operation without receiving information from the remote device(s) 104).

Based on presence detected by the proximity SPDs, the need for maintenance and/or recharging may be readjusted. For an example of a lawn of an office complex, the proximity SPDs may detect 100 people attending garden party activity. The remote device(s) 104 may reduce the lawn "charge" (e.g., the capacity of the resource) far more when 100 people are detected than if 10 attendees are detected. The lawn may be deemed to have a pre-determined capacity before it should be scheduled for recovery. For example, the lawn may be flagged as unavailable and/or temporarily retired from use when a greater number of attendees are detected by the proximity SPDs.

In some embodiments, based on the presence detected by the proximity SPDs, a warning flag may be issued if the number of attendees causes a resource to be outside of compliance. For example, rooms may have a maximum occupancy as determined by a fire department, safety guidelines and/or laws/regulations. The remote device(s) 104 may take action (e.g., reallocate resources) if a room is about to exceed a limit. For example, the remote device(s) 104 may run a refinement round and/or provide updated scheduling data to allocate an "overflow" room. In another example, the updated scheduling data may flag personnel to stop more attendees from entering and/or send a notification cancelling a reminder of the activity. The type of resource allocation performed to prevent a resource from being outside of compliance may be varied according to the design criteria of a particular implementation. The detected presence by the proximity SPDs indicating that occupancy has exceeded a limit may be used by the remote device(s) 104 as context information when scheduling future activities.

In some embodiments, the presence detected by the proximity SPDs may act as an interrupt signal for various SPDs. For example, an SPD may be in a mode of operation (e.g., a power conservation mode). The proximity SPDs may detect a presence, and an interrupt signal may be sent to the SPD. The SPD may perform a duty cycle based on the interrupt signal (e.g., select a particular mode of operation for a pre-determined amount of time). The SPD may then return to a previous mode of operation after completing the duty cycle.

The precedence relationships of the activities may change based on a VIP being in attendance. The proximity SPDs may be configured to detect VIPs (e.g., based on facial recognition, RFID signals, etc.). For example, a CEO of a company may attend the activity without prior notice. In another example, a VP of sales of a customer may decide to attend a customer meeting. The resources allocated for the activity may be re-allocated based on the proximity SPDs detecting the presence of the VIP. The remote device(s) 104 may run a refinement round based on the detected presence of the VIP communicated by the proximity SPDs.

For example, the presence detected by the proximity SPDs during an activity may indicate the presence of a VIP. The activity may span consecutive time slots. The remote device(s) 104 may assign a higher priority (e.g., increase the precedence relationship) to the remaining time slots for the activity. The scheduling data may be updated to re-allocate the resources.

Past attendance by VIPs may be used as context information. For example, a previous attendance by the VIP may be used to predict a future appearance of the VIP using machine learning techniques. For example, a particular VIP may have a habit of appearing at all the activities on a particular topic. The remote device(s) 104 may assign higher priority to the activities on the particular topic as encoded in the precedence relations (e.g., the acyclic graph, G=(V, E)).

Figure 24:
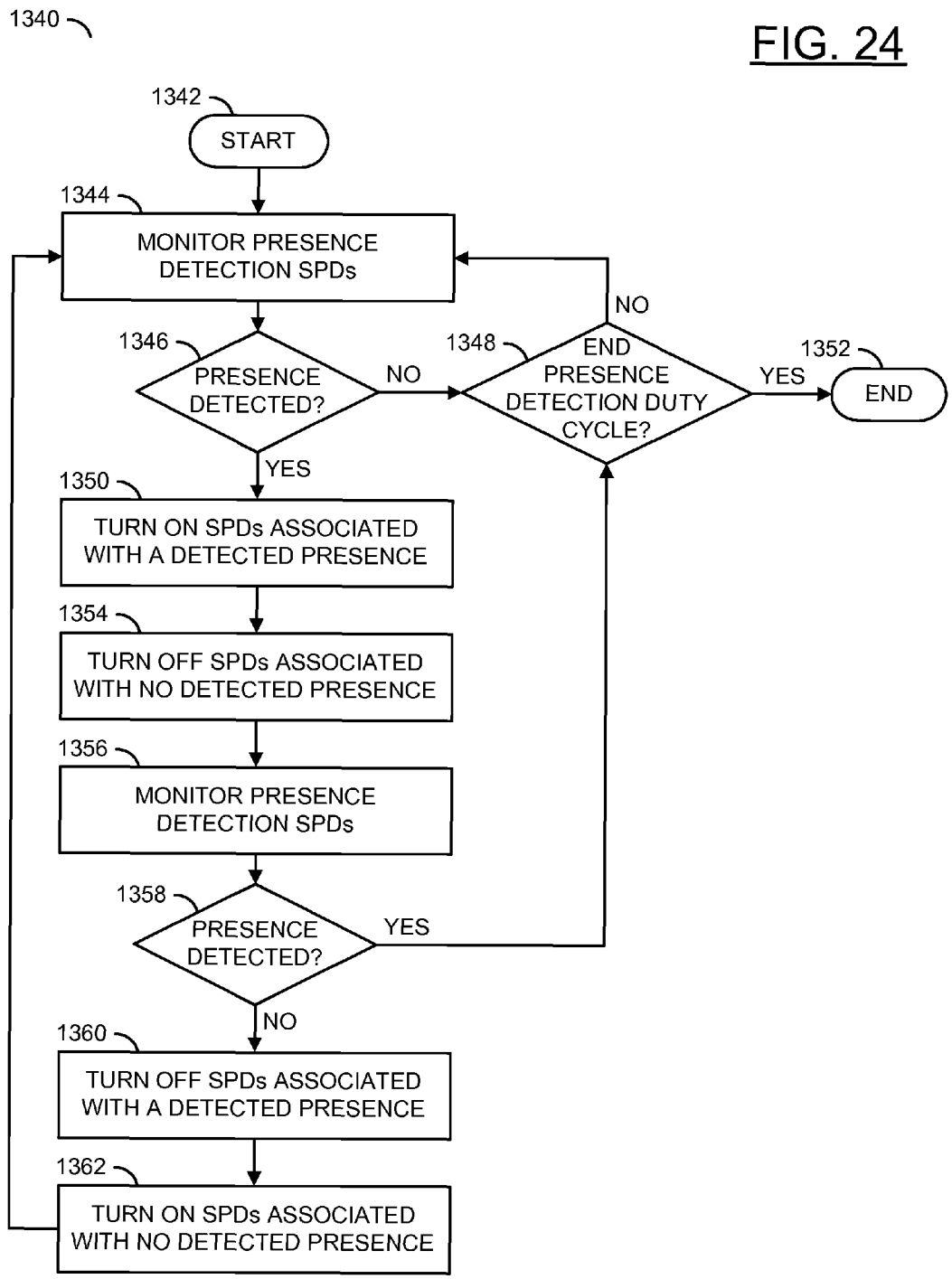
FIG. 24 is a flow diagram illustrating a method for changing modes of operation based on presence detection.

Referring to FIG. 24, a flow diagram of a method (or process) 1340 is shown. The method 1340 may change modes of operation based on presence detection. The method 1340 generally comprises a step (or state) 1342, a step (or state) 1344, a decision step (or state) 1346, a decision step (or state) 1348, a step (or state) 1350, a step (or state) 1352, a step (or state) 1354, a step (or state) 1356, a decision step (or state) 1358, a step (or state) 1360, and a step (or state) 1362. The step 1342 may be a start step. The step 1344 may monitor one or more of the presence detection and/or proximity SPDs. Next, the method 1340 may move to the decision step 1346.

The decision step 1346 may determine whether one or more the proximity SPDs have detected a presence. If not, the method 1340 may move to the decision step 1348. The decision step 1348 may determine whether the presence detection duty cycle for the proximity SPD has ended. If not, the method 1340 may return to the step 1344. If so, the method 1340 may end at the step 1352.

If the decision step 1346 determines that one or more of the proximity SPDs have detected a presence, the method 1340 may move to the step 1350. The step 1350 may turn on SPDs associated with the detected presence (e.g., some SPDs may activate based on the presence of the VIP and/or the number of attendees). Next, the step 1352 may turn off SPDs associated with no detected presence (e.g., some SPDs may enter a low power mode based on the presence of the VIP and/or the number of attendees). The step 1356 may monitor the presence/proximity detection SPDs (e.g., continue monitoring the proximity detection SPDs during the presence detection duty cycle). Next, the method 1340 may move to the decision step 1358.

The decision step 1358 may determine whether a presence has been detected. If so, the method 1340 may move to the decision step 1348. If not, the method 1340 may move to the step 1360. The step 1360 may turn off SPDs associated with the detected presence. Next, the step 1362 may turn on SPDs associated with no detected presence. Next, the method 1340 may return to the step 1344.

Figure 25A:
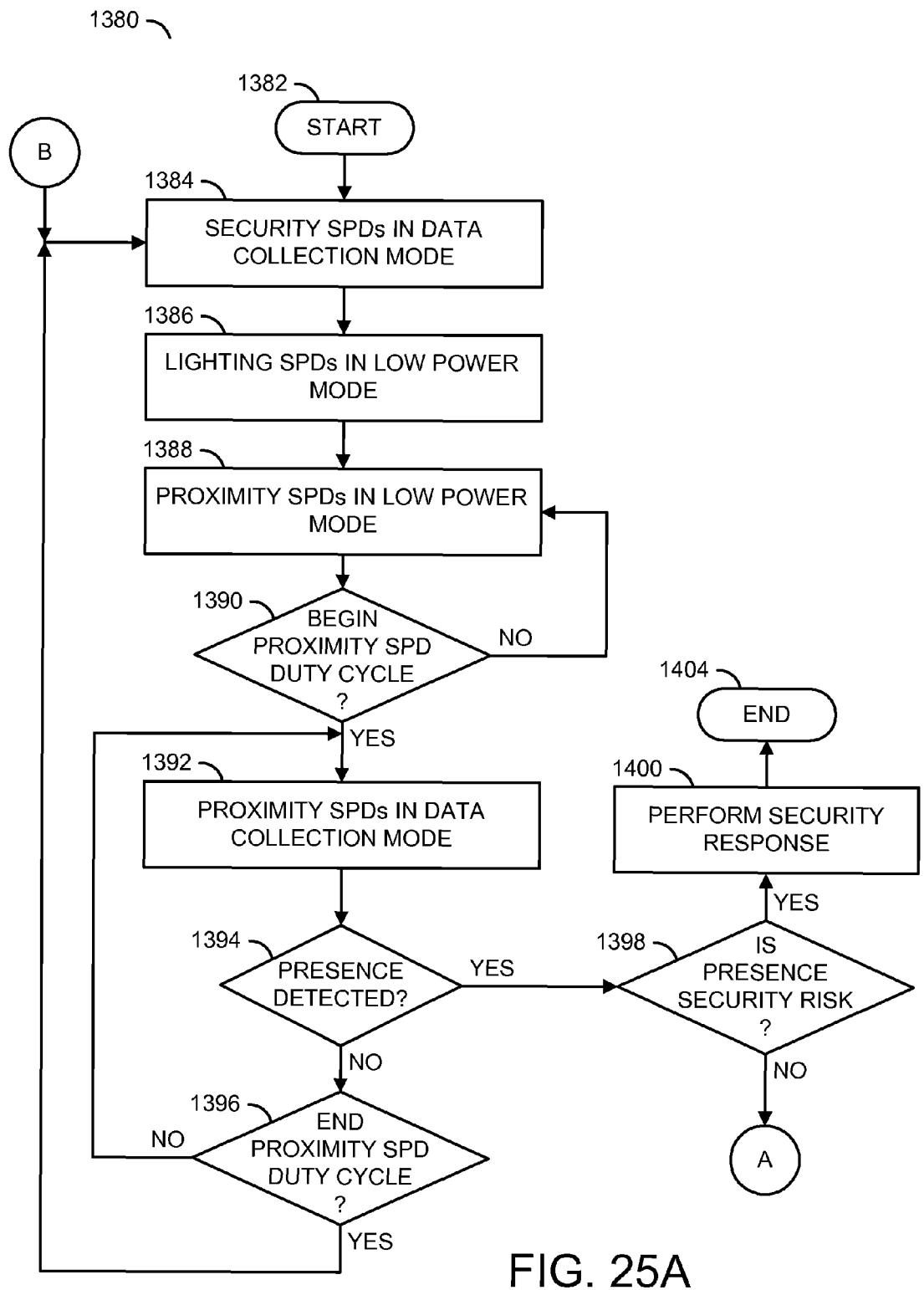
FIGS. 25A and 25B are flow diagrams illustrating a method for changing modes of operation for lighting and security systems in an enterprise operation based on presence detection.
Figure 25B:
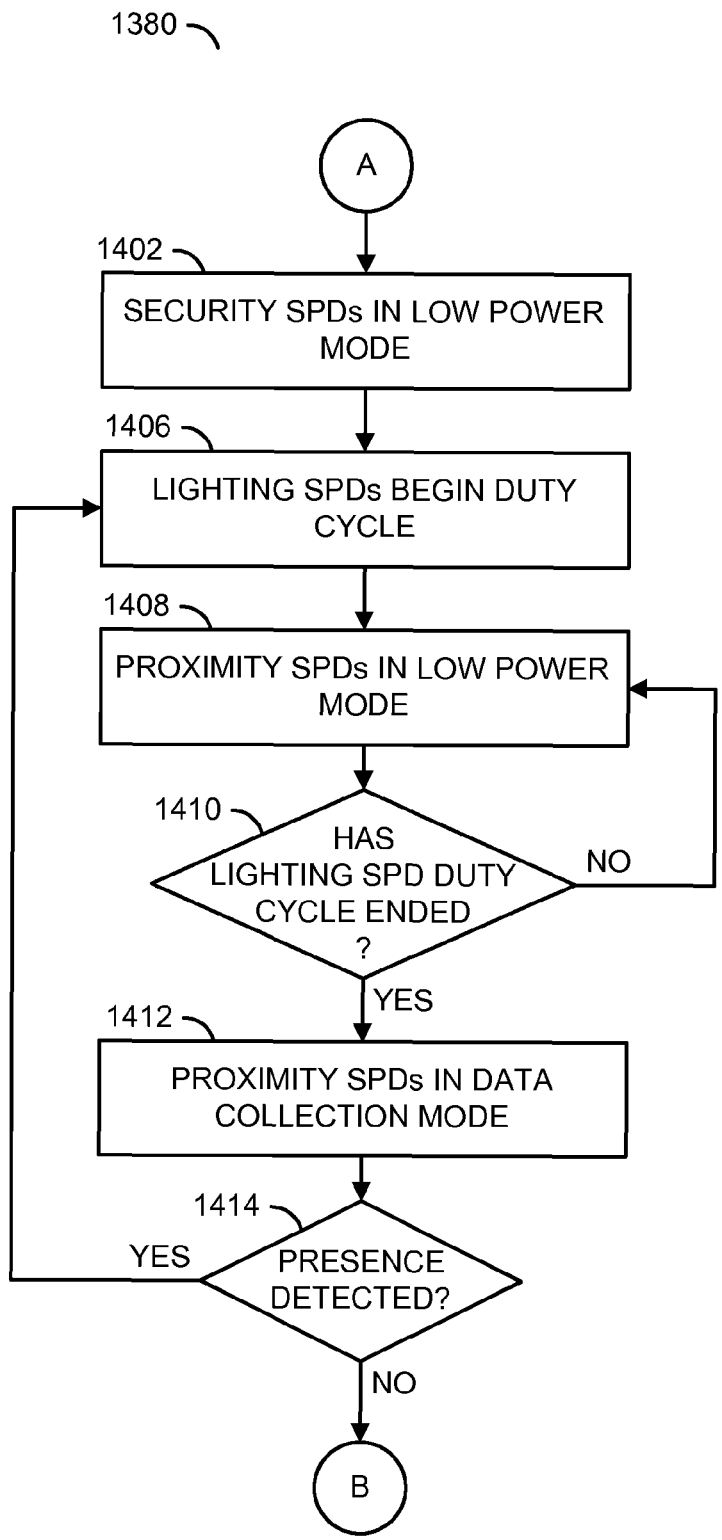

Referring to FIGS. 25A and 25B, a flow diagram of a method (or process) 1380 is shown. The method 1380 may change modes of operation for lighting and security systems in an enterprise operation based on presence detection. The method 1380 generally comprises a step (or state) 1382, a step (or state) 1384, a step (or state) 1386, a step (or state) 1388, a decision step (or state) 1390, a step (or state) 1392, a decision step (or state) 1394, a decision step (or state) 1396, a decision step (or state) 1398, a step (or state) 1400, a step (or state) 1402, a step (or state) 1404, a step (or state) 1406, a step (or state) 1408, a decision step (or state) 1410, a step (or state) 1412, and a decision step (or state) 1414.

The step 1382 may be a start step. Next, in the step 1384 one or more security SPDs may be in a data collection mode (e.g., SPDs assigned to security cameras, motion detectors, audio sensors, etc.). In the step 1386, one or more lighting SPDs may be in a low power mode. In the step 1388, one or more of the proximity SPDs may be in a low power mode. Next, the method 1380 may move to the decision step 1390.

The decision step 1390 may determine whether to begin the proximity SPD duty cycle. If not, the method 1380 may return to the step 1388. If so, the method 1390 may move to the step 1392. For example, the proximity SPDs may periodically check for a presence and/or check for the presence at pre-determined times (e.g., based on the scheduling data). In the step 1392, the proximity SPDs may start a data collection mode (e.g., begin monitoring for a presence). Next, the method 1380 may move to the decision step 1394.

The decision step 1394 may determine whether a presence has been detected (e.g., by the proximity SPDs). If not, the method 1380 may move to the decision step 1396. The decision step 1396 may determine whether to end the duty cycle of the proximity SPDs. If not, the method 1380 may return to the step 1392. If so, the method 1380 may return to the step 1384.

If the decision step 1394 determines a presence has been detected, the method 1380 may move to the decision step 1398. The decision step 1398 may determine whether the presence detected is a security risk. For example, the security risk of the presence detected may be determined using facial recognition. If so, the method 1380 may move to the step 1400. The step 1400 may perform a security response (e.g., activate alarm SPDs, communicate to the remote device(s) 104, etc.). Next, the method 1380 may move to the step 1404, which ends the method 1380.

If the decision step 1398 determines the presence detected is not a security risk, the method 1380 may move to the step 1402. In the step 1402, the security SPDs may be in a low power mode. Next in the step 1406, the lighting SPDs may begin a duty cycle. In the step 1408, the proximity SPDs may be in a low power mode. Next, the method 1380 may move to the decision step 1410.

The decision step 1410 may determine whether the lighting SPD duty cycle has ended (e.g., based on scheduling data, a pre-determined amount of time, etc.). If not, the method 1380 may return to the step 1408. If so, the method 1380 may move to the step 1412. In the step 1412, the proximity SPDs may be in a data collection mode. Next, the method 1380 may move to the decision step 1414. The decision step 1414 may determine whether the proximity SPDs have detected a presence. If so, the method 1380 may return to the step 1406. If not, the method 1380 may return to the step 1384.

Referring to FIG. 26, a flow diagram of a method (or process) 1440 is shown. The method 1440 may reallocate resources based on presence detection. The method 1440 generally comprises a step (or state) 1442, a step (or state) 1444, a step (or state) 1446, a step (or state) 1448, a decision step (or state) 1450, a step (or state) 1452, a decision step (or state) 1454, a step (or state) 1456, a step (or state) 1458, a step (or state) 1460, and a step (or state) 1462.

The step 1442 may be a start step. In the step 1444, one or more of the activities may be scheduled and/or the resources may be assigned (e.g., by the remote device(s) 104). Next in the step 1446, the SPDs 102 may monitor resource levels and/or report the resource levels to the remote device(s) 104. In the step 1448, the presence/proximity SPDs may monitor the number of people and/or monitor for VIPs. Next, the method 1440 may move to the decision step 1450.

The decision step 1450 may determine whether one or more VIPs have been detected. If so, the method 1440 may move to the step 1452. The step 1452 may communicate the detected presence of the VIP to the remote device(s) 104. Next, the method 1440 may move to the step 1458. If the decision step 1450 determines a VIP has not been detected, the method 1440 may move to the decision step 1454.

The decision step 1454 may determine whether more people have been detected than expected (e.g., whether the actual number of attendees has exceeded the expected number of attendees). If not, the method 1440 may return to the step 1444. If so, the method 1440 may move to the step 1456. The step 1456 may communicate the actual attendance to the remote device(s) 104. Next in the step 1458, the remote device(s) 104 may run a refinement round to reallocate the resources (e.g., reallocate the resources on-the-fly). In the step 1460, the remote device(s) 104 may communicate the updated scheduling data to the SPDs. Next, the method 1440 may end in the state 1462.

Figure 27:
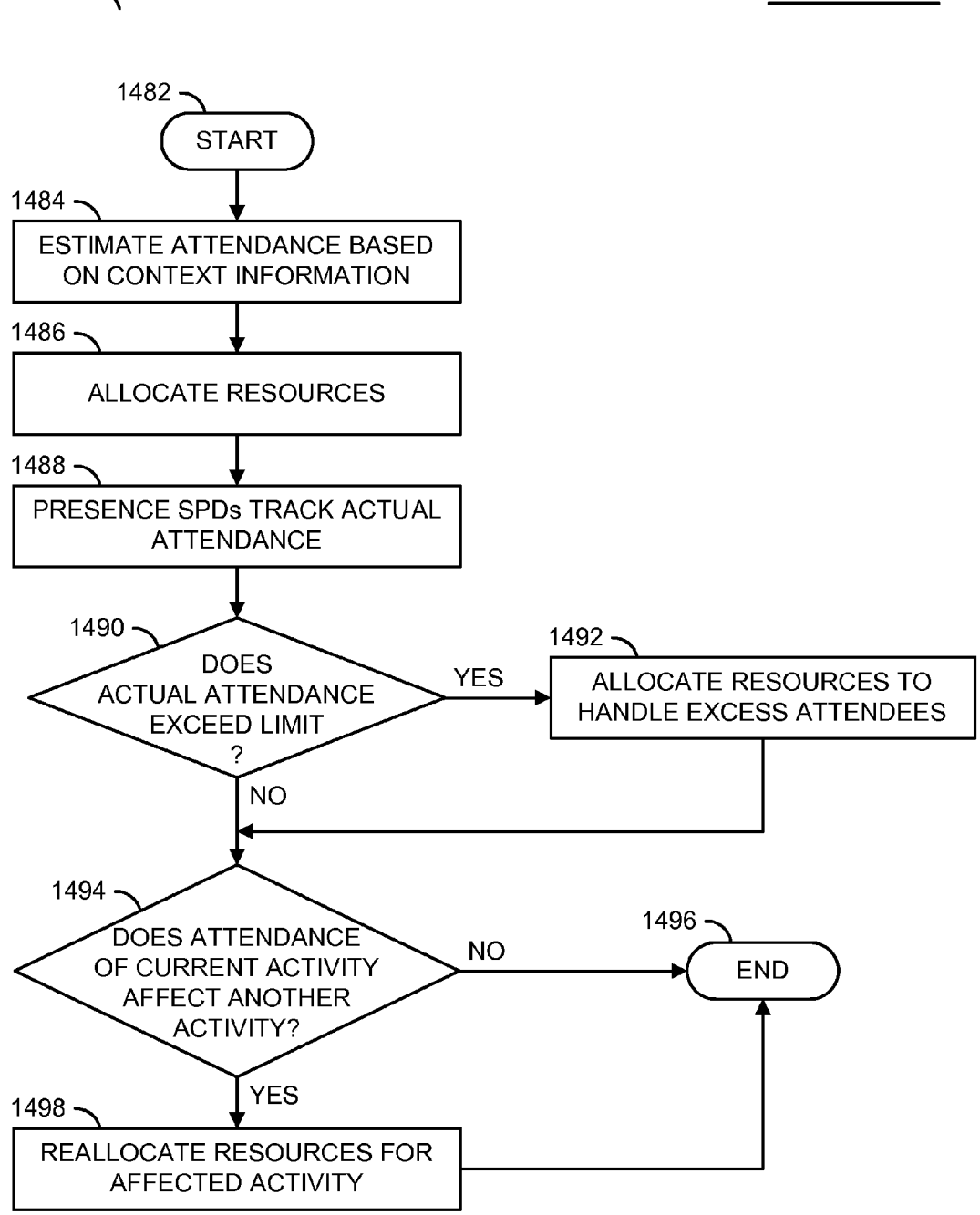
FIG. 27 is a flow diagram illustrating a method for reallocating resources for related activities based on presence detection.

Referring to FIG. 27, a flow diagram of a method (or process) 1480 is shown. The method 1480 may reallocate resources for related activities based on presence detection. The method 1480 generally comprises a step (or state) 1482, a step (or state) 1484, a step (or state) 1486, a step (or state) 1488, a decision step (or state) 1490, a step (or state) 1492, a decision step (or state) 1494, a step (or state) 1496, and a step (or state) 1498.

The step 1482 may be a start step. Next in the step 1484, the remote device(s) 104 may estimate attendance (e.g., determine the expected number of attendees) based on the context information. In the step 1486, the remote device(s) 104 may allocate the resources (e.g., based on the refinement rounds). In the step 1488, the presence/proximity SPDs may track an actual attendance of the activity (e.g., based on the detected presence). Next, the method 1480 may move to the decision step 1490.

The decision step 1490 may determine whether the actual attendance exceeds the limit (e.g., a safety standard, based on the resources allocated, etc.). If so, the method 1480 may move to the step 1492. The step 1492 may allocate the resources to handle the excess attendees. Next, the method 1480 may move to the decision step 1494. If the decision step 1490 determines the actual attendance does not exceed the limit, the method 1480 may move to the decision step 1494.

The decision step 1494 may determine whether the attendance of the current activity affects another activity. If not, the method 1480 may end at the step 1496. If so, the method 1480 may move to the step 1498. In the step 1498, the remote device(s) 104 may reallocate the resources for the affected activity. Next, the method 1480 may end at the step 1496.

In some embodiments, the remote device(s) 104 may determine a maintenance time (e.g., a recharge and/or recovery time) of the resources based on the presence detected. For example, the resource may be worn down due to greater attendance numbers and/or the presence of a VIP. In one example, the resource may be the lawn and a greater number of attendees at a lawn party may cause more damage to the lawn. The amount of time needed (e.g., the maintenance time) may increase because of the greater number of attendees.

In some embodiments, the remote device(s) 104 may determine that a resource is recharged (e.g., the capacity is increased) based on the presence detected. For example, personnel may be the resource, and the presence of more personnel may recharge the resource. For example, the personnel may be emergency response staff that may need rest. When more personnel are detected by the presence detection SPDs, the resource may be increased. In some examples, even the same number of employees detected may increase/recharge the resource because a better rested employee may perform a task more efficiently than an exhausted employee.

In some embodiments, billing/invoicing for use of a resource may be based on the presence detected. For example, some enterprise operations may outsource staff. Based on the number of staff outsourced the enterprise operation may be billed more. The presence detection SPDs may be used to determine the presence of the outsourced staff (e.g., the resource).

In some embodiments, the remote device(s) 104 may determine whether a resource has arrived at a location for the scheduled activity. For example, the resource may be personnel. The remote device(s) 104 may determine whether the personnel is at the location of the scheduled activity (e.g., prevent personnel from being in the wrong room, etc.). In some embodiments, the SPDs 102 assigned to the resource may communicate a notification to indicate that the resource is in a wrong location based on the scheduling data. For example, a staff member may be notified by the SPDs 102 to move to an appropriate location for the activity. In another example, moveable equipment may communicate a notification (e.g., a flashing light, an audible sound, etc.) to indicate to an employee that the equipment should be moved.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

The functions performed by the diagrams of FIGS. 12-14 and/or 17-27 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A system comprising:
a plurality of self-powered devices, wherein said self-powered devices are configured to (i) perform instructions, (ii) store scheduling data and (iii) select one of a plurality of modes of operation;
a plurality of proximity self-powered devices, wherein (A) said proximity self-powered devices are configured to (i) detect a presence and (ii) select one of a plurality of modes of operation and (B) each of said plurality of self-powered devices selects one of said plurality of modes of operation based on (i) said stored scheduling data and (ii) said presence detected by at least one of said plurality of proximity self-powered devices; and
one or more remote devices configured to determine said scheduling data, wherein (A) said scheduling data comprises one or more activities and (B) said remote device is further configured to (i) determine whether an actual attendance of said activity exceeds a limit based on said presence detected by said proximity self-powered devices and (ii) allocate resources based on said actual attendance.

2. The system according to claim 1, wherein (i) a first subset of said plurality of self-powered devices is in an active state based on said presence detected and (ii) a second subset of said plurality of self-powered devices is in a low-power mode based on said presence detected.

3. The system according to claim 2, wherein said first subset of said plurality of self-powered devices (i) performs in one of said plurality of modes of operations for a duty cycle based on said presence detected and (ii) returns to a previous mode of operation after said duty cycle.

4. The system according to claim 1, wherein said presence detected is a number of people.

5. The system according to claim 1, wherein said presence detected is a particular person.

6. The system according to claim 1, wherein said plurality of self-powered devices are assigned to one of a plurality of resources.

7. The system according to claim 6, wherein said resources are allocated based on said scheduling data.

8. The system according to claim 7, wherein said resources are reallocated based on said presence detected.

9. The system according to claim 6, wherein a maintenance time of said resources is based on said presence detected.

10. The system according to claim 6, wherein said resources are configured to recharge based on said presence detected.

11. The system according to claim 6, wherein billing for said resource is based on said presence detected.

12. The system according to claim 1, wherein an allocation of resources assigned to said plurality of self-powered devices is based on context information.

13. The system according to claim 1, wherein (i) said proximity self-powered devices are configured to communicate said presence detected to said remote device and (ii) said remote device is further configured to run a refinement round based on said presence detected.

14. The system according to claim 1, wherein said remote device is further configured to communicate an updated version of said scheduling data to said plurality of self-powered devices.

15. A system comprising:
- a plurality of self-powered devices, wherein said self-powered devices are configured to (i) perform instructions, (ii) store scheduling data and (iii) select one of a plurality of modes of operation;
- a plurality of proximity self-powered devices, wherein (A) said proximity self-powered devices are configured to (i) detect a presence and (ii) select one of a plurality of modes of operation and (B) each of said plurality of self-powered devices selects one of said plurality of modes of operation based on (i) said stored scheduling data and (ii) said presence detected by at least one of said plurality of proximity self-powered devices; and
- one or more remote devices configured to determine said scheduling data, wherein (A) said scheduling data comprises one or more activities and (B) said remote device uses said presence detected to determine whether a resource has arrived at a location for said activity.

16. The system according to claim 15, wherein said self-powered devices assigned to said resource communicate a notification when said resource is in a wrong location for said activity.

17. A system comprising:
- a plurality of self-powered devices, wherein said self-powered devices are configured to (i) perform instructions, (ii) store scheduling data and (iii) select one of a plurality of modes of operation;
- a plurality of proximity self-powered devices, wherein (A) said proximity self-powered devices are configured to (i) detect a presence and (ii) select one of a plurality of modes of operation and (B) each of said plurality of self-powered devices selects one of said plurality of modes of operation based on (i) said stored scheduling data and (ii) said presence detected by at least one of said plurality of proximity self-powered devices; and
- one or more remote devices configured to determine said scheduling data, wherein (A) said scheduling data comprises one or more activities and (B) said remote device is further configured to (i) determine whether an actual attendance of a first activity affects an attendance of a second activity based on said presence detected by said proximity of self-powered devices and (ii) reallocate resources for said second activity based on said actual attendance.

* * * * *